US012497394B2

United States Patent
Liu et al.

(10) Patent No.: US 12,497,394 B2
(45) Date of Patent: Dec. 16, 2025

(54) FUSED-CYCLIC PYRAZOLONE FORMAMIDE COMPOUND AND PREPARATION METHOD THEREFOR, PHARMACEUTICAL COMPOSITION AND USE THEREOF

(71) Applicant: SHANGHAI INSTITUTE OF MATERIA MEDICA, CHINESE ACADEMY OF SCIENCES, Shanghai (CN)

(72) Inventors: Hong Liu, Shanghai (CN); Meiyu Geng, Shanghai (CN); Yu Zhou, Shanghai (CN); Jian Ding, Shanghai (CN); Feifei Fang, Shanghai (CN); Jing Ai, Shanghai (CN); Jian Li, Shanghai (CN); Xia Peng, Shanghai (CN); Hualiang Jiang, Shanghai (CN); Yinchun Ji, Shanghai (CN); Kaixian Chen, Shanghai (CN)

(73) Assignee: SHANGHAI INSTITUTE OF MATERIA MEDICA, CHINESE ACADEMY OF SCIENCES, Shanghai (CN)

(*) Notice: Subject to any disclaimer, the term of this patent is extended or adjusted under 35 U.S.C. 154(b) by 1399 days.

(21) Appl. No.: 17/057,199

(22) PCT Filed: May 21, 2019

(86) PCT No.: PCT/CN2019/087867
§ 371 (c)(1),
(2) Date: Nov. 20, 2020

(87) PCT Pub. No.: WO2019/223704
PCT Pub. Date: Nov. 28, 2019

(65) Prior Publication Data
US 2021/0221807 A1 Jul. 22, 2021

(30) Foreign Application Priority Data
May 21, 2018 (CN) .......................... 201810491115.3

(51) Int. Cl.
*C07D 471/04* (2006.01)
*C07D 519/00* (2006.01)

(52) U.S. Cl.
CPC ......... *C07D 471/04* (2013.01); *C07D 519/00* (2013.01)

(58) Field of Classification Search
CPC .. C07D 471/04; C07D 519/00; C07D 487/04; C07D 497/056; A61P 35/00; A61K 31/444; A61K 31/517; A61K 31/519
See application file for complete search history.

(56) References Cited

U.S. PATENT DOCUMENTS

| 8,685,983 B2 | 4/2014 | Kim et al. | |
| 2011/0118252 A1* | 5/2011 | Kim | A61P 9/00 544/298 |
| 2011/0183983 A1 | 7/2011 | Kim et al. | |

FOREIGN PATENT DOCUMENTS

| CN | 101248059 A | 8/2008 |
| CN | 102086211 A | 6/2011 |
| CN | 102245595 A | 11/2011 |
| CN | 104974162 A | 10/2015 |
| WO | 2010/039248 A1 | 4/2010 |

OTHER PUBLICATIONS

Danziger, Automated site-directed drug design: a general algorithm for knowledge acquisition about hydrogen-bonding regions at protein surfaces, Proc. R. Soc. Lond., 1989, 236, pp. 101-113 (Year: 1989).*

(Continued)

*Primary Examiner* — Renee Claytor
*Assistant Examiner* — Andrew P Lee

(57) ABSTRACT

Provided are a class of fused-cyclic pyrazolone formamide compounds and a preparation method therefor, a pharmaceutical composition and the use thereof. Specifically, pro- (Continued)

vided is a compound having the structure as shown in formula (I) (with each group defined in the description). The compound can be used as an AXL inhibitor in the preparation of a pharmaceutical composition for treating tumors.

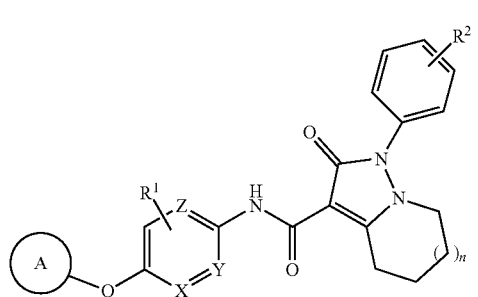

I

12 Claims, 1 Drawing Sheet

(56) References Cited

OTHER PUBLICATIONS

Simone, Oncology: Introduction, Textbook of Medicine, 1997, 14, pp. 1004-1010 (Year: 1997).*
English Translation of the International Search Report mailed Aug. 19, 2019 corresponding to PCT/CN2019/087077 filed May 15, 2019; 5 pages.

* cited by examiner

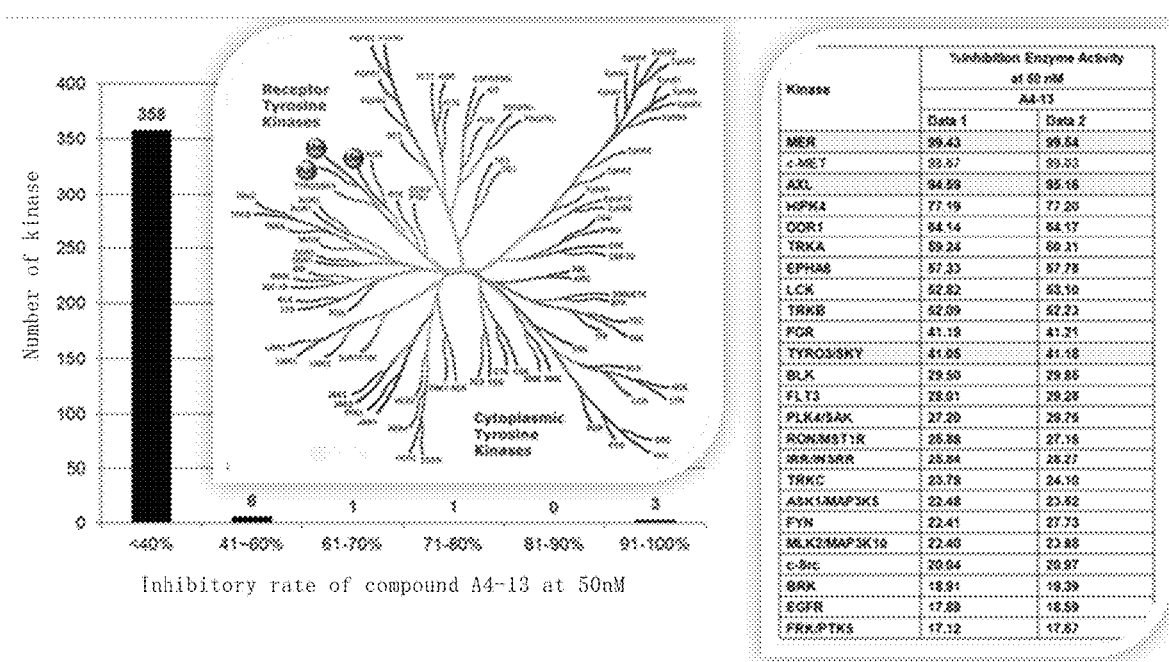

FUSED-CYCLIC PYRAZOLONE FORMAMIDE COMPOUND AND PREPARATION METHOD THEREFOR, PHARMACEUTICAL COMPOSITION AND USE THEREOF

FIELD OF THE INVENTION

The present invention relates to the field of medicinal chemistry and pharmacotherapy, in particular to a class of fused-cyclic pyrazolone formamide compound, preparation method thereof, pharmaceutical composition containing such compounds, and use as an AXL inhibitor, especially preparation for treatment of tumor drug thereof.

BACKGROUND OF THE INVENTION

Malignant tumors have become one of the major diseases which seriously threaten human health. The World Cancer Report 2014 pointed out that the global cancer burden is increasing rapidly, while the new cancer cases increased in China have ranked first in the world. Among them, there were approximately 3.06 million new cases in 2012 and approximately 2.2 million deaths, accounting for approximately 20% of the global total and 25% of deaths. At present, tumor has surpassed cardiovascular disease, and has gradually become the leading cause of death, which causing tremendous physical and psychological pain to patients, and bringing huge economic burden to patients' families and the country. Although there are many anti-tumor drugs on the market, malignant tumors are still a major disease that is difficult to overcome, especially the emergence of drug resistance.

Compared with traditional cytotoxic chemotherapeutics, small-molecule anti-tumor drugs targeting tyrosine kinases are characterized by their excellent specificity and effectiveness, better patient tolerance, and relatively few side effects, which has become a hot spot in the research of anti-tumor drugs. Receptor tyrosine kinase (RTK) is a type of cell surface transmembrane protein receptor with endogenous RTK activity, of which the structure includes extracellular ligand binding domain, transmembrane domain and intracellular kinase domain. The signals were transmitted from environment to the cytoplasm and nucleus, thus regulating normal cell processes, including survival, growth, differentiation, adhesion and movement. At present, 58 receptor tyrosine kinases have been discovered, which can be divided into 20 subfamilies according to the homology of the amino acid sequence of the kinase domain and the similarity of the extracellular structure. Among them, the AXL receptor is a member of the receptor tyrosine kinase subfamily, which was first discovered in human chronic myeloid leukemia. It forms receptor Tyrosine kinase subfamily (TAM family) together with Tyro3 (Etk2 or Tif) and Mer (also known as Nyk, Eyk or Tyro12). AXL leads to the activation of the kinase superfamily by binding to its ligand Gas6, and plays an important regulatory role in regulating the body's inflammatory immune response, maintaining the steady state of phagocytosis, and regulating the differentiation and maturation of NK cells. At present, high expression of AXL has been found in a variety of solid tumors, including lung cancer, breast cancer, liver cancer, pancreatic cancer, prostate cancer, etc., which are closely related to tumor recurrence and poor prognosis. The abnormal expression of AXL activates and antagonizes tumor cell apoptosis, promotes tumor cell invasion and metastasis, and promotes tumor angiogenesis, which promotes the occurrence and development of tumors in multiple links. Of particular concern is that recent studies have shown that the high expression of AXL may mediate the acquired resistance of EGFR. Clinical studies have shown that up to 20% of EGFR resistant patients have high expression of AXL; preclinical studies on the combination administration of AXL inhibitors can effectively overcome EGFR inhibitor resistance. In addition, the abnormal activation of AXL overexpression is also closely related to the resistance of other targeted inhibitors and chemotherapeutics, suggesting that AXL may have a wide range of applications for combination administration. Different from other kinases, AXL is highly expressed in macrophages and dendritic cells in the tumor microenvironment, and can synergistically promote tumor progression through interaction with tumor cells and other stromal cells. Therefore, in recent years, the research and development of targeted AXL inhibitors has become the frontier and hot spot of anti-tumor drug research.

Currently, there are 32 AXL inhibitors under research, of which 25 are small molecule inhibitors. Currently, the compound BGB324 developed by BergenBio is the only Axl kinase inhibitor reported to have high selectivity, however, it also shows strong inhibition effects on members of the same family, such as Mer and Tyro-3, and ABL, InsR, EGFR, HER-2 and PDGFRβ. The results of preclinical studies have shown that BGB324 has good pharmacokinetic and toxicological properties. In two metastatic mouse models of breast cancer, it can prevent breast cancer metastasis and prolong survival time; in tumor cells and tumor stromal cells, AXL signals can regulate the metastasis of breast cancer at multiple levels, and it has now entered clinical II research. Although other clinically researched or marketed compounds have a strong inhibitory effect on AXL (such as Cabozantinib, BMS777607, Ningetinib, etc.), they are all small molecule receptor tyrosine kinase inhibitors targeting other targets. Those multiple targeting non-selective kinase inhibitors have poor selectivity to AXL.

In summary, there is still a lack of small molecule inhibitors that selectively target AXL kinase in the art.

SUMMARY OF THE INVENTION

The purpose of the present invention is to provide a class of small molecule inhibitors that selectively target to AXL kinase.

The first aspect of the present invention provides a fused-cyclic pyrazolone formamide compound having the structure of formula I, or its racemate, R-isomer, S-isomer, pharmaceutically acceptable salt or the mixture thereof:

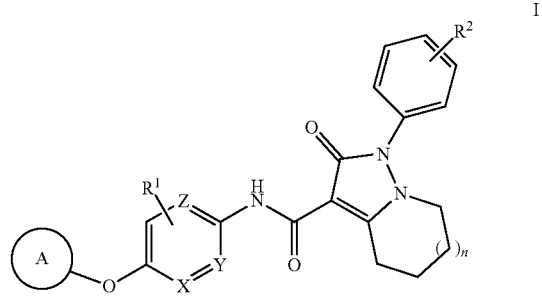

wherein:
n is an integer of 0-2, preferably 0 or 1;
X, Y and Z are CH or N;

$R^1$ and $R^2$ are each independently selected from the group consisting of hydrogen, deuterium, tritium, halogen, substituted or unsubstituted $C_1$-$C_6$ alkyl, substituted or unsubstituted $C_1$-$C_6$ alkoxy, substituted or unsubstituted $C_3$-$C_8$ cycloalkyl, $C_2$-$C_6$ alkenyl, cyano, nitro, amino, hydroxy, hydroxymethyl, carboxy, and —O[(CH$_2$)$_q$O]$_r$R$^3$; wherein the "substituted" refers to one or more hydrogen atoms on the group replaced by a substituent selected from the group consisting of halogen, $C_1$-$C_6$ alkyl, halogen-substituted $C_1$-$C_6$ alkyl, $C_1$-$C_6$ alkoxy, halogen-substituted $C_1$-$C_6$ alkoxy, $C_1$-$C_6$ alkoxycarbonyl, $C_3$-$C_8$ cycloalkyl, halogen-substituted $C_3$-$C_8$ cycloalkyl, cyano, nitro, amino, hydroxyl, hydroxymethyl, carboxyl, mercapto, sulfonyl, $C_6$-$C_{10}$ aryl and 3-12 membered heterocyclic group; $R^3$ is selected from hydrogen, $C_1$-$C_6$ alkyl, halogen-substituted $C_1$-$C_6$ alkyl, and hydroxymethyl;

q is 1, 2, 3, or 4;

r is 0, 1, 2, 3 or 4;

or two Ri and their adjacent carbon atoms together form a group selected from the group consisting of benzene ring, 5-8 membered heteroaromatic ring;

or two $R^2$ and their adjacent carbon atoms together form a group selected from the group consisting of benzene ring, 5-8 membered heteroaromatic ring;

Ⓐ ring is selected from the group consisting of substituted or unsubstituted 7-20 membered polycyclic heterocyclic ring, substituted or unsubstituted 7-20 membered polycyclic aromatic ring, substituted or unsubstituted 7-20 membered polycyclic aromatic heterocyclic ring, wherein the "substituted" refers to the hydrogen atom on the group is replaced by 1, 2, 3 or 4 substituents selected from the group consisting of deuterium (D), tritium (T), halogen, substituted or unsubstituted $C_1$-$C_6$ alkyl, substituted or unsubstituted $C_1$-$C_6$ alkoxy, —O[(CH$_2$)$_q$O]$_r$R$^3$, —NH[(CH$_2$)$_q$O]$_r$R$^3$, —NH(C=O)[(CH$_2$)$_q$O]$_r$R$^3$, —NH(SO$_2$)[(CH$_2$)$_q$O]$_r$R$^3$, —O(CH$_2$)$_s$Ar, substituted or unsubstituted $C_3$-$C_8$ cycloalkoxy, substituted or unsubstituted $C_3$-$C_8$ cycloalkylamino, substituted or unsubstituted $C_3$-$C_8$ epoxy alkyl, substituted or unsubstituted $C_3$-$C_8$ cycloaminoalkyl, cyano, nitro, amino, amino (preferably $C_1$-$C_6$ amino), hydroxyl, hydroxymethyl, carboxyl, $C_6$-$C_{10}$ aryl, $C_6$-$C_{10}$ aryloxy, substituted or unsubstituted 3-12 membered heterocyclic group, substituted or unsubstituted 3-12 membered heterocycylyloxy and substituted or unsubstituted 3-12 membered heterocyclylamino; wherein, the aromatic heterocyclic group, heterocyclic group each independently contains 1 to 4 heteroatoms selected from oxygen, sulfur and nitrogen; or two adjacent substituents and their connected atoms can form a structure selected from substituted or unsubstituted 6-20 membered heterocycle, while the heterocycle may optionally include 1, 2, 3 or 4 heteroatoms selected from N, O or S;

s is selected from the group consisting of 0, 1, 2, 3 and 4;

Ar is selected from the group consisting of substituted or unsubstituted $C_6$-$C_{12}$ aryl, substituted or unsubstituted 5-12 membered heteroaryl;

unless otherwise specified, the "substituted" refers to one or more hydrogen atoms on the group replaced by a substituent selected from the group consisting of halogen, $C_1$-$C_6$ alkyl, halogen-substituted $C_1$-$C_6$ alkyl, $C_1$-$C_6$ alkoxy, $C_1$-$C_6$ alkoxycarbonyl, halogen-substituted $C_1$-$C_6$ alkoxy, $C_3$-$C_8$ cycloalkyl, cyano, nitro, amino, hydroxyl, hydroxymethyl, carboxyl.

In another preferred embodiment, in the present invention, the halogen is F, Cl, Br or I.

In another preferred embodiment, $R^1$ and $R^2$ are each independently selected from group consisting of hydrogen, deuterium, tritium, halogen, substituted or unsubstituted $C_1$-$C_6$ alkyl, substituted or unsubstituted $C_1$-$C_6$ alkoxy, cyano, hydroxyl, carboxyl; wherein, the "substituted" refers to one or more hydrogen atoms replaced by a substituent selected from group consisting of halogen, $C_1$-$C_6$ alkyl, $C_1$-$C_6$ alkoxy, $C_1$-$C_6$ alkoxycarbonyl, cyano, amino, hydroxyl, hydroxymethyl, carboxyl; or two $R^1$ and their adjacent carbon atoms together form a group selected from the group consisting of benzene ring, 5-8 membered heteroaromatic ring;

In another preferred embodiment, the Ⓐ ring is selected from the group consisting of

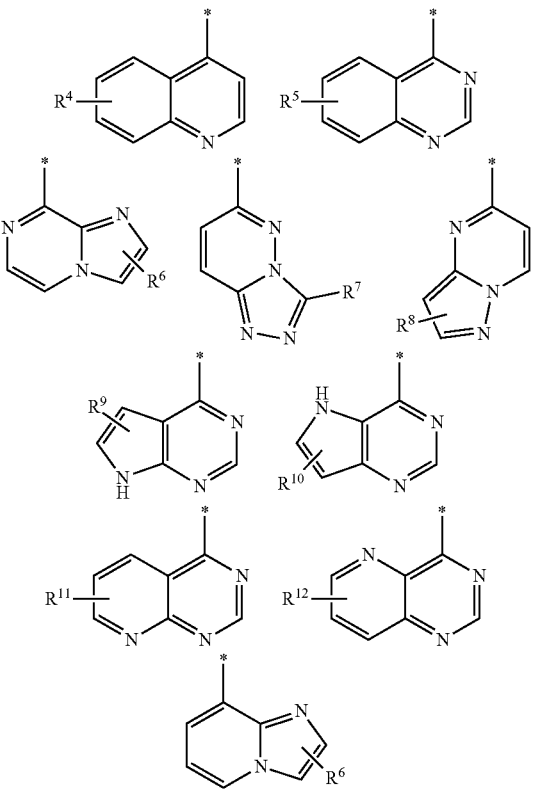

wherein, $R^4$, $R^5$, $R^6$, $R^7$, $R^8$, $R^9$, $R^{10}$, $R^{11}$, $R^{12}$ are respectively 1-4 substituents selected from the group consisting of H, D, T, halogen, substituted or unsubstituted $C_1$-$C_6$ alkyl, substituted or unsubstituted $C_1$-$C_6$ alkoxy, —O[(CH$_2$)$_q$O]$_r$R$^3$, —NH[(CH$_2$)$_q$O]$_r$R$^3$, —NH(C=O)[(CH$_2$)$_q$O]$_r$R$^3$, —NH(SO$_2$)[(CH$_2$)$_q$O]$_r$R$^3$, —O(CH$_2$)$_s$Ar, substituted or unsubstituted $C_3$-$C_8$ cycloalkoxy, substituted or unsubstituted $C_3$-$C_8$ cycloalkylamino, substituted or unsubstituted $C_3$-$C_8$ epoxy alkyl, substituted or unsubstituted $C_3$-$C_8$ cycloamine alkyl, cyano, nitro, amino, amino (preferably $C_1$-$C_6$ amino), hydroxyl, hydroxymethyl, carboxy, substituted or unsubstituted $C_6$-$C_{10}$ aryl, substituted or unsubstituted $C_6$-$C_{10}$ aryloxy, substituted or unsubstituted $C_6$-$C_{10}$ arylamino, substituted or unsubstituted 3-12 membered heterocyclic group, substituted or unsubstituted 3-12 membered heterocyclyloxy and substituted or unsubstituted 3-12 membered heterocyclic amino; or two adjacent groups mentioned above and their connected atoms may together form a structure selected from substituted or unsubstituted 6-20 membered heterocycle, while the heterocycle may optionally comprise 1, 2, 3 or 4 heteroatoms selected from N, O or S.

In another preferred embodiment, the $R^1$ and $R^2$ are each independently 1 to 3 substituents selected from the group consisting of hydrogen, halogen, $C_1$-$C_6$ alkyl, $C_1$-$C_6$ haloalkyl, $C_1$-$C_6$ alkoxy, cyano, hydroxy; or two $R^1$ and their connected atoms can together form a group selected from the group consisting of benzene ring, 5-8 membered heteroaromatic ring.

In another preferred embodiment, each of the $R^1$ is independently 1 to 3 substituents selected from the group consisting of fluoro, chloro, bromo, iodo, methoxy, trifluoromethyl, or two $R^1$ and their adjacent carbon atoms together form a benzene ring.

In another preferred embodiment, the $R^2$ is each independently 1 to 3 fluoro.

In another preferred embodiment, the Ⓐ ring is selected from the group consisting of

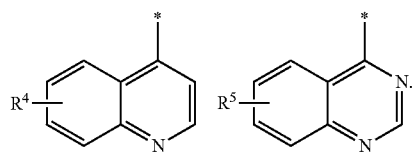

In another preferred embodiment, $R^4$ and $R^5$ are respectively 1-4 substituents selected from the group consisting of substituted or unsubstituted $C_1$-$C_6$ alkoxy, —O[(CH$_2$)$_q$O]$_r$R$^3$, —NH[(CH$_2$)$_q$O]$_r$R$^3$, —NH(C=O)[(CH$_2$)$_q$O]$_r$R$^3$, —NH(SO$_2$)[(CH$_2$)$_q$O]$_r$R$^3$, —O(CH$_2$)$_s$Ar, substituted or unsubstituted 3-12 membered heterocyclyloxy and substituted or unsubstituted 3-12 membered heterocyclylamino; or two adjacent groups mentioned above and their connected atoms can form a structure selected from the group consisting of substituted or unsubstituted 6-20 membered heterocycle, the heterocycle may optionally include 1, 2, 3, or 4 heteroatoms selected from N, O or S.

In another preferred embodiment, Ar is substituted or unsubstituted $C_6$-$C_{12}$ aryl.

In another preferred embodiment, the fused-cyclic pyrazolone formamide compound is any compound of DC621001-DC621108 in the embodiment.

In the second aspect of the present invention, a preparation method of compound of the first aspect of the present invention is provided, which comprises the following steps:

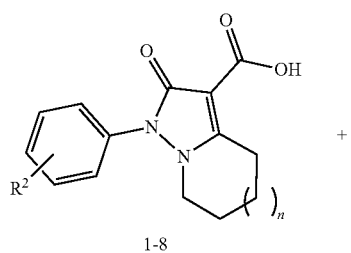

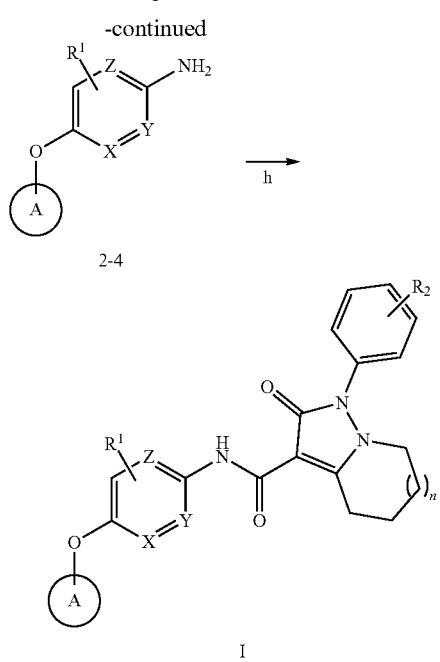

in an inert solvent, reacting formula 1-8 compound and formula 2-4 compound to provide formula I compound.

In a preferred embodiment, the compound of formula 1-8 is prepared by the following method:

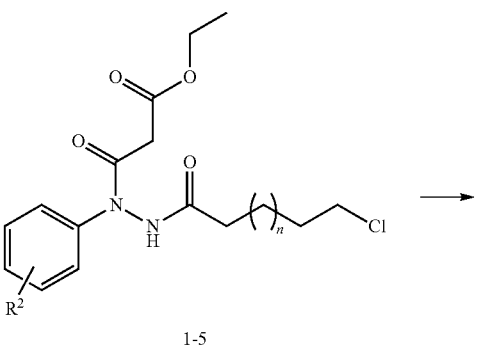

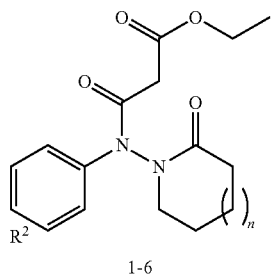

(b1) in an inert solvent, reacting formula 1-5 compound so as to provide formula 1-6 compound;

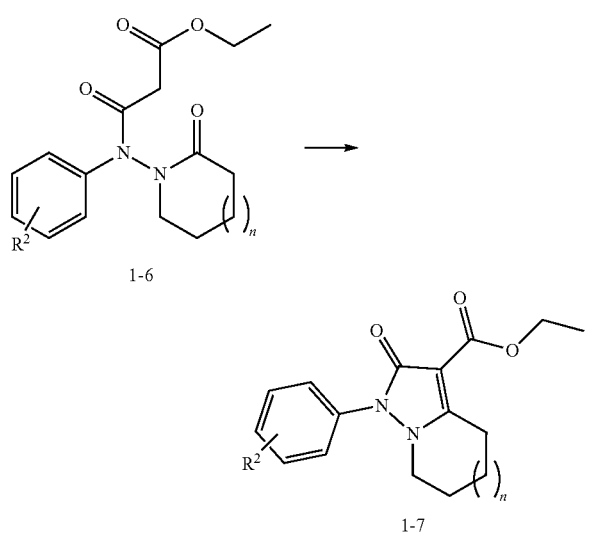

1-6

1-7

(b2) in an inert solvent, reacting formula 1-6 compound so as to provide formula 1-7 compound;

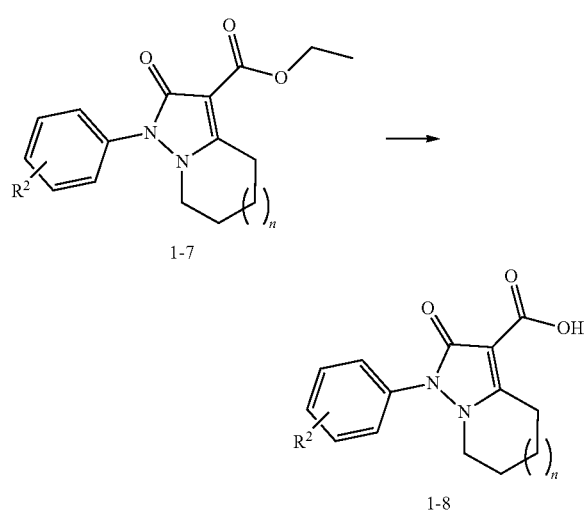

1-7

1-8

(b3) in an inert solvent, reacting formula 1-7 compound so as to provide formula 1-8 compound;

In the third aspect of the present invention, a pharmaceutical composition is provided, wherein the pharmaceutical composition comprising: therapeutically effective amount of Formula I compound of the first aspect of the invention, or the pharmaceutically acceptable salt, racemate, R-isomer, S-isomer thereof or the mixture thereof, and optionally pharmaceutically acceptable carriers, excipients, adjuvants, accessories, and/or diluting agent.

In the fourth aspect of the present invention, a kinase inhibitor is provided, wherein the inhibitor comprising: one or more of therapeutically effective amount of formula I compound of the first aspect of the invention, or the pharmaceutically acceptable salt, racemate, R-isomer, S-isomer thereof or the mixture thereof, and optionally pharmaceutically acceptable carriers, excipients, adjuvants, accessories, and/or diluting agent; and the kinase is selected from the group consisting of AXL, c-Met, or combination thereof.

In the fifth aspect of the present invention, a use of the compound of formula I of the first aspect of the present invention is provided, wherein one or more uses selected from the group consisting of (i) treatment or prevention of diseases which relates to the activity or expression level of kinase; (ii) inhibiting the activity of kinase, or reducing the expression of kinase; (iii) preparing pharmaceutical composition for treating or preventing diseases related to kinase activity; (iv) preparing kinase inhibitor;

wherein the kinase is selected from the group consisting of AXL, c-Met, or combination thereof.

In another preferred embodiment, the disease is tumor, preferably the tumor selected from the group consisting of lung cancer, stomach cancer, liver cancer, kidney cancer, breast cancer, pancreatic cancer, colorectal cancer, ovarian cancer, prostate cancer, thyroid cancer, esophageal cancer, head and neck cancer, melanoma, glioma, acute myeloid leukemia, etc.

It should be understood that, in the present invention, each of the technical features specifically described above and below (such as those in the Examples) can be combined with each other, thereby constituting new or preferred technical solutions which need not be specified again herein.

DESCRIPTION OF THE DRAWINGS

FIG. 1 shows the zymogram selectivity of compound DC621044.

EMBODIMENTS FOR CARRYING OUT THE INVENTION

After long-term and in-depth research, the inventors designed and prepared a class of fused-cyclic pyrazolone formamide compound with novel structures. The compound can selectively inhibit kinases such as AXL, c-Met, and the like. The present invention is completed on this basis.

An object of the present invention is to provide a fused-cyclic pyrazolone formamide compound having the structure of formula I, or its pharmaceutically acceptable salt, racemate, R-isomer, S-isomer, or the mixture thereof.

Another object of the present invention is to provide a method for preparing the fused-cyclic pyrazolone formamide compound represented by the general formula I.

Another object of the present invention is to provide a pharmaceutical composition which comprises one or more of fused-cyclic pyrazolone formamide compound of the structure of formula I, or its pharmaceutically acceptable salt, racemate, R-isomer, S-isomer, or the mixture thereof.

Another object of the present invention is to provide an AXL inhibitor, which comprises one or more of fused-cyclic pyrazolone formamide compound represented by the general formula I, its pharmaceutically acceptable salt, racemate, R-isomer, S-isomer, or mixture thereof.

Another object of the present invention is to provide use of above fused-cyclic pyrazolone formamide compound having the structure of formula I, or its pharmaceutically acceptable salt, racemate, R-isomer, S-isomer, or the mixture thereof in treating malignant tumor diseases.

Terms

In the present invention, unless otherwise specified, the terms used have the general meaning known by those skilled in the art.

In the present invention, the term "$C_1$-$C_6$ alkyl" refers to linear or branched alkyl with 1 to 6 carbon atoms, including but not limited to methyl, ethyl, propyl, isopropyl, butyl, isobutyl, sec-butyl, tert-butyl, pentyl and hexyl, or the like; preferably ethyl, propyl, isopropyl, butyl, isobutyl, sec-butyl and tert-butyl, etc.

In the present invention, the term "$C_1$-$C_6$ alkoxy" refers to a straight or branched chain alkoxy group having 1 to 6 carbon atoms, including but not limited to methoxy, ethoxy, propoxy, isopropoxy, butoxy, iso-butoxy, butoxy, etc.

In the present invention, the term "$C_2$-$C_6$ alkenyl" refers to a straight or branched alkenyl group having 2 to 6 carbon atoms containing a double bond, including but not limited to vinyl, propenyl, butenyl, isobutenyl, pentenyl and hexenyl, etc.

In the present invention, the term "$C_2$-$C_6$ alkynyl" refers to a straight or branched alkynyl group having 2 to 6 carbon atoms containing a triple bond, including but not limited to ethynyl, propynyl, butynyl, isobutynyl, pentynyl and hexynyl, etc. In the present invention, the term "$C_3$-$C_8$ cycloalkyl" refers to a cyclic alkyl having 3 to 8 carbon atoms on the ring, including but not limited to cyclopropyl, cyclobutyl, cyclopentyl, cyclohexyl, cycloheptyl, cyclooctyl and cyclodecyl, etc. Other "cycloalkyl" terms have similar meaning.

In the present invention, the term "$C_6$-$C_{10}$ aryl" refers to aryl groups having 6 to 10 carbon atoms which do not comprise heteroatoms on the ring, such as phenyl, naphthyl, etc.

The term "$C_6$-$C_{12}$ aryl" has a similar meaning.

Fused-Cyclic Pyrazolone Formamide Compound

The present invention provides a fused-cyclic pyrazolone formamide compound having the structure of formula I, or its racemate, R-isomer, S-isomer, pharmaceutically acceptable salt or mixture thereof:

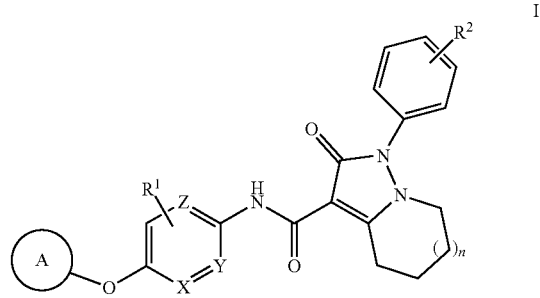

In a more preferred embodiment of the present invention, the compounds of general formula I of the present invention are preferably specific compounds as follows:

| No. | Name | Structure |
|---|---|---|
| DC621001 | N-(4-((6,7-dimethoxyquinoline-4-yl)oxy)-3-fluorophenyl)-2-oxo-1-phenyl-1,2,4,5,6,7-hexahydropyrazolo[1,5-a]pyridine-3-formamide | 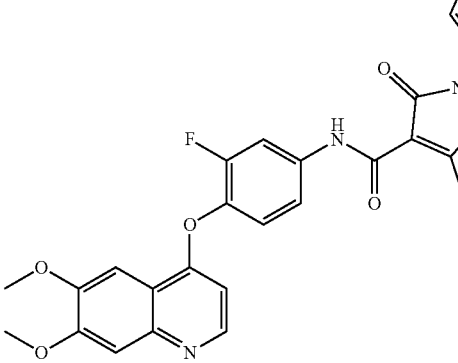 |
| DC621002 | N-(6-((6,7-dimethoxyquinoline-4-yl)oxy)pyridine-3-yl)-2-oxo-1-phenyl-1,2,4,5,6,7-hexahydropyrazolo[1,5-a]pyridine-3-formamide | 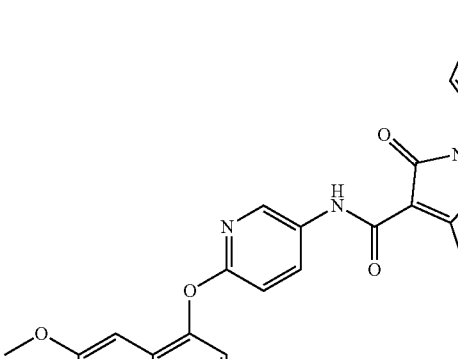 |

-continued

| No. | Name | Structure |
| --- | --- | --- |
| DC621004 | N-(4-((6,7-dimethoxyquinazoline-4-yl)oxy)phenyl)-2-oxo-1-phenyl-1,2,4,5,6,7-hexahydropyrazolo[1,5-a]pyridine-3-formamide | |
| DC621006 | N-(4-(imidazo[1,2-a]pyrazine-8-yloxy)phenyl)-2-oxo-1-phenyl-1,2,4,5,6,7-hexahydropyrazolo[1,5-a]pyridine-3-formamide | |
| DC621007 | N-(4-([1,2,4]triazolo[4,3-b]pyridazine-6-yloxy)phenyl)-2-oxo-1-phenyl-1,2,4,5,6,7-hexahydropyrazolo[1,5-a]pyridine-3-formamide | |

-continued
| No. | Name | Structure |
|---|---|---|
| DC621008 | 2-oxo-1-phenyl-N-(4-(pyrazolo[1,5-a]pyrimidine-5-yloxy)phenyl)-1,2,4,5,6,7-hexahydropyrazolo[1,5-a]pyridine-3-formamide | 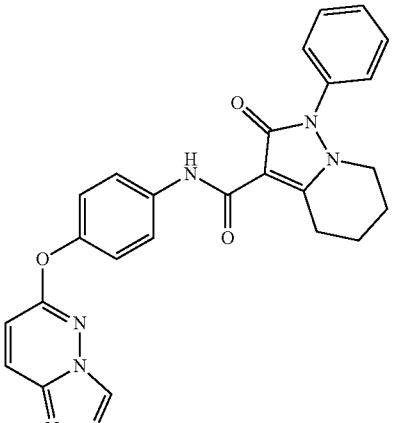 |
| DC621009 | N-(3-fluoro-4-(imidazo[1,2-a]pyridine-8-yloxy)phenyl)-2-oxo-1-phenyl-1,2,4,5,6,7-hexahydropyrazolo[1,5-a]pyridine-3-formamide | 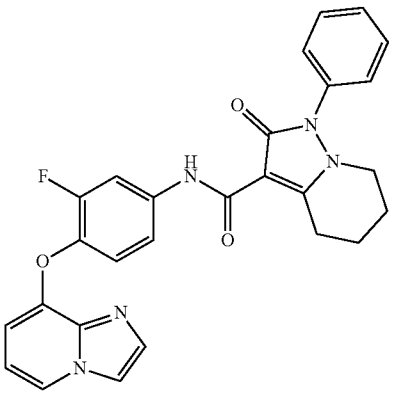 [SMILES: O=C(Nc1ccc(Oc2cccn3ccnc23)c(F)c1)c1c2n(n(-c3ccccc3)c1=O)CCCC2] |
| DC621010 | N-(6-(imidazo[1,2-a]pyridine-8-yloxy)pyridine-3-yl)-2-oxo-1-phenyl-1,2,4,5,6,7-hexahydropyrazolo[1,5-a]pyridine-3-formamide | 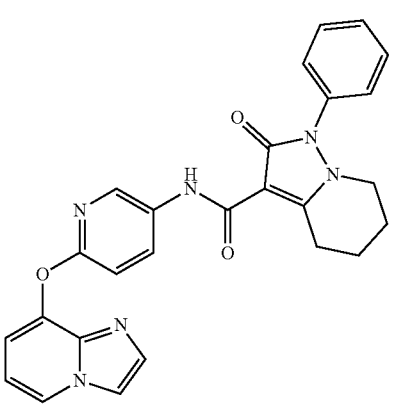 [SMILES: O=C(Nc1ccc(Oc2cccn3ccnc23)nc1)c1c2n(n(-c3ccccc3)c1=O)CCCC2] |

-continued
| No. | Name | Structure |
|---|---|---|
| DC621011 | N-(4-((6,7-dimethoxyquinazoline-4-yl)oxy)-3-fluorophenyl)-2-oxo-1-phenyl-1,2,4,5,6,7-hexahydropyrazolo[1,5-a]pyridine-3-formamide | 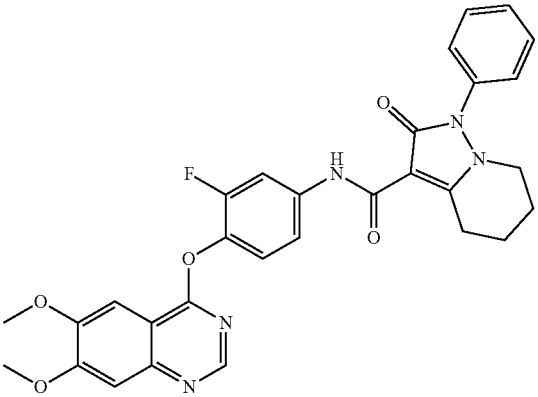 [SMILES: COc1cc2ncnc(Oc3ccc(NC(=O)c4c5n(n(-c6ccccc6)c4=O)CCCC5)cc3F)c2cc1OC] |
| DC621012 | N-(4-((6,7-bis(2-methoxyethoxy)quinazolin-4-yl)oxy)-3-fluorophenyl)-2-oxo-1-phenyl-1,2,4,5,6,7-hexahydropyrazolo[1,5-a]pyridine-3-formamide | 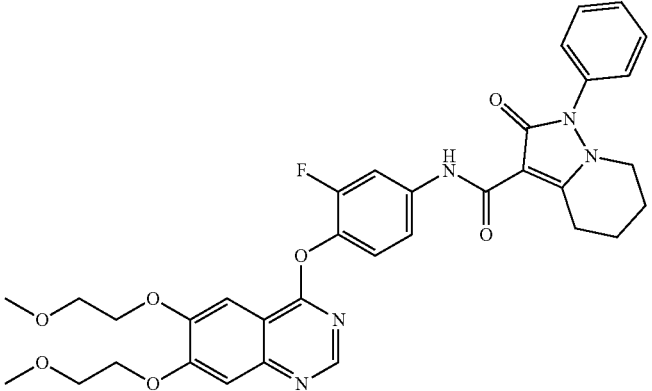 [SMILES: COCCOc1cc2ncnc(Oc3ccc(NC(=O)c4c5n(n(-c6ccccc6)c4=O)CCCC5)cc3F)c2cc1OCCOC] |
| DC621013 | N-(4-((6,7-bis(2-methoxyethoxy)quinazolin-4-yl)oxy)phenyl)-2-oxo-1-phenyl-1,2,4,5,6,7-hexahydropyrazolo[1,5-a]pyridine-3-formamide | 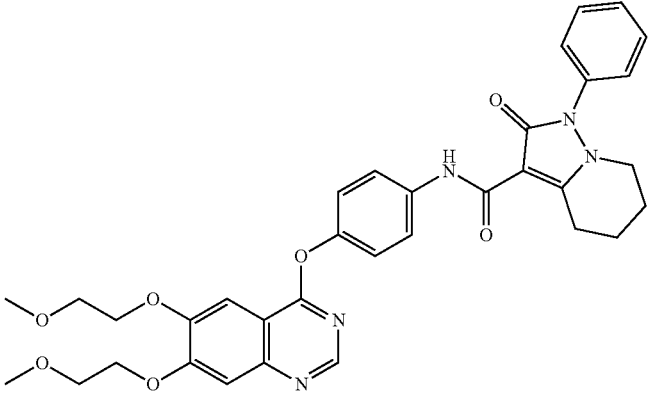 [SMILES: COCCOc1cc2ncnc(Oc3ccc(NC(=O)c4c5n(n(-c6ccccc6)c4=O)CCCC5)cc3)c2cc1OCCOC] |

-continued
| No. | Name | Structure |
|---|---|---|
| DC621014 | N-(4-((7-benzyloxy-6-methoxyquinazolin-4-yl)oxy)-3-fluorophenyl)-2-oxo-1-phenyl-1,2,4,5,6,7-hexahydropyrazolo[1,5-a]pyridine-3-formamide | 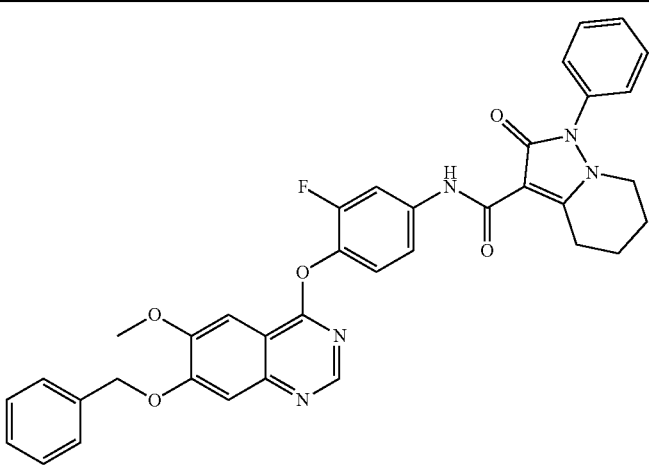 |
| DC621015 | N-(4-((7-benzyloxy-6-methoxyquinazolin-4-yl)oxy)phenyl)-2-oxo-1-phenyl-1,2,4,5,6,7-hexahydropyrazolo[1,5-a]pyridine-3-formamide | 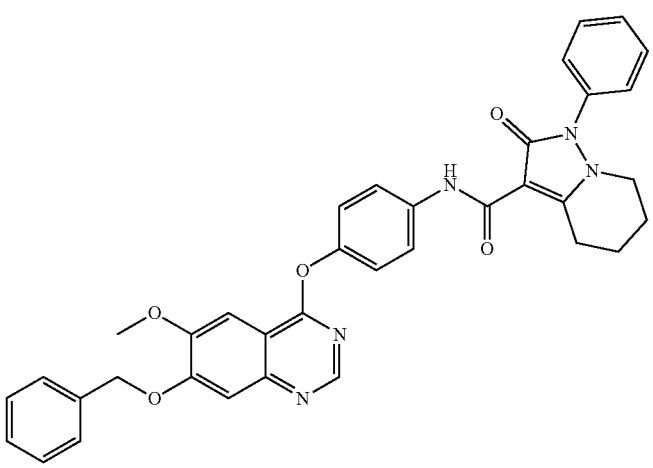 [SMILES: COc1cc2c(Oc3ccc(NC(=O)c4c5n(n(-c6ccccc6)c4=O)CCCC5)cc3)ncnc2cc1OCc1ccccc1] |
| DC621016 | N-(3-fluoro-4-(quinolin-4-yloxy)phenyl)-2-oxo-1-phenyl-1,2,4,5,6,7-hexahydropyrazolo[1,5-a]pyridine-3-formamide | 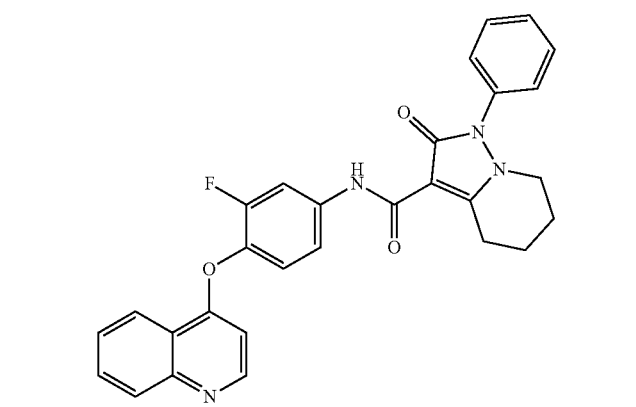 [SMILES: O=C(Nc1ccc(Oc2ccnc3ccccc23)c(F)c1)c1c2n(n(-c3ccccc3)c1=O)CCCC2] |

| No. | Name | Structure |
|---|---|---|
| DC621017 | N-(4-((6,7-dimethoxyquinazoline-4-yl)oxy)-3-methoxyphenyl)-2-oxo-1-phenyl-1,2,4,5,6,7-hexahydropyrazolo[1,5-a]pyridine-3-formamide | 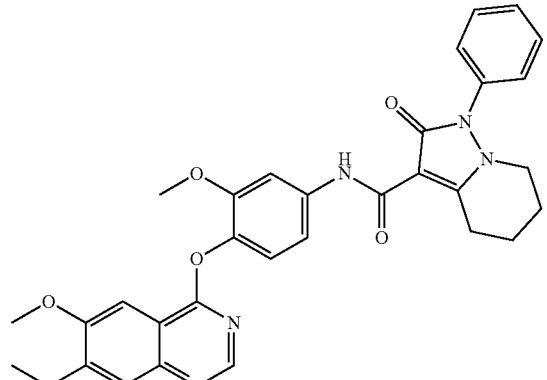 |
| DC621018 | N-(4-((6,7-bis(2-methoxyethoxy)quinazolin-4-yl)oxy)-3-methoxyphenyl)-2-oxo-1-phenyl-1,2,4,5,6,7-hexahydropyrazolo[1,5-a]pyridine-3-formamide | 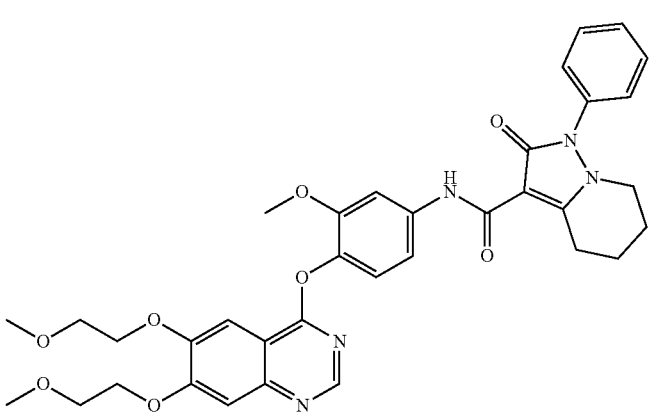 [SMILES: COCCOc1cc2ncnc(Oc3ccc(NC(=O)c4c5n(n(-c6ccccc6)c4=O)CCCC5)cc3OC)c2cc1OCCOC] |
| DC621019 | N-(4-((6,7-dimethoxyquinazoline-4-yl)oxy)-3-methylphenyl)-2-oxo-1-phenyl-1,2,4,5,6,7-hexahydropyrazolo[1,5-a]pyridine-3-formamide | 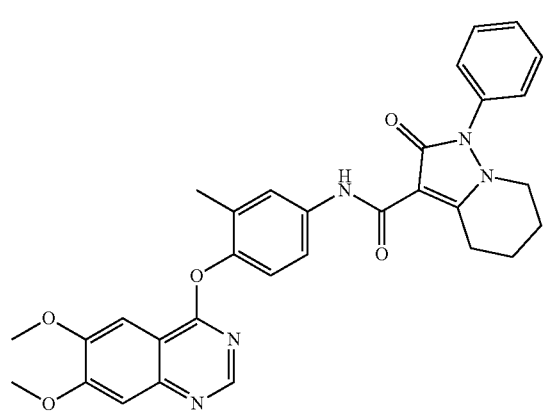 [SMILES: COc1cc2ncnc(Oc3ccc(NC(=O)c4c5n(n(-c6ccccc6)c4=O)CCCC5)cc3C)c2cc1OC] |
| DC621020 | N-(4-((6,7-bis(2-methoxyethoxy)quinazolin-4-yl)oxy)-3-methylphenyl)-2-oxo-1-phenyl-1,2,4,5,6,7-hexahydropyrazolo[1,5-a]pyridine-3-formamide | 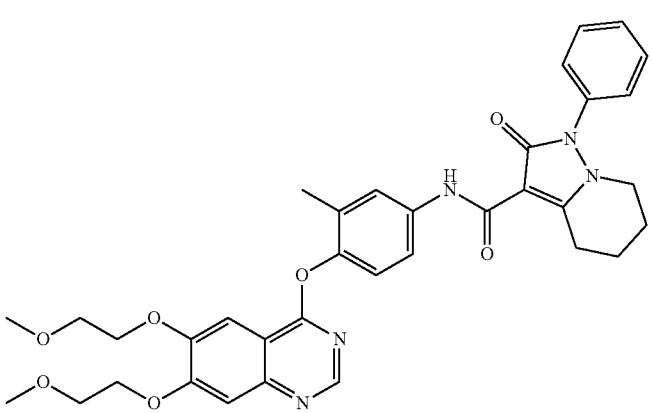 [SMILES: COCCOc1cc2ncnc(Oc3ccc(NC(=O)c4c5n(n(-c6ccccc6)c4=O)CCCC5)cc3C)c2cc1OCCOC] |

-continued
| No. | Name | Structure |
|---|---|---|
| DC621021 | N-(4-((6,7-dimethoxyquinazoline-4-yl)oxy)-2-fluorophenyl)-2-oxo-1-phenyl-1,2,4,5,6,7-hexahydropyrazolo[1,5-a]pyridine-3-formamide | 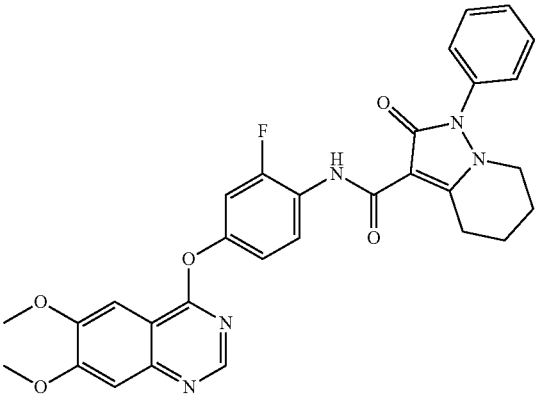 [SMILES: COc1cc2ncnc(Oc3ccc(NC(=O)c4c5n(n(-c6ccccc6)c4=O)CCCC5)c(F)c3)c2cc1OC] |
| DC621022 | 1-(2,5-difluorophenyl)-N-(4-((6,7-dimethoxyquinazoline-4-yl)oxy)phenyl)-2-oxo-1,2,4,5,6,7-hexahydropyrazolo[1,5-a]pyridine-3-formamide | 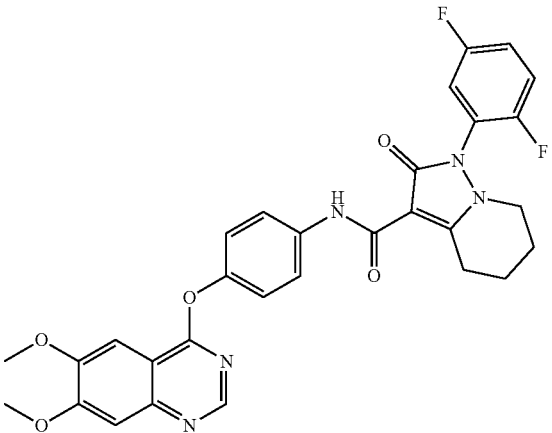 [SMILES: COc1cc2ncnc(Oc3ccc(NC(=O)c4c5n(n(-c6cc(F)ccc6F)c4=O)CCCC5)cc3)c2cc1OC] |
| DC621023 | 1-(2,5-difluorophenyl)-N-(4-((6,7-dimethoxyquinazoline-4-yl)oxy)-3-fluorophenyl)-2-oxo-1,2,4,5,6,7-hexahydropyrazolo[1,5-a]pyridine-3-formamide | 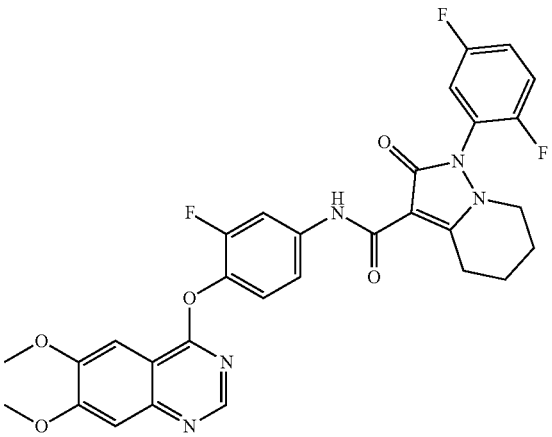 [SMILES: COc1cc2ncnc(Oc3ccc(NC(=O)c4c5n(n(-c6cc(F)ccc6F)c4=O)CCCC5)cc3F)c2cc1OC] |

-continued

| No. | Name | Structure |
|---|---|---|
| DC621024 | 1-(2,5-difluorophenyl)-N-(4-((6,7-bis(2-methoxyethoxy)quinazolin-4-yl)oxy)-3-fluorophenyl)-2-oxo-1,2,4,5,6,7-hexahydropyrazolo[1,5-a]pyridine-3-formamide | |
| DC621025 | 1-(2,5-difluorophenyl)-N-(4-((6,7-bis(2-methoxyethoxy)quinazolin-4-yl)oxy)phenyl)-2-oxo-1,2,4,5,6,7-hexahydropyrazolo[1,5-a]pyridine-3-formamide | |
| DC621026 | 1-(2,5-difluorophenyl)-N-(4 ((7-benzyloxy-6-methoxyquinazolin-4-yl)oxy)-3-fluorophenyl)-2-oxo-1,2,4,5,6,7-hexahydropyrazolo[1,5-a]pyridine-3-formamide | |

| No. | Name | Structure |
|---|---|---|
| DC621027 | 1-(2,5-difluorophenyl)-N-(4-((7-benzyloxy-6-methoxyquinazolin-4-yl)oxy)phenyl)-2-oxo-1,2,4,5,6,7-hexahydropyrazolo[1,5-a]pyridine-3-formamide | |
| DC621028 | 1-(2,5-difluorophenyl)-N-(3-fluoro-4-(quinolin-4-yloxy)phenyl)-2-oxo-1,2,4,5,6,7-hexahydropyrazolo[1,5-a]pyridine-3-formamide | |
| DC621029 | 1-(2,5-difluorophenyl)-N-(4-((6,7-dimethoxyquinazoline-4-yl)oxy)-3-methoxyphenyl)-2-oxo-1,2,4,5,6,7-hexahydropyrazolo[1,5-a]pyridine-3-formamide | |

| No. | Name | Structure |
| --- | --- | --- |
| DC621030 | 1-(2,5-difluorophenyl)-N-(4-((6,7-bis(2-methoxyethoxy)quinazolin-4-yl)oxy)-3-methoxyphenyl)-2-oxo-1,2,4,5,6,7-hexahydropyrazolo[1,5-a]pyridine-3-formamide | |
| DC621031 | 1-(2,5-difluorophenyl)-N-(4-((6,7-dimethoxyquinazoline-4-yl)oxy)-3-methylphenyl)-2-oxo-1,2,4,5,6,7-hexahydropyrazolo[1,5-a]pyridine-3-formamide | |
| DC621032 | 1-(2,5-difluorophenyl)-N-(4-((6,7-bis(2-methoxyethoxy)quinazolin-4-yl)oxy)-3-methylphenyl)-2-oxo-1,2,4,5,6,7-hexahydropyrazolo[1,5-a]pyridine-3-formamide | |

| No. | Name | Structure |
|---|---|---|
| DC621033 | N-(4-((6,7-dimethoxyquinazoline-4-yl)oxy)phenyl)-1-(2-fluorophenyl)-2-oxo-1,2,4,5,6,7-hexahydropyrazolo[1,5-a]pyridine-3-formamide | 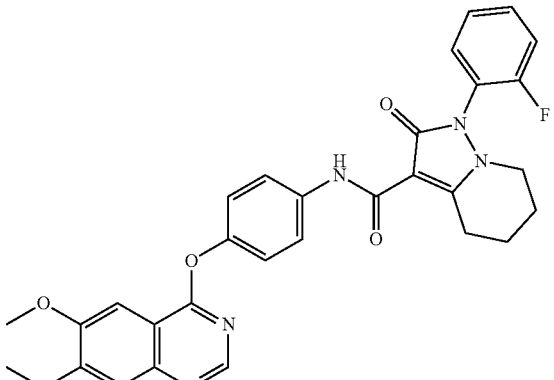 |
| DC621034 | N-(4-((6,7-dimethoxyquinazoline-4-yl)oxy)-3-fluorophenyl)-1-(2-fluorophenyl)-2-oxo-1,2,4,5,6,7-hexahydropyrazolo[1,5-a]pyridine-3-formamide | 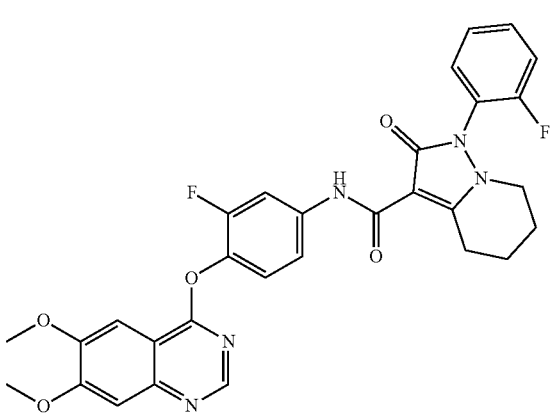 [SMILES: COc1cc2ncnc(Oc3ccc(NC(=O)c4c5n(n(-c6ccccc6F)c4=O)CCCC5)cc3F)c2cc1OC] |
| DC621035 | N-(4-((6,7-bis(2-methoxyethoxy)quinazolin-4-yl)oxy)-3-fluorophenyl)-1-(2-fluorophenyl)-2-oxo-1,2,4,5,6,7-hexahydropyrazolo[1,5-a]pyridine-3-formamide | 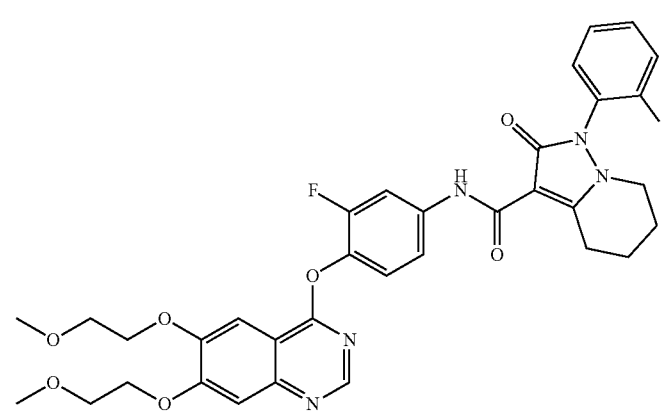 |
| DC621036 | N-(4-((6,7-bis(2-methoxyethoxy)quinazolin-4-yl)oxy)phenyl)-1-(2-fluorophenyl)-2-oxo-1,2,4,5,6,7-hexahydropyrazolo[1,5-a]pyridine-3-formamide | 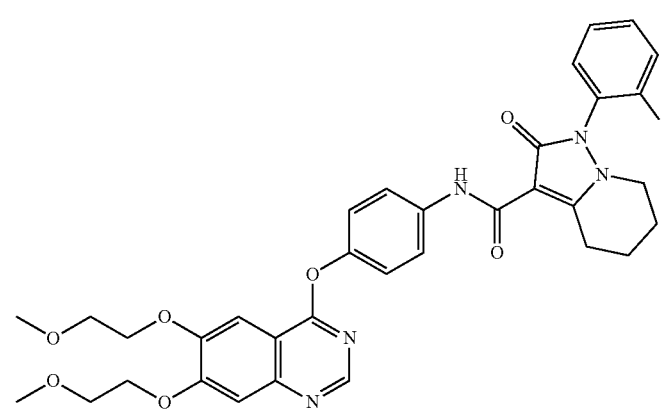 |

| No. | Name | Structure |
| --- | --- | --- |
| DC621037 | N-(4-((7-benzyloxy-6-methoxyquinazolin-4-yl)oxy)-3-fluorophenyl)-1-(2-fluorophenyl)-2-oxo-1,2,4,5,6,7-hexahydropyrazolo[1,5-a]pyridine-3-formamide | |
| DC621038 | N-(3-fluoro-4-(quinolin-4-yloxy)phenyl)-1-(2-fluorophenyl)-2-oxo-1,2,4,5,6,7-hexahydropyrazolo[1,5-a]pyridine-3-formamide | |
| DC621039 | N-(4-((6,7-dimethoxyquinazoline-4-yl)oxy)-3-methoxyphenyl)-1-(2-fluorophenyl)-2-oxo-1,2,4,5,6,7-hexahydropyrazolo[1,5-a]pyridine-3-formamide | |

| No. | Name | Structure |
|---|---|---|
| DC621040 | N-(4-((6,7-bis(2-methoxyethoxy)quinazolin-4-yl)oxy)-3-methoxyphenyl)-1-(2-fluorophenyl)-2-oxo-1,2,4,5,6,7-hexahydropyrazolo[1,5-a]pyridine-3-formamide | 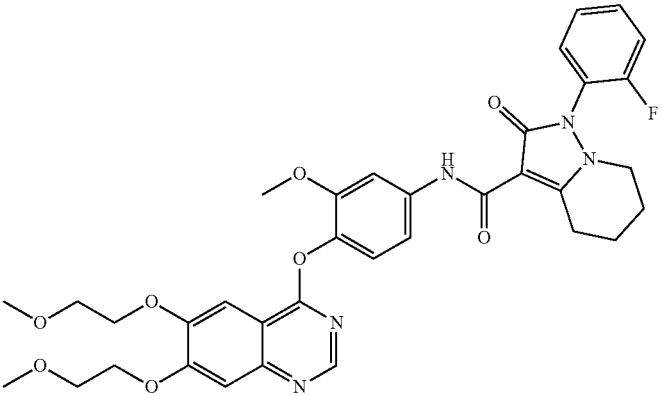 [SMILES: COCCOc1cc2ncnc(Oc3ccc(NC(=O)c4c5n(n(-c6ccccc6F)c4=O)CCCC5)cc3OC)c2cc1OCCOC] |
| DC621041 | N-(4-((6,7-dimethoxyquinazoline-4-yl)oxy)-3-methylphenyl)-1-(2-fluorophenyl)-2-oxo-1,2,4,5,6,7-hexahydropyrazolo[1,5-a]pyridine-3-formamide | 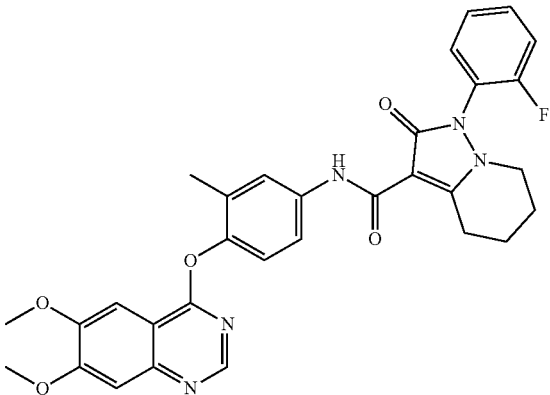 |
| DC621042 | N-(4-((6,7-bis(2-methoxyethoxy)quinazolin-4-yl)oxy)-3-methylphenyl)-1-(2-fluorophenyl)-2-oxo-1,2,4,5,6,7-hexahydropyrazolo[1,5-a]pyridine-3-formamide | 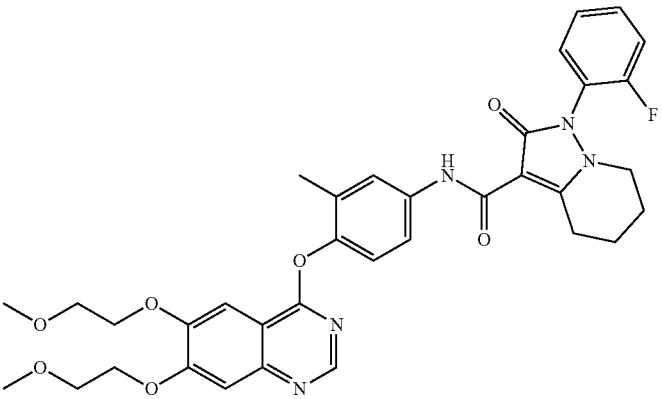 [SMILES: COCCOc1cc2ncnc(Oc3ccc(NC(=O)c4c5n(n(-c6ccccc6F)c4=O)CCCC5)cc3C)c2cc1OCCOC] |

-continued

| No. | Name | Structure |
|---|---|---|
| DC621043 | N-(4-((6,7-dimethoxyquinazoline-4-yl)oxy)-3-fluorophenyl)-1-(4-fluorophenyl)-2-oxo-1,2,4,5,6,7-hexahydropyrazolo[1,5-a]pyridine-3-formamide | 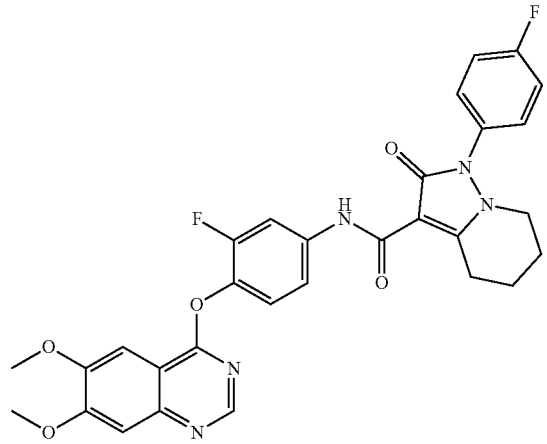 [SMILES: COc1cc2ncnc(Oc3ccc(NC(=O)c4c5n(n(-c6ccc(F)cc6)c4=O)CCCC5)cc3F)c2cc1OC] |
| DC621044 | N-(4-((6,7-bis(2-methoxyethoxy)quinazolin-4-yl)oxy)-3-fluorophenyl)-1-(4-fluorophenyl)-2-oxo-1,2,4,5,6,7-hexahydropyrazolo[1,5-a]pyridine-3-formamide | 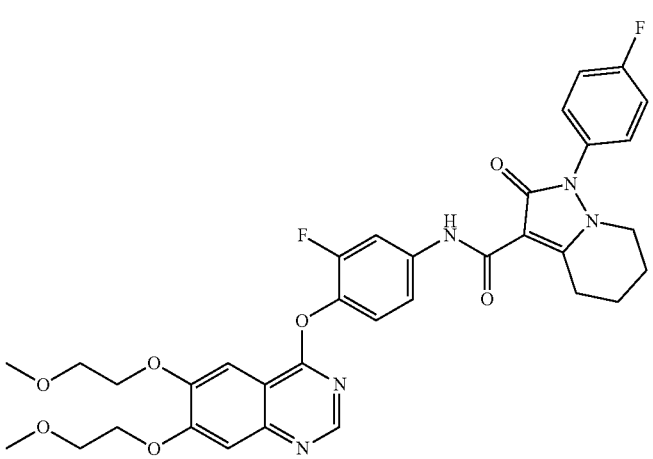 |
| DC621045 | N-(4-((6,7-bis(2-methoxyethoxy)quinazolin-4-yl)oxy)phenyl)-1-(4-fluorophenyl)-2-oxo-1,2,4,5,6,7-hexahydropyrazolo[1,5-a]pyridine-3-formamide | 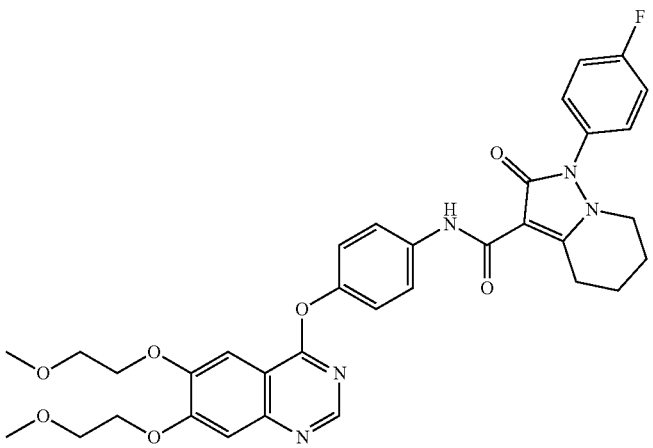 [SMILES: COCCOc1cc2ncnc(Oc3ccc(NC(=O)c4c5n(n(-c6ccc(F)cc6)c4=O)CCCC5)cc3)c2cc1OCCOC] |

| No. | Name | Structure |
| --- | --- | --- |
| DC621046 | N-(4-((7-benzyloxy-6-methoxyquinazolin-4-yl)oxy)-3-fluorophenyl)-1-(4-fluorophenyl)-2-oxo-1,2,4,5,6,7-hexahydropyrazolo[1,5-a]pyridine-3-formamide | |
| DC621047 | N-(4-((6,7-dimethoxyquinazoline-4-yl)oxy)-3-methoxyphenyl)-1-(4-fluorophenyl)-2-oxo-1,2,4,5,6,7-hexahydropyrazolo[1,5-a]pyridine-3-formamide | |
| DC621048 | N-(4-((6,7-bis(2-methoxyethoxy)quinazolin-4-yl)oxy)-3-methoxyphenyl)-1-(4-fluorophenyl)-2-oxo-1,2,4,5,6,7-hexahydropyrazolo[1,5-a]pyridine-3-formamide | |

-continued

| No. | Name | Structure |
|---|---|---|
| DC621049 | N-(4-((6,7-dimethoxyquinazoline-4-yl)oxy)-3-methylphenyl)-1-(4-fluorophenyl)-2-oxo-1,2,4,5,6,7-hexahydropyrazolo[1,5-a]pyridine-3-formamide | 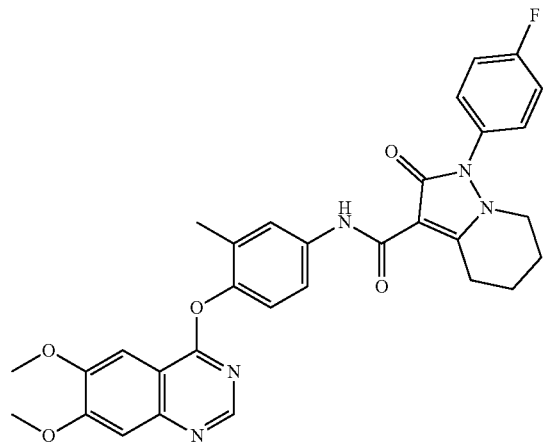 [SMILES: COc1cc2ncnc(Oc3ccc(NC(=O)c4c5n(n(-c6ccc(F)cc6)c4=O)CCCC5)cc3C)c2cc1OC] |
| DC621050 | N-(4-((6,7-bis(2-methoxyethoxy)quinazolin-4-yl)oxy)-3-methylphenyl)-1-(4-fluorophenyl)-2-oxo-1,2,4,5,6,7-hexahydropyrazolo[1,5-a]pyridine-3-formamide | 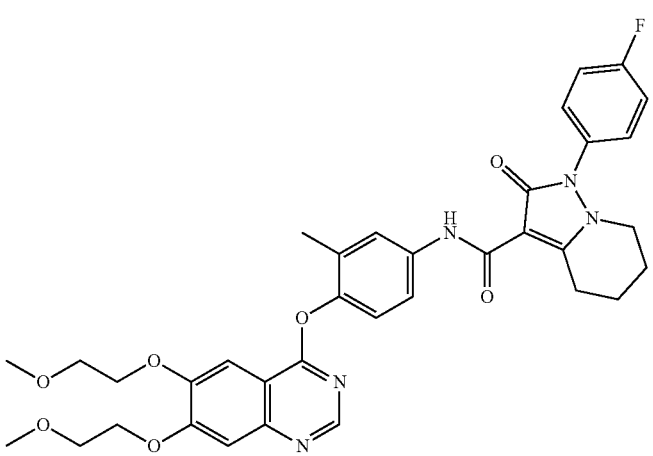 [SMILES: COCCOc1cc2ncnc(Oc3ccc(NC(=O)c4c5n(n(-c6ccc(F)cc6)c4=O)CCCC5)cc3C)c2cc1OCCOC] |
| DC621051 | N-(4-((6,7-bis(2-methoxyethoxy)quinazolin-4-yl)oxy)-2-fluorophenyl)-2-oxo-1-phenyl-1,2,4,5,6,7-hexahydropyrazolo[1,5-a]pyridine-3-formamide | 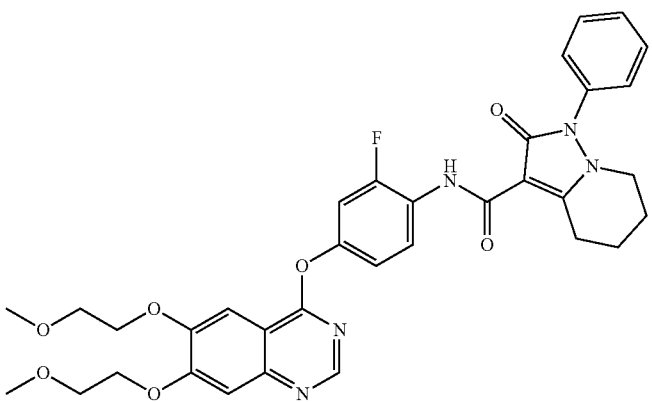 [SMILES: COCCOc1cc2ncnc(Oc3ccc(NC(=O)c4c5n(n(-c6ccccc6)c4=O)CCCC5)c(F)c3)c2cc1OCCOC] |

| No. | Name | Structure |
|---|---|---|
| DC621052 | N-(3-fluoro-4-((5-phenyl-7H-pyrrolo[2,3-d]pyrimidin-4-yl)oxy)phenyl)-2-oxo-1-phenyl-1,2,4,5,6,7-hexahydropyrazolo[1,5-a]pyridine-3-formamide | |
| DC621053 | 1-(2,5-difluorophenyl)-N-(4-((6,7-dimethoxyquinazoline-4-yl)oxy)-2-fluorophenyl)-2-oxo-1,2,4,5,6,7-hexahydropyrazolo[1,5-a]pyridine-3-formamide | |
| DC621054 | 1-(2,5-difluorophenyl)-N-(4-((6,7-bis(2-methoxyethoxy)quinazolin-4-yl)oxy)-2-fluorophenyl)-2-oxo-1,2,4,5,6,7-hexahydropyrazolo[1,5-a]pyridine-3-formamide | |
| DC621055 | 1-(2,5-difluorophenyl)-N-(3-fluoro-4-((5-phenyl-7H-pyrrolo[2,3-d]pyrimidin-4-yl)oxy)phenyl)-2-oxo-1,2,4,5,6,7-hexahydropyrazolo[1,5-a]pyridine-3-formamide | |

| No. | Name | Structure |
|---|---|---|
| DC621056 | N-(4-((6,7-dimethoxyquinazoline-4-yl)oxy)-2-fluorophenyl)-1-(2-fluorophenyl)-2-oxo-1,2,4,5,6,7-hexahydropyrazolo[1,5-a]pyridine-3-formamide | |
| DC621057 | N-(4-((6,7-bis(2-methoxyethoxy)quinazolin-4-yl)oxy)-2-fluorophenyl)-1-(2-fluorophenyl)-2-oxo-1,2,4,5,6,7-hexahydropyrazolo[1,5-a]pyridine-3-formamide | |
| DC621058 | N-(3-fluoro-4-((5-phenyl-7H-pyrrolo[2,3-d]pyrimidin-4-yl)oxy)phenyl)-1-(2-fluorophenyl)-2-oxo-1,2,4,5,6,7-hexahydropyrazolo[1,5-a]pyridine-3-formamide | |

| No. | Name | Structure |
|---|---|---|
| DC621059 | N-(4-((6,7-dimethoxyquinazoline-4-yl)oxy)-2-fluorophenyl)-1-(4-fluorophenyl)-2-oxo-1,2,4,5,6,7-hexahydropyrazolo[1,5-a]pyridine-3-formamide | 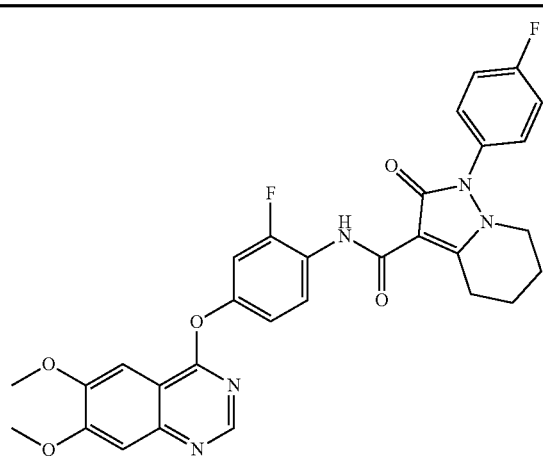 |
| DC621060 | N-(4-((6,7-bis(2-methoxyethoxy)quinazolin-4-yl)oxy)-2-fluorophenyl)-1-(4-fluorophenyl)-2-oxo-1,2,4,5,6,7-hexahydropyrazolo[1,5-a]pyridine-3-formamide | 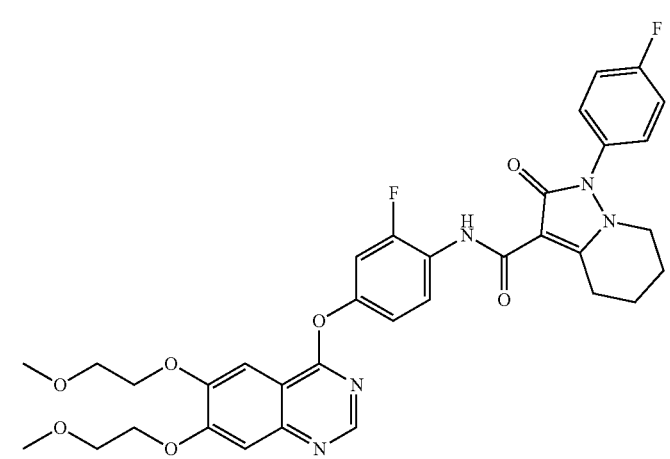 [SMILES: COCCOc1cc2ncnc(Oc3ccc(NC(=O)c4c5n(n(-c6ccc(F)cc6)c4=O)CCCC5)c(F)c3)c2cc1OCCOC] |
| DC621061 | N-(3-fluoro-4-((7,8,10,11,13,14 hexahydro-[1,4,7,10] tetraoxacyclododecane [2,3-g]quinazolin-4-yl)oxy)phenyl)-2-oxo-1-phenyl-1,2,4,5,6,7-hexahydropyrazolo[1,5-a]pyridine-3-formamide | 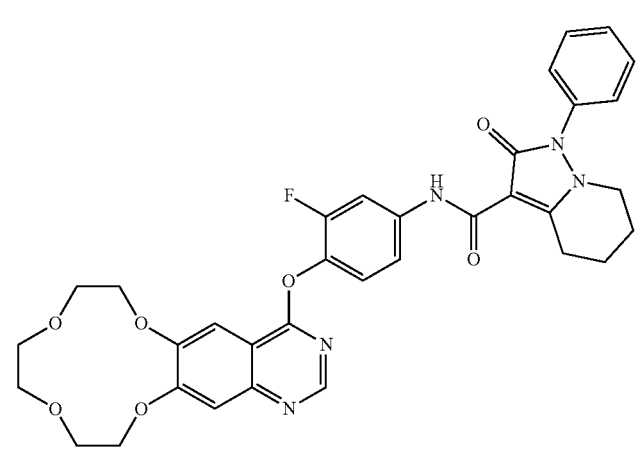 [SMILES: O=C(Nc1ccc(Oc2ncnc3cc4c(cc23)OCCOCCOCCO4)c(F)c1)c1c2n(n(-c3ccccc3)c1=O)CCCC2] |

| No. | Name | Structure |
| --- | --- | --- |
| DC621062 | N-(3-chloro-4-((7,8,10,11,13,14 hexahydro-[1,4,7,10] tetraoxacyclododecane [2,3-g]quinazolin-4-yl)oxy)phenyl)-2-oxo-1-phenyl-1,2,4,5,6,7-hexahydropyrazolo[1,5-a]pyridine-3-formamide | |
| DC621063 | 1-(2,5-difluorophenyl)-N-(3-fluoro-4-((7,8,10,11,13,14hexahydro-[1,4,7,10] tetraoxacyclododecane [2,3-g]quinazolin-4-yl)oxy)phenyl)-2-oxo-1,2,4,5,6,7-hexahydropyrazolo[1,5-a]pyridine-3-formamide | |
| DC621064 | 1-(2,5-difluorophenyl)-N-(3-chloro-4-((7,8,10,11,13,14hexahydro-[1,4,7,10] tetraoxacyclododecane[2,3-g]quinazolin-4-yl)oxy)phenyl)-2-oxo-1,2,4,5,6,7-hexahydropyrazolo[1,5-a]pyridine-3-formamide | |

-continued

| No. | Name | Structure |
|---|---|---|
| DC621065 | N-(3-fluoro-4-((7,8,10,11,13,14 hexahydro-[1,4,7,10]tetraoxacyclododecane[2,3-g]quinazolin-4-yl)oxy)phenyl)-1-(2-fluorophenyl)-2-oxo-1,2,4,5,6,7-hexahydropyrazolo[1,5-a]pyridine-3-formamide | |
| DC621066 | N-(3-chloro-4-((7,8,10,11,13,14 hexahydro-[1,4,7,10]tetraoxacyclododecane[2,3-g]quinazolin-4-yl)oxy)phenyl)-1-(2-fluorophenyl)-2-oxo-1,2,4,5,6,7-hexahydropyrazolo[1,5-a]pyridine-3-formamide | |
| DC621067 | N-(3-fluoro-4-((7,8,10,11,13,14 hexahydro-[1,4,7,10]tetraoxacyclododecane[2,3-g]quinazolin-4-yl)oxy)phenyl)-1-(4-fluorophenyl)-2-oxo-1,2,4,5,6,7-hexahydropyrazolo[1,5-a]pyridine-3-formamide | |

| No. | Name | Structure |
|---|---|---|
| DC621068 | N-(3-chloro-4-((7,8,10,11,13,14 hexahydro-[1,4,7,10]tetraoxacyclododecane[2,3-g]quinazolin-4-yl)oxy)phenyl)-1-(4-fluorophenyl)-2-oxo-1,2,4,5,6,7-hexahydropyrazolo[1,5-a]pyridine-3-formamide | 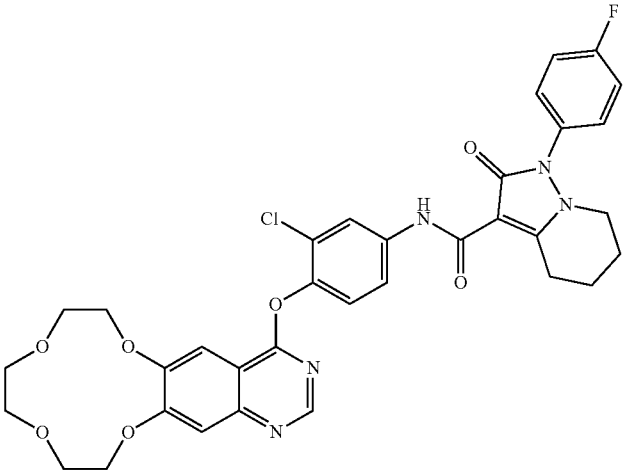 [SMILES: O=C(Nc1ccc(Oc2ncnc3cc4c(cc23)OCCOCCOCCO4)c(Cl)c1)c1c2n(n(-c3ccc(F)cc3)c1=O)CCCC2] |
| DC621069 | N-(4-((6,7-dimethoxyquinazoline-4-yl)oxy)-3-chlorophenyl)-2-oxo-1-phenyl-1,2,4,5,6,7-hexahydropyrazolo[1,5-a]pyridine-3-formamide | 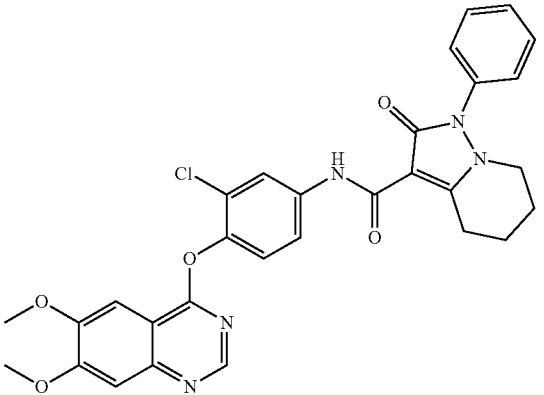 [SMILES: COc1cc2ncnc(Oc3ccc(NC(=O)c4c5n(n(-c6ccccc6)c4=O)CCCC5)cc3Cl)c2cc1OC] |
| DC621070 | N-(4-((6,7-bis(2-methoxyethoxy)quinazolin-4-yl)oxy)-3-chlorophenyl)-2-oxo-1-phenyl-1,2,4,5,6,7-hexahydropyrazolo[1,5-a]pyridine-3-formamide | 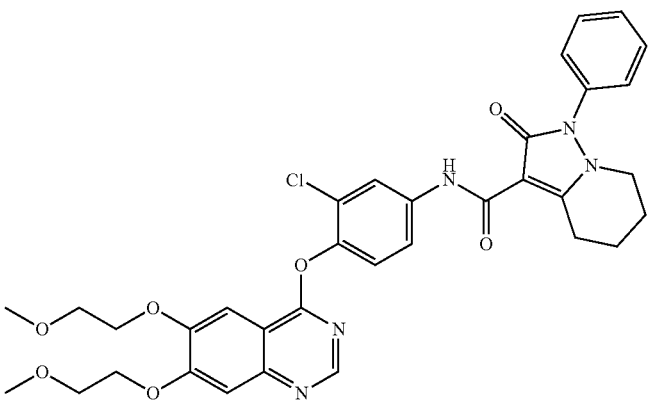 |

-continued

| No. | Name | Structure |
|---|---|---|
| DC621071 | N-(4-((6,7-dimethoxyquinazoline-4-yl)oxy)-3-trifluoromethylphenyl)-2-oxo-1-phenyl-1,2,4,5,6,7-hexahydropyrazolo[1,5-a]pyridine-3-formamide | |
| DC621072 | N-(4-((6,7-bis(2-methoxyethoxy)quinazolin-4-yl)oxy)-3-trifluoromethylphenyl)-2-oxo-1-phenyl-1,2,4,5,6,7-hexahydropyrazolo[1,5-a]pyridine-3-formamide | |
| DC621073 | N-(4-((6,7-dimethoxyquinazoline-4-yl)oxy)naphthalene-1-yl)-2-oxo-1-phenyl-1,2,4,5,6,7-hexahydropyrazolo[1,5-a]pyridine-3-formamide | |
| DC621074 | N-(4-((6,7-bis(2-methoxyethoxy)quinazolin-4-yl)oxy)naphthalene-1-yl)-2-oxo-1-phenyl-1,2,4,5,6,7-hexahydropyrazolo[1,5-a]pyridine-3-formamide | |

| No. | Name | Structure |
|---|---|---|
| DC621075 | N-(5-(6,7-dimethoxyquinazoline-4-yl)oxy)pyridine-2-yl)-2-oxo-1-phenyl-1,2,4,5,6,7-hexahydropyrazolo[1,5-a]pyridine-3-formamide | |
| DC621076 | N-(5-(6,7-bis(2-methoxyethoxy)quinazolin-4-yl)pyridine-2-yl)-2-oxo-1-phenyl-1,2,4,5,6,7-hexahydropyrazolo[1,5-a]pyridine-3-formamide | |
| DC621077 | (R)-N-(3-fluoro-4-((6-methoxy-7-((tetrahydrofuran-3-yl)oxy)quinazolin-4-yl)oxy)phenyl)-2-oxo-1-phenyl-1,2,4,5,6,7-hexahydropyrazolo[1,5-a]pyridine-3-formamide | |

-continued

| No. | Name | Structure |
|---|---|---|
| DC621078 | (S)-N-(3-fluoro-4-((6-methoxy-7-((tetrahydrofuran-3-yl)oxy)quinazolin-4-yl)oxy)phenyl)-2-oxo-1-phenyl-1,2,4,5,6,7-hexahydropyrazolo[1,5-a]pyridine-3-formamide | |
| DC621079 | 1-(2,5-difluorophenyl)-N-(4-((6,7-dimethoxyquinazoline-4-yl)oxy)-3-chlorophenyl)-2-oxo-1,2,4,5,6,7-hexahydropyrazolo[1,5-a]pyridine-3-formamide | |
| DC621080 | 1-(2,5-difluorophenyl)-N-(4-((6,7-bis(2-methoxyethoxy)quinazolin-4-yl)oxy)-3-chlorophenyl)-2-oxo-1,2,4,5,6,7-hexahydropyrazolo[1,5-a]pyridine-3-formamide | |

| No. | Name | Structure |
|---|---|---|
| DC621081 | 1-(2,5-difluorophenyl)-N-(4-((6,7-dimethoxyquinazoline-4-yl)oxy)-3-trifluoromethylphenyl)-2-oxo-1,2,4,5,6,7-hexahydropyrazolo[1,5-a]pyridine-3-formamide | 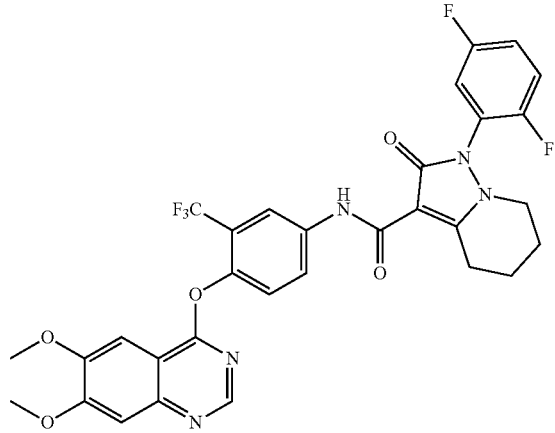 |
| DC621082 | 1-(2,5-difluorophenyl)-N-(4-((6,7-bis(2-methoxyethoxy)quinazolin-4-yl)oxy)-3-trifluoromethylphenyl)-2-oxo-1,2,4,5,6,7-hexahydropyrazolo[1,5-a]pyridine-3-formamide | 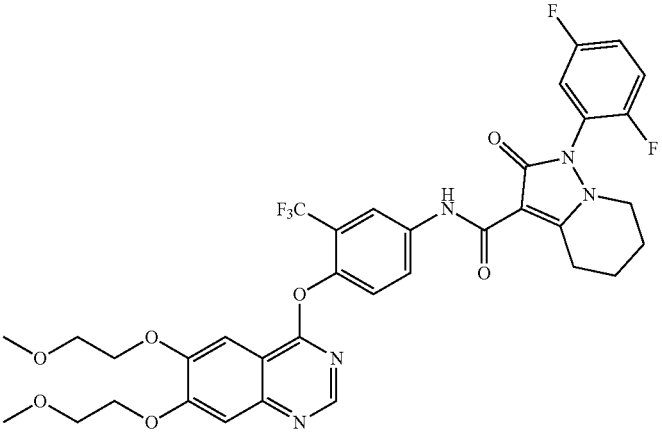 |
| DC621083 | 1-(2,5-difluorophenyl)-N-(4-((6,7-dimethoxyquinazoline-4-yl)oxy)naphthalene-1-yl)-2-oxo-1,2,4,5,6,7-hexahydropyrazolo[1,5-a]pyridine-3-formamide | 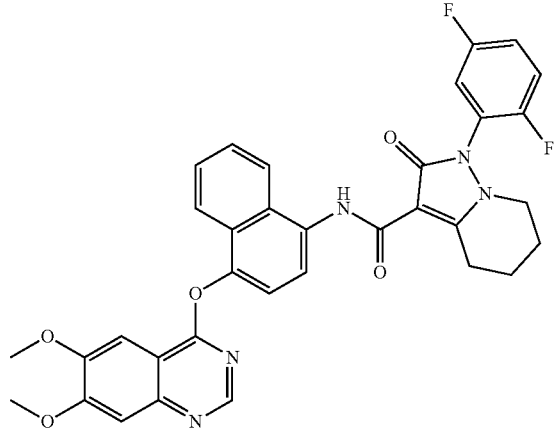 [SMILES: COc1cc2ncnc(Oc3ccc(NC(=O)c4c5n(n(-c6cc(F)ccc6F)c4=O)CCCC5)c4ccccc34)c2cc1OC] |

-continued

| No. | Name | Structure |
|---|---|---|
| DC621084 | 1-(2,5-difluorophenyl)-N-(4-((6,7-bis(2-methoxyethoxy)quinazolin-4-yl)oxy)naphthalene-1-yl)-2-oxo-1,2,4,5,6,7-hexahydropyrazolo[1,5-a]pyridine-3-formamide | |
| DC621085 | 1-(2,5-difluorophenyl)-N-(5-(6,7-dimethoxyquinazoline-4-yl)oxy)pyridine-2-yl)-2-oxo-1,2,4,5,6,7-hexahydropyrazolo[1,5-a]pyridine-3-formamide | |
| DC621086 | 1-(2,5-difluorophenyl)-N-(5-(6,7-bis(2-methoxyethoxy)quinazolin-4-yl)pyridine-2-yl)-2-oxo-1,2,4,5,6,7-hexahydropyrazolo[1,5-a]pyridine-3-formamide | |

| No. | Name | Structure |
|---|---|---|
| DC621087 | (R)-1-(2,5-difluorophenyl)-N-(3-fluoro-4-((6-methoxy-7-((tetrahydrofuran-3-yl)oxy)quinazolin-4-yl)oxy)phenyl)-2-oxo-1,2,4,5,6,7-hexahydropyrazolo[1,5-a]pyridine-3-formamide | |
| DC621088 | (S)-1-(2,5-difluorophenyl)-N-(3-fluoro-4-((6-methoxy-7-((tetrahydrofuran-3-yl)oxy)quinazolin-4-yl)oxy)phenyl)-2-oxo-1,2,4,5,6,7-hexahydropyrazolo[1,5-a]pyridine-3-formamide | |
| DC621089 | N-(4-((6,7-dimethoxyquinazoline-4-yl)oxy)-3-chlorophenyl)-1-(2-fluorophenyl)-2-oxo-1,2,4,5,6,7-hexahydropyrazolo[1,5-a]pyridine-3-formamide | |

| No. | Name | Structure |
|---|---|---|
| DC621090 | N-(4-((6,7-bis(2-methoxyethoxy)quinazolin-4-yl)oxy)-3-chlorophenyl)-1-(2-fluorophenyl)-2-oxo-1,2,4,5,6,7-hexahydropyrazolo[1,5-a]pyridine-3-formamide | |
| DC621091 | N-(4-((6,7-dimethoxyquinazoline-4-yl)oxy)-3-trifluoromethylphenyl)-1-(2-fluorophenyl)-2-oxo-1,2,4,5,6,7-hexahydropyrazolo[1,5-a]pyridine-3-formamide | |
| DC621092 | N-(4-((6,7-bis(2-methoxyethoxy)quinazolin-4-yl)oxy)-3-trifluoromethylphenyl)-1-(2-fluorophenyl)-2-oxo-1,2,4,5,6,7-hexahydropyrazolo[1,5-a]pyridine-3-formamide | |

| No. | Name | Structure |
| --- | --- | --- |
| DC621093 | N-(4-((6,7-dimethoxyquinazoline-4-yl)oxy)naphthalene-1-yl)-1-(2-fluorophenyl)-2-oxo-1,2,4,5,6,7-hexahydropyrazolo[1,5-a]pyridine-3-formamide | |
| DC621094 | N-(4-((6,7-bis(2-methoxyethoxy)quinazolin-4-yl)oxy)naphthalene-1-yl)-1-(2-fluorophenyl)-2-oxo-1,2,4,5,6,7-hexahydropyrazolo[1,5-a]pyridine-3-formamide | |
| DC621095 | N-(5-(6,7-dimethoxyquinazoline-4-yl)oxy)pyridine-2-yl)-1-(2-fluorophenyl)-2-oxo-1,2,4,5,6,7-hexahydropyrazolo[1,5-a]pyridine-3-formamide | |

| No. | Name | Structure |
|---|---|---|
| DC621096 | N-(5-(6,7-bis(2-methoxyethoxy)quinazolin-4-yl)pyridine-2-yl)-1-(2-fluorophenyl)-2-oxo-1,2,4,5,6,7-hexahydropyrazolo[1,5-a]pyridine-3-formamide | |
| DC621097 | (R)-N-(3-fluoro-4-((6-methoxy-7-((tetrahydrofuran-3-yl)oxy)quinazolin-4-yl)oxy)phenyl)-1-(2-fluorophenyl)-2-oxo-1,2,4,5,6,7-hexahydropyrazolo[1,5-a]pyridine-3-formamide | |
| DC621098 | (S)-N-(3-fluoro-4-((6-methoxy-7-((tetrahydrofuran-3-yl)oxy)quinazolin-4-yl)oxy)phenyl)-1-(2-fluorophenyl)-2-oxo-1,2,4,5,6,7-hexahydropyrazolo[1,5-a]pyridine-3-formamide | |

-continued

| No. | Name | Structure |
|---|---|---|
| DC621099 | N-(4-((6,7-dimethoxyquinazoline-4-yl)oxy)-3-chlorophenyl)-1-(4-fluorophenyl)-2-oxo-1,2,4,5,6,7-hexahydropyrazolo[1,5-a]pyridine-3-formamide | 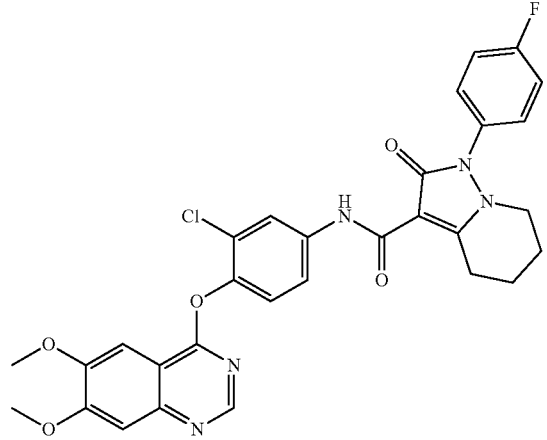 |
| DC621100 | N-(4-((6,7-bis(2-methoxyethoxy)quinazolin-4-yl)oxy)-3-chlorophenyl)-1-(4-fluorophenyl)-2-oxo-1,2,4,5,6,7-hexahydropyrazolo[1,5-a]pyridine-3-formamide | 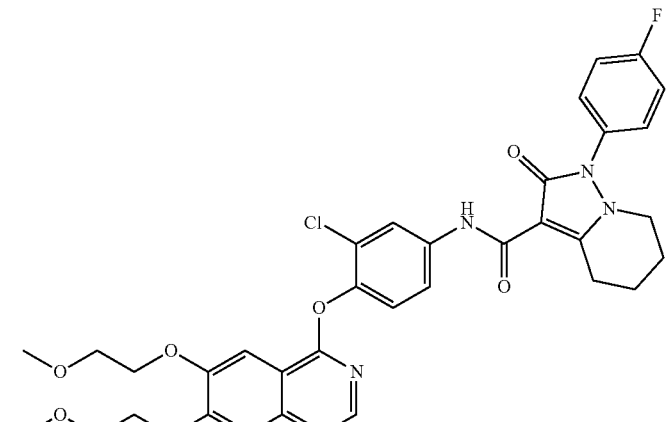 |
| DC621101 | N-(4-((6,7-dimethoxyquinazoline-4-yl)oxy)-3-trifluoromethylphenyl)-1-(4-fluorophenyl)-2-oxo-1,2,4,5,6,7-hexahydropyrazolo[1,5-a]pyridine-3-formamide | 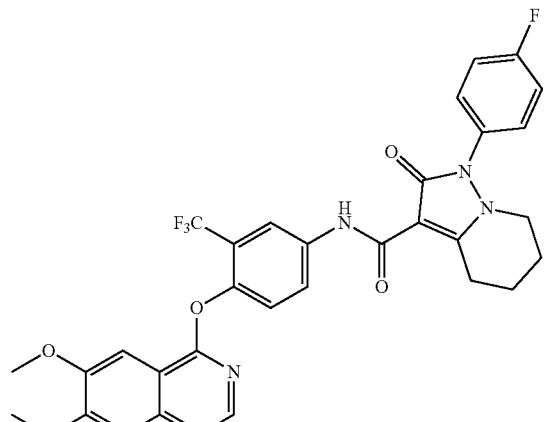 |

| No. | Name | Structure |
|---|---|---|
| DC621102 | N-(4-((6,7-bis(2-methoxyethoxy)quinazolin-4-yl)oxy)-3-trifluoromethylphenyl)-1-(4-fluorophenyl)-2-oxo-1,2,4,5,6,7-hexahydropyrazolo[1,5-a]pyridine-3-formamide | |
| DC621103 | N-(4-((6,7-dimethoxyquinazoline-4-yl)oxy)naphthalene-1-yl)-1-(4-fluorophenyl)-2-oxo-1,2,4,5,6,7-hexahydropyrazolo[1,5-a]pyridine-3-formamide | |
| DC621104 | N-(4-((6,7-bis(2-methoxyethoxy)quinazolin-4-yl)oxy)naphthalene-1-yl)-1-(4-fluorophenyl)-2-oxo-1,2,4,5,6,7-hexahydropyrazolo[1,5-a]pyridine-3-formamide | |

| No. | Name | Structure |
|---|---|---|
| DC621105 | N-(5-(6,7-dimethoxyquinazoline-4-yl)oxy)pyridine-2-yl)-1-(4-fluorophenyl)-2-oxo-1,2,4,5,6,7-hexahydropyrazolo[1,5-a]pyridine-3-formamide | |
| DC621106 | N-(5-(6,7-bis(2-methoxyethoxy)quinazolin-4-yl)pyridine-2-yl)-1-(4-fluorophenyl)-2-oxo-1,2,4,5,6,7-hexahydropyrazolo[1,5-a]pyridine-3-formamide | |
| DC621107 | (R)-N-(3-fluoro-4-((6-methoxy-7-((tetrahydrofuran-3-yl)oxy)quinazolin-4-yl)oxy)phenyl)-1-(4-fluorophenyl)-2-oxo-1,2,4,5,6,7-hexahydropyrazolo[1,5-a]pyridine-3-formamide | |

| No. | Name | Structure |
|---|---|---|
| DC621108 | (S)-N-(3-fluoro-4-((6-methoxy-7-((tetrahydrofuran-3-yl)oxy)quinazolin-4-yl)oxy)phenyl)-1-(4-fluorophenyl)-2-oxo-1,2,4,5,6,7-hexahydropyrazolo[1,5-a]pyridine-3-formamide | 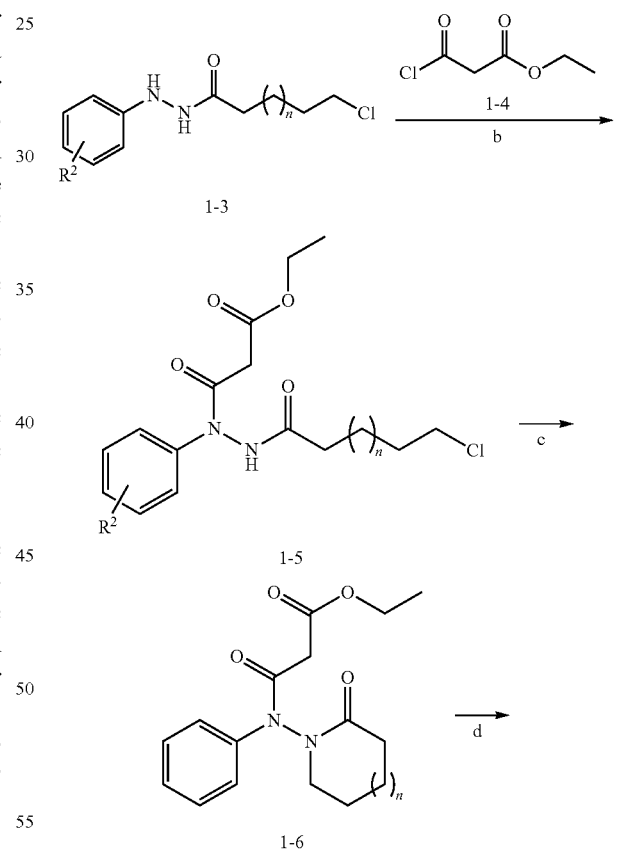 |

The present invention provides a pharmaceutically acceptable salt of the compound of formula I, in particular the compound of formula I, with an inorganic or organic acid to form a conventional pharmaceutically acceptable salt. For example, conventional pharmaceutically acceptable salts may be prepared by reacting a compound of formula I with an inorganic or organic acids, the inorganic acids include hydrochloric acid, hydrobromic acid, sulfuric acid, nitric acid, aminosulfonic acid and phosphoric acid, and the like, and organic acids include citric acid, tartaric acid, lactic acid, pyruvic acid, acetic acid, benzenesulfonic acid, p-toluenesulfonic acid, methanesulfonic acid, naphthalenesulfonic acid, ethanesulfonic acid, naphthalene disulfonic acid, maleic acid, malic acid, malonic acid, fumaric acid, succinic acid, propionic acid, oxalic acid, trifluoroacetic acid, stearic acid, pamoic acid, hydroxymaleic acid, phenylacetic acid, benzoic acid, salicylic acid, glutamic acid, ascorbic acid, p-anilinesulfonic acid, 2-acetoxybenzoic acid and isethionic acid; or sodium, potassium, calcium, aluminum or ammonium salts of the compound of formula I with an inorganic base; or a salt formed by compound of formula I with an organic base, such as methanamine salt, ethylamine salt or ethanolamine salt.

Another aspect of the present invention provides a process for the preparation of a compound of formula I, which is according to the following scheme 1, scheme 2 or scheme 3:

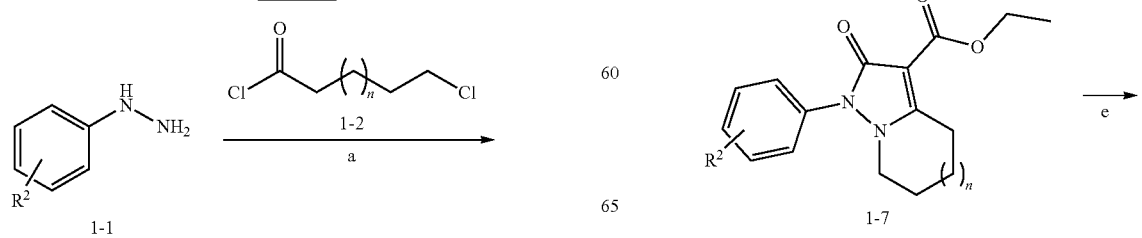

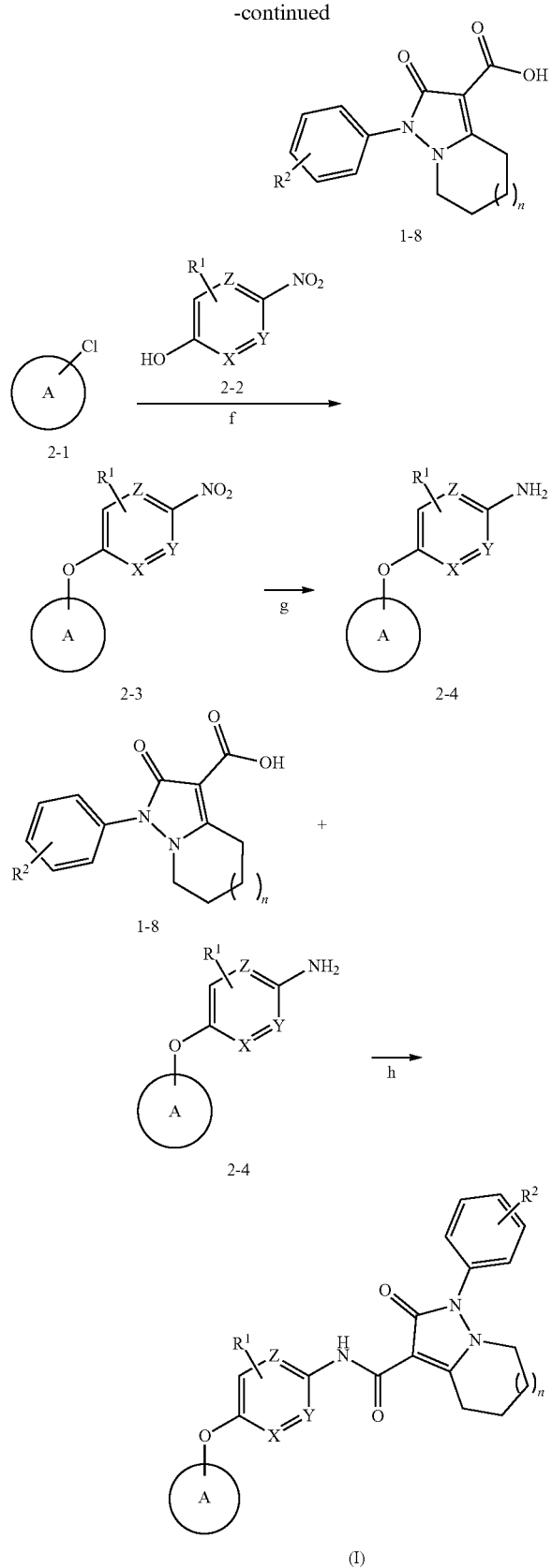

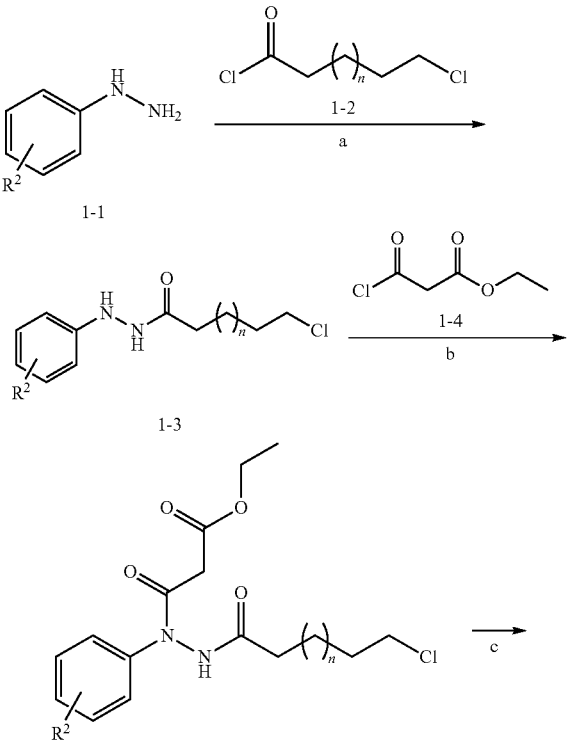

Step a: 1-1 (1 equiv) is dissolved in an appropriate amount of DCM, then 10% Na$_2$CO$_3$ aqueous solution (2 equiv) is added, and then stir under 0° C. and add1-2 (1.1 equiv) dropwise. The reaction is moved to room temperature and stirred overnight;

Step b: 1-3 (1 equiv) is dissolved in an appropriate amount of DCM, then anhydrous Na$_2$CO$_3$ (2 equiv) is added, and then 1-4 (2 equiv) is added dropwise with stirring, the reaction is stirred overnight at room temperature;

Step c: 1-5 (1 equiv) is dissolved in an appropriate amount of DMF, and then NaH (3 equiv) is added slowly under 0° C. with stirring, the reaction is moved to room temperature and stirred for 5 h;

Step d: 1-6 (1 equiv) is dissolved in appropriate amount of DBU (4 equiv), then heated to 50° C. and stirred and heated for 5 h;

Step e: 1-7 (1 equiv) is dissolved in an appropriate amount of EtOH, then 2N KOH aqueous solution (3 equiv) is added and stirred to reflux for 2 h before acidification.

Step f: 2-1 (1 equiv) is dissolved in an appropriate amount of DMF, then 2-2 (1.2 equiv) and K$_2$CO$_3$ (2.5 equiv) are added; then the mixture is warmed to 100° C., stirred and heated till the reaction is finished; alkali can be potassium carbonate, potassium tert-butoxide, the temperature is 80-130° C., and the time is 12-36 h;

Step g: 2-3 (1 equiv) is dissolved in an appropriate amount of EtOH/H$_2$O (1:1), then iron powder (5 equiv) and NH$_4$Cl (5 equiv) was added, then stirred to reflux for 2 h.

Step h: 1-8 (1 equiv), 2-3 (1.05 equiv) is dissolved in appropriate amount of DCM, then HATU (1.5 equiv) and DIPEA (2 equiv) are added and stirred overnight under room temperature.

wherein, R$^1$, R$^2$, X, Y, Z and n are defined as in the above general formula I.

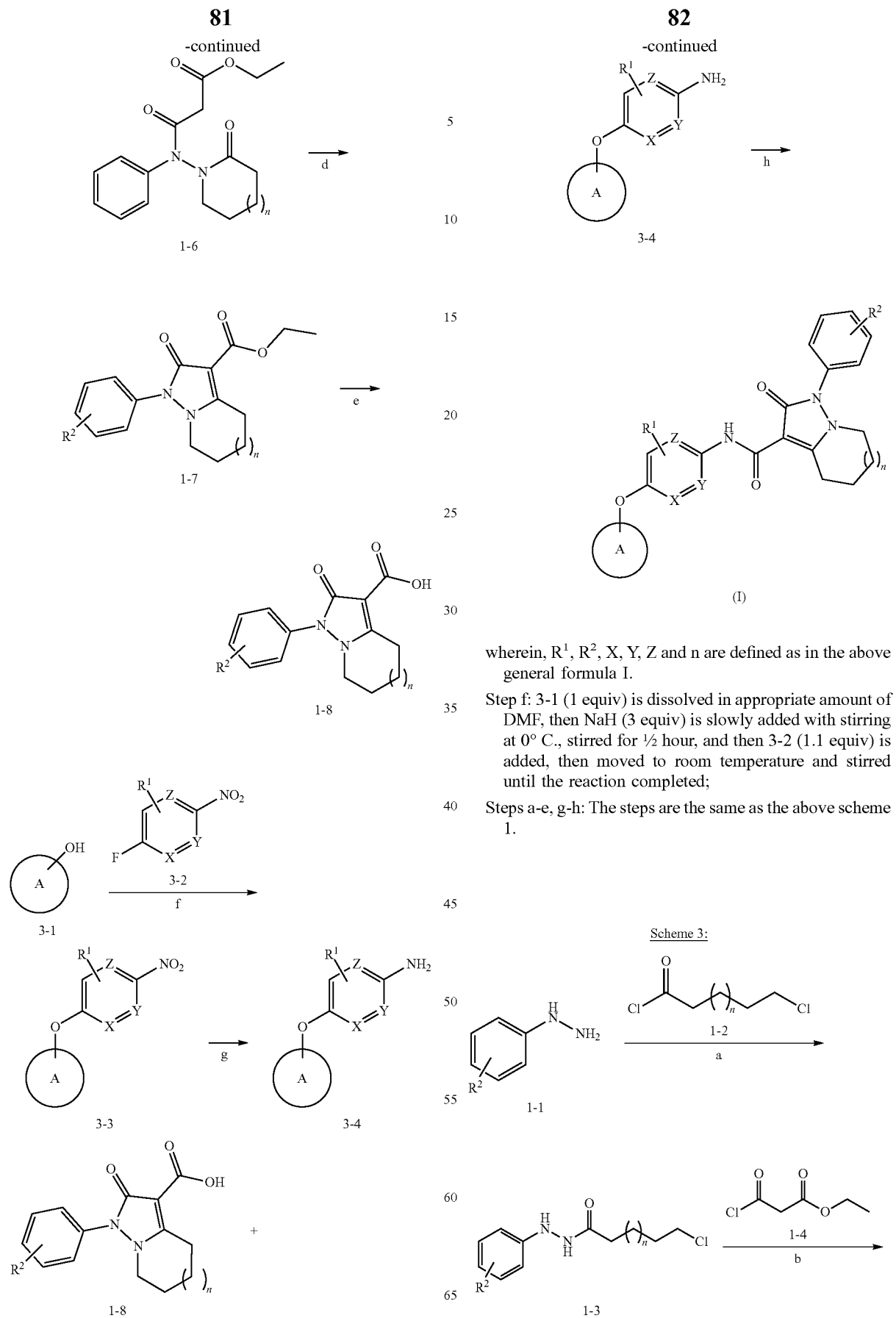
wherein, $R^1$, $R^2$, X, Y, Z and n are defined as in the above general formula I.
Step f: 3-1 (1 equiv) is dissolved in appropriate amount of DMF, then NaH (3 equiv) is slowly added with stirring at 0° C., stirred for ½ hour, and then 3-2 (1.1 equiv) is added, then moved to room temperature and stirred until the reaction completed;
Steps a-e, g-h: The steps are the same as the above scheme 1.
Scheme 3:

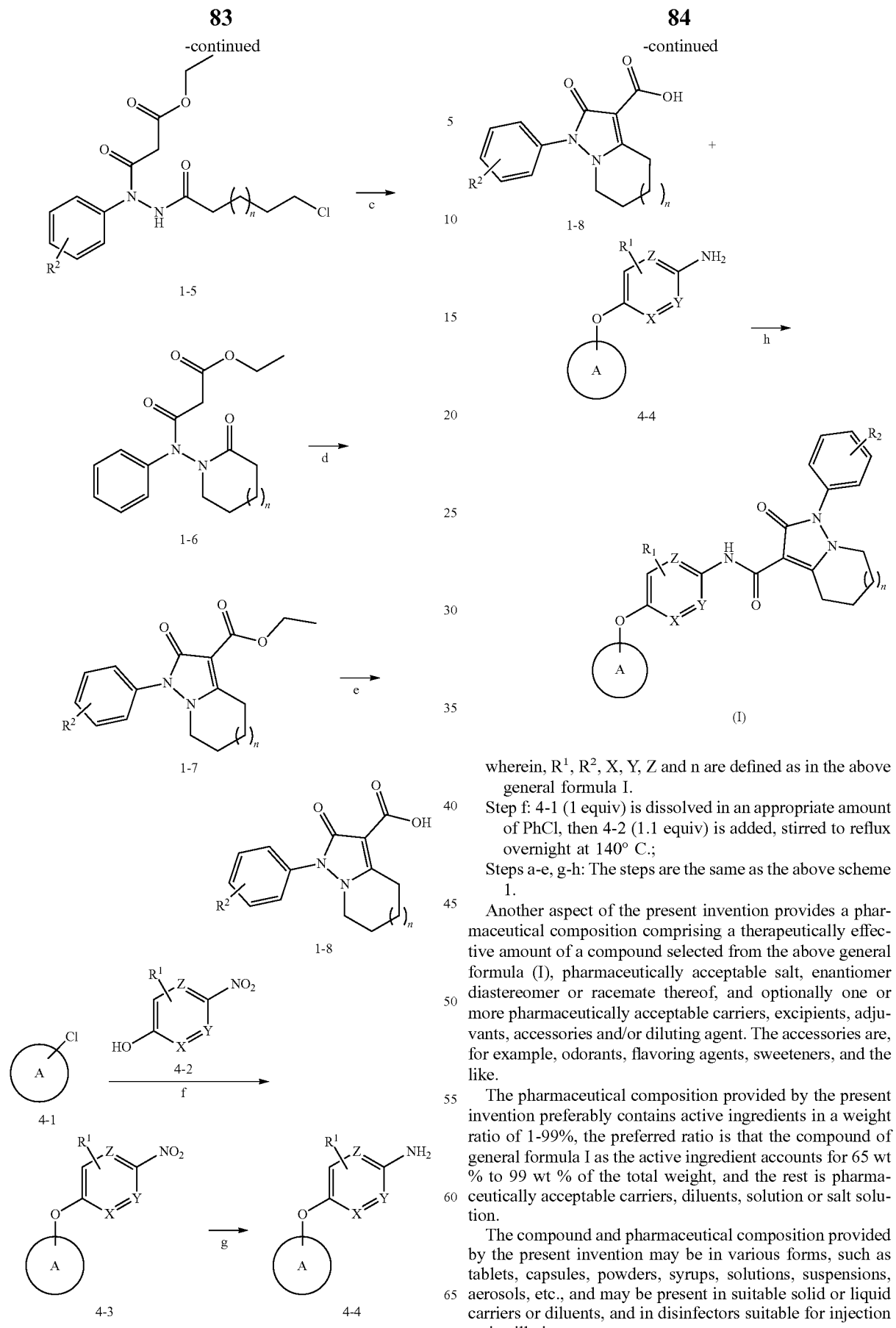

wherein, $R^1$, $R^2$, X, Y, Z and n are defined as in the above general formula I.

Step f: 4-1 (1 equiv) is dissolved in an appropriate amount of PhCl, then 4-2 (1.1 equiv) is added, stirred to reflux overnight at 140° C.;

Steps a-e, g-h: The steps are the same as the above scheme 1.

Another aspect of the present invention provides a pharmaceutical composition comprising a therapeutically effective amount of a compound selected from the above general formula (I), pharmaceutically acceptable salt, enantiomer diastereomer or racemate thereof, and optionally one or more pharmaceutically acceptable carriers, excipients, adjuvants, accessories and/or diluting agent. The accessories are, for example, odorants, flavoring agents, sweeteners, and the like.

The pharmaceutical composition provided by the present invention preferably contains active ingredients in a weight ratio of 1-99%, the preferred ratio is that the compound of general formula I as the active ingredient accounts for 65 wt % to 99 wt % of the total weight, and the rest is pharmaceutically acceptable carriers, diluents, solution or salt solution.

The compound and pharmaceutical composition provided by the present invention may be in various forms, such as tablets, capsules, powders, syrups, solutions, suspensions, aerosols, etc., and may be present in suitable solid or liquid carriers or diluents, and in disinfectors suitable for injection or instillation.

Various dosage forms of the pharmaceutical composition of the present invention can be prepared according to the conventional preparation methods in the pharmaceutical field. The unit dose of the formulation usually contains 0.05-400 mg of the compound of formula I, preferably, the unit dose of the formulation contains 1 mg-300 mg of the compound of general formula I.

The compounds and pharmaceutical compositions of the present invention can be used clinically in mammals, including humans and animals, and can be administered via mouth, nose, skin, lung or gastrointestinal tract. Most preferably via mouth. The most preferred daily dose is 0.01-400 mg/kg body weight, taken once, or 0.01-200 mg/kg body weight in divided doses. Regardless of the method of administration, the individual's optimal dose should be based on the specific treatment. Usually, it starts with a small dose, and gradually increase the dose until the most suitable dose is found.

The present invention also provides an AXL kinase inhibitor, which comprises one or more of a compound selected from the above formula I, its pharmaceutically acceptable salt, racemate, R-isomer, S-isomer, or mixture thereof, and optionally one or more pharmaceutically acceptable carriers, excipients, adjuvants, accessories and/or diluting agent.

The compounds and compositions of the present invention are used for the treatment and prevention of malignant tumors related to the AXL kinase pathway.

Therefore, another aspect of the present invention provides the compound represented by the above general formula I, its pharmaceutically acceptable salt, racemate, R-isomer, S-isomer or mixture thereof for the preparation of medication for treatment of malignant tumor related to the AXL kinase pathway.

The present invention will be further illustrated below with reference to the specific examples. It should be understood that these examples are only to illustrate the invention but not to limit the scope of the invention. The experimental methods with no specific conditions described in the following examples are generally performed under the conventional conditions, or according to the manufacturer's instructions. Unless indicated otherwise, parts and percentage are calculated by weight.

Example 1 N-(4-((6,7-dimethoxyquinoline-4-yl)oxy)-3-fluorophenyl)-2-oxo-1-phenyl-1,2,4,5,6,7-hexahydropyrazolo[1,5-a]pyridine-3-formamide (DC621001)

1.1 Synthesis of 5-chloro-N-phenyl valeryl hydrazide

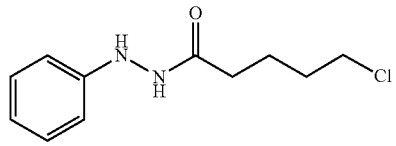 [SMILES: O=C(CCCCCl)NNc1ccccc1]

10 g phenylhydrazine, 10% $Na_2CO_3$ aqueous solution (180 mL) and 200 mL DCM were added to a 500 mL eggplant-shaped flask. After stirred for 10 min at 0° C., 5-chloro valeryl chloride (11.85 mL) was added dropwise. Then the mixture was stirred at this temperature for 10 min, then moved to room temperature and stirred overnight. The reaction was monitored by thin layer chromatography (TLC). After the reaction, the organic layer was separated, the aqueous layer was extracted 3 times with 100 mL DCM, and the combined organic layers were washed with saturated brine, dried with anhydrous $Na_2SO_4$, suction filtered, and the filtrate was spin-dried (evaporated under vacuum) to obtain red-brown oily liquid 16 g. LRMS (EI) m/z: 227 $(M+H)^+$ (directly used in the next step without purification)

1.2 Synthesis of ethyl 3-(2-(5-chloropentanoyl)-1-phenylhydrazino)-3-oxo-propionate

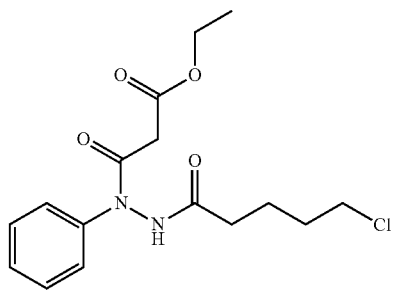 [SMILES: CCOC(=O)CC(=O)N(NC(=O)CCCCCl)c1ccccc1]

16 g 5-chloro-N'-phenyl valeryl hydrazide was dissolved in 250 mL DCM, then 15.0 g anhydrous $Na_2CO_3$ was added, and 60 mL ethyl chloroformyl acetate (19.0 mL) in DCM was added dropwise with stirring at room temperature. After the addition was completed, the mixture was stirred at room temperature overnight. The reaction was monitored by thin layer chromatography (TLC). After the reaction was completed, the reaction solution was filtered with celite, and solid was washed with appropriate amount of water and DCM. The organic layer was separated from the filtrate, and the aqueous layer was extracted 3 times with 100 mL of DCM. The combined organic layers were washed with saturated brine and dried with $Na_2SO_4$, suction filtered, and the filtrate was spin-dried successively to obtain 17 g of yellow oily liquid. LRMS (EI) m/z: 341 $(M+H)^+$ (directly used in the next step without purification)

1.3 Synthesis of ethyl 3-oxo-3-((2-oxopiperidin-1-yl) (phenyl) amino) propionate

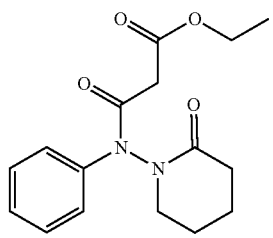 [SMILES: CCOC(=O)CC(=O)N(c1ccccc1)N1CCCCC1=O]

17 g of ethyl 3-(2-(5-chloropentanoyl)-1-phenylhydrazino)-3-oxo-propionate was dissolved in 250 mL DMF, stirred for 10 min at 0° C., and then 6.0 g of NaH was slowly added. After the addition, the mixture was stirred at this temperature for 10 minutes, then move to room temperature and reacted for 5 hours. The reaction was monitored by thin layer chromatography (TLC). After the reaction was completed, the reaction solution was adjusted to pH 7 with saturated $NaH_2PO_4$, and then filtered. The filtrate was diluted with a large amount of water, and then extracted 3 times with 100 mL EA. The combined organic layers were washed with saturated brine, and dried with anhydrous Na$_2$SO$_4$, suction filtrated and spin-dried to obtain 14 g of yellow oily liquid. LRMS (EI) m/z: 305 (M+H)$^+$ (directly used in the next step without purification)

1.4 Synthesis of ethyl 2-oxo-1-phenyl-1,2,4,5,6,7-hexahydropyrazolo[1,5-a]pyridine-3-carboxylate

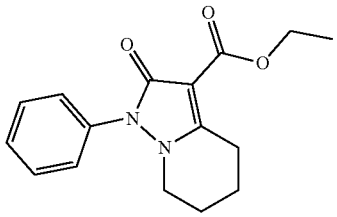 [SMILES: CCOC(=O)c1c2n(n(-c3ccccc3)c1=O)CCCC2]

14 g ethyl 3-oxo-3-((2-oxopiperidine-1-yl) (phenyl) amino) propionate was dissolved in 35 mL DBU, and then warmed to 50° C. and heated with stirring for 5 h. The reaction was monitored by thin layer chromatography (TLC). After the reaction was completed, the reaction solution was adjusted to pH 7 with saturated NaH$_2$PO$_4$, and then extracted 3 times with 100 mL DCM. The combined organic layers were washed with saturated brine, dried with anhydrous Na$_2$SO$_4$, suction filtered and spin-dried to obtain 12 g of yellow oily liquid. LRMS (EI) m/z: 287 (M+H)$^+$ (directly used in the next step without purification)

1.5 Synthesis of 2-oxo-1-phenyl-1,2,4,5,6,7-hexahydropyrazolo[1,5-a]pyridine-3-carboxylic acid

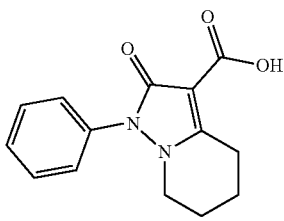 [SMILES: O=C(O)c1c2n(n(-c3ccccc3)c1=O)CCCC2]

12 g ethyl 2-oxo-1-phenyl-1,2,4,5,6,7-hexahydropyrazolo[1,5-a]pyridine-3-carboxylate was dissolved in 100 mL EtOH, then 58 mL 2N KOH aqueous solution was added and stirred to reflux for 2 h. The reaction was monitored by thin layer chromatography (TLC). After the reaction was completed, part of the EtOH was spun off, and the reaction liquid was extracted with EA. The pH of the aqueous layer was adjusted to 3 with 2N HCl. A brown solid was precipitated and suction filtered to obtain 10 g solid. LRMS (EI) m/z: 259 (M+H)+1.6 Synthesis of 4-(2-fluoro-4-nitrophenoxy)-6,7-dimethoxyquinoline

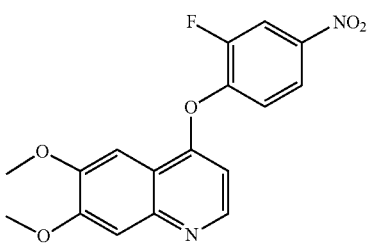 [SMILES: COc1cc2nccc(Oc3ccc([N+](=O)[O-])cc3F)c2cc1OC]

5 g 4-chloro-6,7-dimethoxyquinoline, 4.2 g 2-fluoro-4-nitrophenol, 7.69 g K$_2$CO$_3$ and 50 mL DMF were added to 100 mL eggplant-shaped flask, and then stirred at 100° C. overnight. The reaction was monitored by thin layer chromatography (TLC). After the reaction was completed, a large amount of water was added to the reaction solution to precipitate a yellow solid, suction filtered to obtain 6.5 g solid. LRMS (EI) m/z: 345 (M+H)+

1.7 Synthesis of 4-((6,7-dimethoxyquinoline-4-yl)oxy)-3-fluoroaniline

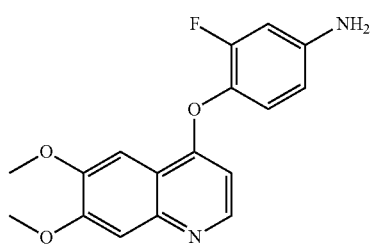 [SMILES: COc1cc2nccc(Oc3ccc(N)cc3F)c2cc1OC]

6.5 g 4-(2-fluoro-4-nitrophenoxy)-6,7-dimethoxyquinoline was dissolved in 80 mL EtOH/H$_2$O (1:1), then 5.26 g iron powder and 5.03 g NH$_4$Cl were added and stirred to reflux for 2 h. The reaction was monitored by thin layer chromatography (TLC). After the reaction was completed, the reaction solution was filtered with celite, the solid was washed with appropriate amount of EA. The organic layer was separated from the filtrate, and the aqueous layer was extracted 3 times with 100 mL of EA. The combined organic layers were washed with saturated brine, dried with anhydrous Na$_2$SO$_4$, suction filtered and spin-dried to obtain 5 g yellow solid. LRMS (EI) m/z: 315 (M+H)$^+$ (directly used in the next step without purification)

1.8 Synthesis of the Final Product DC621001

100 mg of 2-oxo-1-phenyl-1,2,4,5,6,7-hexahydropyrazolo[1,5-a]pyridine-3-carboxylic acid, 128 mg 4-((6,7-dimethoxyquinoline-4-yl)oxy)-3-fluoroaniline, 221 mg HATU, 0.16 mL DIPEA and 15 mL DCM were added to 25 mL eggplant-shaped bottle, then stirred at room temperature overnight. The reaction was monitored by thin layer chromatography (TLC). After the reaction was completed, the reaction solution was diluted with 25 mL of water. The organic layer was separated, and the aqueous layer was extracted 3 times with 25 mL of DCM. The combined organic layers were washed with saturated brine, dried with anhydrous Na$_2$SO$_4$, suction filtered, and the filtrate was spin-dried and purified to obtain 180 mg white solid, yield 84%. $^1$HNMR (400 MHz, DMSO-d6) δ 10.83 (s, 1H), 8.51 (d, J=5.3 Hz, 1H), 8.00 (dd, J=13.1, 2.3 Hz, 1H), 7.65-7.38 (m, 8H), 7.36 (dd, J=9.0, 1.8 Hz, 1H), 6.51 (d, J=5.2 Hz, 1H), 3.96 (s, 6H), 3.59 (t, J=5.8 Hz, 2H), 3.21 (t, J=6.2 Hz, 2H), 2.04-1.92 (m, 2H), 1.88-1.78 (m, 2H). LRMS (EI) m/z: 555 (M+H)$^+$.

Example 2 N-(6-((6,7-dimethoxyquinoline-4-yl)oxy)pyridine-3-yl)-2-oxo-1-phenyl-1,2,4,5,6,7-hexahydropyrazolo[1,5-a]pyridine-3-formamide (DC621002)

2.6 Synthesis of 6,7-dimethoxy-4-((5-nitropyridine-2-yl)oxy)quinoline

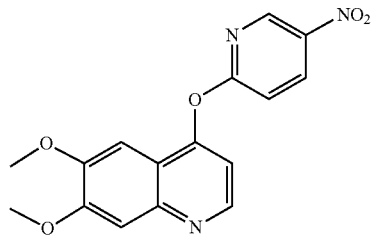 [SMILES: COc1cc2nccc(Oc3ccc([N+](=O)[O-])cn3)c2cc1OC]

5 g 6,7-dimethoxyquinoline-4-ol was dissolved in 80 mL DMF, and then 3 g NaH was slowly added under 0° C. with stirring. After stirring for 0.5 h, 3.8 g 2-fluoro-5-nitropyridine was added and moved to room temperature to stir. The reaction was monitored by thin layer chromatography (TLC). After the reaction, a large amount of saturated aqueous ammonium chloride solution was added to the reaction solution to quench the excess NaH. The aqueous layer was extracted 3 times with 100 mL EA, and the combined organic layers was washed with saturated brine, dried with anhydrous $Na_2SO_4$, and suction filtered and spin-dried to obtain yellow solid. LRMS (EI) m/z: 328 $(M+H)^+$ (directly used in the next step without purification)

The remaining steps are the same as in Example 1 to obtain product DC621002, yield 80%. $^1$HNMR (400 MHz, DMSO-d6) δ 10.71 (s, 1H), 8.55 (d, J=5.1 Hz, 1H), 8.50 (d, J=2.6 Hz, 1H), 8.27 (dd, J=8.8, 2.7 Hz, 1H), 7.59 (t, J=7.5 Hz, 2H), 7.52 (d, J=7.4 Hz, 1H), 7.46 (d, J=7.3 Hz, 2H), 7.40 (d, J=13.1 Hz, 2H), 7.31 (d, J=8.8 Hz, 1H), 6.84 (d, J=5.2 Hz, 1H), 3.95 (s, 3H), 3.88 (s, 3H), 3.58 (t, J=5.7 Hz, 2H), 3.20 (t, J=6.1 Hz, 2H), 2.02-1.93 (m, 2H), 1.88-1.72 (m, 2H). LRMS (EI) m/z: 538 $(M+H)^+$.

Example 3 N-(4-((6,7-dimethoxyquinazoline-4-yl)oxy)phenyl)-2-oxo-1-phenyl-1,2,4,5,6,7-hexahydropyrazolo[1,5-a]pyridine-3-formamide (DC621004)

2-fluoro-4-nitrophenol was replaced with p-nitrophenol, 4-chloro-6,7-dimethoxyquino line was replaced with 4-chloro-6,7-dimethoxyquinazoline, and other raw materials, rea gents and preparation methods were the same as in example 1 to provide the product DC621004, yield 80%. $^1$HNMR (400 MHz, DMSO-d6) δ 10.68 (s, 1H), 8.55 (s, 1H), 7.70 (s, 1H), 7.68 (s, 1H), 7.65-7.54 (m, 3H), 7.52 (d, J=7.3 Hz, 1H), 7.49-7.44 (m, 2H), 7.39 (s, 1H), 7.27 (s, 1H), 7.25 (s, 1H), 3.99 (s, 3H), 3.98 (s, 3H), 3.57 (t, J=5.8 Hz, 2H), 3.22 (t, J=6.4 Hz, 2H), 2.03-1.95 (m, 2H), 1.86-1.77 (m, 2H). LRMS (EI) m/z: 538 $(M+H)^+$.

Example 4 N-(4-(imidazo[1,2-a]pyrazine-8-yloxy)phenyl)-2-oxo-1-phenyl-1,2,4,5,6,7-hexahydropyrazolo[1,5-a]pyridine-3-formamide (DC621006)

2-fluoro-4-nitrophenol was replaced with p-nitrophenol, 4-chloro-6,7-dimethoxyquino line was replaced with 8-chloroimidazo[1,2-a]pyrazine, and other raw materials, reagents and preparation methods were the same as in example 1 to provide the product D C621006, yield 80%. $^1$HNMR (400 MHz, DMSO-d6) δ 10.66 (s, 1H), 8.32 (d, J=4.6 Hz, 1H), 8.16 (d, J=1.0 Hz, 1H), 7.76 (d, J=1.0 Hz, 1H), 7.70-7.63 (m, 2H), 7.62-7.55 (m, 2H), 7.54-7.43 (m, 3H), 7.32 (d, J=4.6 Hz, 1H), 7.28-7.18 (m, 2H), 3.57 (t, J=5.8 Hz, 2H), 3.22 (t, J=6.3 Hz, 2H), 2.02-1.94 (m, 2H), 1.86-1.78 (m, 2H). LRMS (EI) m/z: 467 $(M+H)^+$.

Example 5 N-(4-([1,2,4]triazolo[4,3-b]pyridazine-6-yloxy)phenyl)-2-oxo-1-phenyl-1,2,4,5,6,7-hexahydropyrazolo[1,5-a]pyridine-3-formamide (DC621007)

2-fluoro-4-nitrophenol was replaced with p-nitrophenol, 4-chloro-6,7-dimethoxyquinoline was replaced with 6-chloro-[1,2,4]triazolo[4,3-b]pyridazine, and other raw materials, reagents and preparation methods were the same as in example 1 to provide the product DC621007, yield 80%. $^1$HNMR (400 MHz, DMSO-d6) δ 10.67 (s, 1H), 9.40 (d, J=0.6 Hz, 1H), 8.41 (dd, J=9.8, 0.6 Hz, 1H), 7.73-7.63 (m, 2H), 7.59 (t, J=7.5 Hz, 2H), 7.54-7.44 (m, 3H), 7.34-7.25 (m, 3H), 3.57 (t, J=5.8 Hz, 2H), 3.21 (t, J=6.3 Hz, 2H), 2.03-1.94 (m, 2H), 1.88-1.77 (m, 2H). LRMS (EI) m/z: 468 $(M+H)^+$.

Example 6 2-oxo-1-phenyl-N-(4-(pyrazolo[1,5-a]pyrimidine-5-yloxy)phenyl)-1,2,4,5,6,7-hexahydropyrazolo[1,5-a]pyridine-3-formamide (DC621008)

2-fluoro-4-nitrophenol was replaced with p-nitrophenol, 4-chloro-6,7-dimethoxyquinoline was replaced with 5-chloropyrazolo[1,5-a]pyrimidine, and other raw materials, re agents and preparation methods were the same as in example 1 to provide the product DC621008, yield 80%. $^1$HNMR (400 MHz, DMSO-d6) δ 10.66 (s, 1H), 9.05 (d, J=7.5 Hz, 1H), 8.06 (d, J=2.2 Hz, 1H), 7.67 (d, J=8.9 Hz, 2H), 7.59 (t, J=7.5 Hz, 2H), 7.55-7.43 (m, 3H), 7.21 (d, J=8.9 Hz, 2H), 6.79 (d, J=7.5 Hz, 1H), 6.41-6.27 (m, 1H), 3.57 (t, J=5.8 Hz, 2H), 3.22 (t, J=6.3 Hz, 2H), 2.04-1.95 (m, 2H), 1.88-1.76 (m, 2H). LRMS (EI) m/z: 467 $(M+H)^+$.

Example 7 N-(3-fluoro-4-(imidazo[1,2-a]pyridine-8-yloxy)phenyl)-2-oxo-1-phenyl-1,2,4,5,6,7-hexahydropyrazolo[1,5-a]pyridine-3-formamide (DC621009)

4-chloro-6,7-dimethoxyquinoline was replaced with imidazo[1,2-a]pyridine-8-ol, 2-fluoro-4-nitrophenol was replaced with 1,2-difluoro-4-nitrobenzene, and other raw materials, reagents and preparation methods were the same as in example 2 to provide the product DC621009, yield 80%. $^1$HNMR (400 MHz, DMSO-d6) δ 10.75 (s, 1H), 8.33 (d, J=6.0 Hz, 1H), 8.03 (d, J=1.1 Hz, 1H), 8.00-7.88 (m, 1H), 7.64-7.55 (m, 3H), 7.54-7.43 (m, 3H), 7.29-7.16 (m, 2H), 6.82-6.76 (m, 1H), 6.52 (d, J=7.5 Hz, 1H), 3.58 (t, J=5.8 Hz, 2H), 3.21 (t, J=6.2 Hz, 2H), 2.02-1.95 (m, 2H), 1.87-1.79 (m, 2H). LRMS (EI) m/z: 484 $(M+H)^+$.

Example 8 N-(6-(imidazo[1,2-a]pyridine-8-yloxy)pyridine-3-yl)-2-oxo-1-phenyl-1,2,4,5,6,7-hexahydropyrazolo[1,5-a]pyridine-3-formamide (DC621010)

4-chloro-6,7-dimethoxyquinoline was replaced with imidazo[1,2-a]pyridine-8-ol, and 2-fluoro-4-nitrophenol was replaced with 2-fluoro-5-nitropyridine, and other materials, reagents and preparation methods were the same as in example 2 to provide the product DC621010, yield 80%. $^1$HNMR (400 MHz, DMSO-d6) δ 10.57 (s, 1H), 8.44 (dd, J=6.7, 0.9 Hz, 1H), 8.24 (d, J=2.7 Hz, 1H), 8.15 (dd, J=8.8, 2.7 Hz, 1H), 7.99 (d, J=1.1 Hz, 1H), 7.58 (t, J=7.5 Hz, 2H), 7.54-7.41 (m, 4H), 7.13 (d, J=8.8 Hz, 1H), 7.03 (dd, J=7.4, 0.8 Hz, 1H), 6.89 (t, J=7.1 Hz, 1H), 3.56 (t, J=5.8 Hz, 2H), 3.19 (t, J=6.3 Hz, 2H), 2.13-1.94 (m, 2H), 1.87-1.73 (m, 2H). LRMS (EI) m/z: 467 (M+H)$^+$.

Example 9 N-(4-((6,7-dimethoxyquinazoline-4-yl)oxy)-3-fluorophenyl)-2-oxo-1-phenyl-1,2,4,5,6,7-hexahydropyrazolo[1,5-a]pyridine-3-formamide (DC621011)

4-chloro-6,7-dimethoxyquinoline was replaced with 4-chloro-6,7-dimethoxyquinazoline, and other raw materials, reagents and preparation methods were the same as in example 1 to provide the product DC621011, yield 80%. $^1$HNMR (400 MHz, DMSO-d6) δ 10.81 (s, 1H), 8.57 (s, 1H), 7.93 (dd, J=12.9, 2.3 Hz, 1H), 7.63-7.56 (m, 3H), 7.55-7.46 (m, 3H), 7.44-7.39 (m, 2H), 7.31 (dd, J=8.8, 1.7 Hz, 1H), 4.00 (s, 3H), 3.99 (s, 3H), 3.59 (t, J=5.8 Hz, 2H), 3.22 (t, J=6.2 Hz, 2H), 2.07-1.95 (m, 2H), 1.89-1.77 (m, 2H). LRMS (EI) m/z: 556 (M+H)$^+$.

Example 10 N-(4-((6,7-bis(2-methoxyethoxy)quinazolin-4-yl)oxy)-3-fluorophenyl)-2-oxo-1-phenyl-1,2,4,5,6,7-hexahydropyrazolo[1,5-a]pyridine-3-formamide (DC621012)

4-chloro-6,7-dimethoxyquinoline was replaced with 4-chloro-6,7-bis((2-methoxyethoxy) quinazoline, and other raw materials, reagents and preparation methods were the same as in example 1 to provide the product DC621012, yield 85%. $^1$HNMR (400 MHz, DMSO-d6) δ 10.81 (s, 1H), 8.56 (s, 1H), 7.93 (dd, J=12.9, 2.2 Hz, 1H), 7.64-7.57 (m, 3H), 7.55-7.38 (m, 5H), 7.31 (d, J=10.2 Hz, 1H), 4.42-4.28 (m, 4H), 3.85-3.69 (m, 4H), 3.59 (t, J=5.8 Hz, 2H), 3.37 (s, 3H), 3.36 (s, 3H), 3.22 (t, J=6.1 Hz, 2H), 2.07-1.95 (m, 2H), 1.89-1.77 (m, 2H). LRMS (EI) m/z: 644 (M+H)$^+$.

Example 11 N-(4-(N-(4-((6,7-bis(2-methoxyethoxy)quinazolin-4-yl)oxy)phenyl)-2-oxo-1-phenyl-1,2,4,5,6,7-hexahydropyrazolo[1,5-a]pyridine-3-formamide (DC621013)

2-fluoro-4-nitrophenol was replaced with p-nitrophenol, and 4-chloro-6,7-dimethoxyquinoline was replaced with 4-chloro-6,7-bis(2-methoxyethoxy)quinazoline, and other raw materials, reagents and preparation methods were the same as in example 1 to provide the product DC621013, yield 85%. $^1$HNMR (400 MHz, DMSO-d6) δ 10.68 (s, 1H), 8.54 (s, 1H), 7.69 (d, J=8.9 Hz, 2H), 7.63-7.56 (m, 3H), 7.55-7.44 (m, 3H), 7.41 (s, 1H), 7.26 (d, J=8.9 Hz, 2H), 4.43-4.26 (m, 4H), 3.81-3.73 (m, 4H), 3.58 (t, J=5.8 Hz, 2H), 3.37 (s, 3H), 3.36 (s, 3H), 3.23 (t, J=6.3 Hz, 2H), 2.05-1.94 (m, 2H), 1.87-1.77 (m, 2H). LRMS (EI) m/z: 626 (M+H)$^+$.

Example 12 N-(4-((7-benzyloxy-6-methoxyquinazolin-4-yl)oxy)-3-fluorophenyl)-2-oxo-1-phenyl-1,2,4,5,6,7-hexahydropyrazolo[1,5-a]pyridine-3-formamide (DC621014)

4-chloro-6,7-dimethoxyquinoline was replaced with 4-chloro-7-benzyloxy-6-methoxy quinazoline, and other raw materials, reagents and preparation methods were the same as in example 1 to provide the product DC621014, yield 85%. $^1$HNMR (400 MHz, DMSO-d6) δ 10.81 (s, 1H), 8.57 (s, 1H), 7.93 (dd, J=12.9, 2.4 Hz, 1H), 7.60 (t, J=7.4 Hz, 3H), 7.53 (t, J=4.0 Hz, 3H), 7.52-7.41 (m 7H), 7.32 (d, J=7.2 Hz, 1H), 5.37 (s, 2H), 4.00 (s, 3H), 3.59 (t, J=5.9 Hz, 2H), 3.22 (t, J=6.2 Hz, 2H), 2.04-1.95 (m, 2H), 1.87-1.79 (m, 2H). LRMS (EI) m/z: 632 (M+H)$^+$.

Example 13 N-(4-((7-benzyloxy-6-methoxyquinazolin-4-yl)oxy)phenyl)-2-oxo-1-phenyl-1,2,4,5,6,7-hexahydropyrazolo[1,5-a]pyridine-3-formamide (DC621015)

2-fluoro-4-nitrophenol was replaced with p-nitrophenol, 4-chloro-6,7-dimethoxyquinoline was replaced with 4-chloro-7-benzyloxy-6-methoxyquinazoline, and other raw materials, reagents and preparation methods were the same as in example 1 to provide the product DC621015, yield 85%. $^1$HNMR (400 MHz, DMSO-d6) δ 10.68 (s, 1H), 8.54 (s, 1H), 7.73-7.66 (m, 2H), 7.65-7.57 (m, 3H), 7.55-7.41 (m, 8H), 7.39-7.35 (m, 1H), 7.29-7.23 (m, 2H), 5.35 (s, 2H), 3.98 (s, 3H), 3.57 (t, J=5.8 Hz, 2H), 3.22 (t, J=6.3 Hz, 2H), 2.03-1.94 (m, 2H), 1.87-1.76 (m, 2H). LRMS (EI) m/z: 614 (M+H)$^+$.

Example 14

N-(3-fluoro-4-(quinolin-4-yloxy)phenyl)-2-oxo-1-phenyl-1,2,4,5,6,7-hexahydropyrazolo[1,5-a]pyridine-3-formamide (DC621016)

4-chloro-6,7-dimethoxyquinoline was replaced with 4-chloroquinoline, and other raw materials, reagents and preparation methods were the same as in example 1 to provide the product DC621016, yield 80%. $^1$HNMR (400 MHz, DMSO-d6) δ 10.80 (s, 1H), 8.87 (d, J=2.9 Hz, 1H), 8.05-7.88 (m, 3H), 7.70-7.64 (m, 2H), 7.62-7.54 (m, 3H), 7.53-7.43 (m, 3H), 7.40-7.29 (m, 2H), 3.58 (t, J=5.8 Hz, 2H), 3.21 (t, J=6.3 Hz, 2H), 2.04-1.94 (m, 2H), 1.87-1.78 (m, 2H). LRMS (EI) m/z: 495 (M+H)$^+$.

Example 15 N-(4-((6,7-dimethoxyquinazoline-4-yl)oxy)-3-methoxyphenyl)-2-oxo-1-phenyl-1,2,4,5,6,7-hexahydropyrazolo[1,5-a]pyridine-3-formamide (DC621017)

2-fluoro-4-nitrophenol was replaced with 2-methoxy-4-nitrophenol, 4-chloro-6,7-dimethoxyquinoline was replaced with 4-chloro-6,7-dimethoxyquinazoline, and other raw materials, reagents and preparation methods were the same as in example 1 to provide the product DC621017, yield 80%. $^1$HNMR (400 MHz, DMSO-d6) δ 10.71 (s, 1H), 8.51 (s, 1H), 7.63-7.55 (m, 3H), 7.54-7.50 (m, 2H), 7.49-7.45 (m, 2H), 7.38 (s, 1H), 7.19 (s, 2H), 3.99 (s, 3H), 3.97 (s, 3H), 3.68 (s, 3H), 3.58 (t, J=5.8 Hz, 2H), 3.23 (t, J=6.2 Hz, 2H), 2.05-1.96 (m, 2H), 1.87-1.77 (m, 2H). LRMS (EI) m/z: 568 (M+H)$^+$.

Example 16 N-(4-((6,7-bis(2-methoxyethoxy)quinazolin-4-yl)oxy)-3-methoxyphenyl)-2-oxo-1-phenyl-1,2,4,5,6,7-hexahydropyrazolo[1,5-a]pyridine-3-formamide (DC621018)

2-fluoro-4-nitrophenol was replaced with 2-methoxy-4-nitrophenol, and 4-chloro-6,7-dimethoxyquinoline was replaced with 4-chloro-6,7-bis(2-methoxyethoxy)quinazoline, and other raw materials, reagents and preparation methods were the same as in example 1 to provide the product DC621018, yield 80%. $^1$HNMR (400 MHz, DMSO-d6) δ 10.71 (s, 1H), 8.50 (s, 1H), 7.62-7.54 (m, 4H), 7.53-7.44 (m, 3H), 7.40 (s, 1H), 7.18 (s, 2H), 4.39-4.26 (m, 4H), 3.80-3.73 (m, 4H), 3.68 (s, 3H), 3.58 (t, J=5.8 Hz, 2H), 3.36 (s, 3H), 3.36 (s, 3H), 3.23 (t, J=6.3 Hz, 2H), 2.07-1.93 (m, 2H), 1.88-1.77 (m, 2H). LRMS (EI) m/z: 656 (M+H)$^+$.

Example 17 N-(4-(((6,7-dimethoxyquinazoline-4-yl)oxy)-3-methylphenyl)-2-oxo-1-phenyl-1,2,4,5,6,7-hexahydropyrazolo[1,5-a]pyridine-3-formamide (DC621019)

2-fluoro-4-nitrophenol was replaced with 2-methyl-4-nitrophenol, 4-chloro-6,7-dimethoxyquinoline was replaced with 4-chloro-6,7-dimethoxyquinazoline, and other raw materials, reagents and preparation methods were the same as in example 1 to provide the product DC621019, yield 80%. $^1$HNMR (400 MHz, DMSO-d6) δ 10.64 (s, 1H), 8.52 (s, 1H), 7.63-7.56 (m, 4H), 7.55-7.50 (m, 2H), 7.49-7.45 (m, 2H), 7.39 (s, 1H), 7.16 (d, J=8.7 Hz, 1H), 3.99 (s, 3H), 3.98 (s, 3H), 3.57 (t, J=5.8 Hz, 2H), 3.22 (t, J=6.3 Hz, 2H), 2.07 (s, 3H), 2.02-1.95 (m, 2H), 1.86-1.79 (m, 2H). LRMS (EI) m/z: 552 (M+H)$^+$.

Example 18 N-(4-((6,7-bis(2-methoxyethoxy)quinazolin-4-yl)oxy)-3-methylphenyl)-2-oxo-1-phenyl-1,2,4,5,6,7-hexahydropyrazolo[1,5-a]pyridine-3-formamide (DC621020)

2-fluoro-4-nitrophenol was replaced with 2-methyl-4-nitrophenol, and 4-chloro-6,7-dimethoxyquinoline was replaced with 4-chloro-6,7-bis(2-methoxyethoxy)quinazoline, an d other raw materials, reagents and preparation methods were the same as in example 1 to provide the product DC621020, yield 80%. $^1$HNMR (400 MHz, DMSO-d6) δ 10.64 (s, 1H), 8.51 (s, 1H), 7.64 (s, 1H), 7.63-7.56 (m, 3H), 7.55-7.50 (m, 2H), 7.49-7.44 (m, 2H), 7.42 (s, 1H), 7.16 (d, J=8.7 Hz, 1H), 4.39-4.29 (m, 4H), 3.79-3.75 (m, 4H), 3.57 (t, J=5.8 Hz, 2H), 3.36 (s, 3H), 3.36 (s, 3H), 3.22 (t, J=6.3 Hz, 2H), 2.07 (s, 3H), 2.03-1.94 (m, 2H), 1.88-1.77 (m, 2H). LRMS (EI) m/z: 640 (M+H)$^+$.

Example 19 N-(4-(((6,7-dimethoxyquinazoline-4-yl)oxy)-2-fluorophenyl)-2-oxo-1-phenyl-1,2,4,5,6,7-hexahydropyrazolo[1,5-a]pyridine-3-formamide (DC621021)

3.6 Synthesis of 4-(3-fluoro-4-nitrophenoxy)-6,7-dimethoxyquinazoline

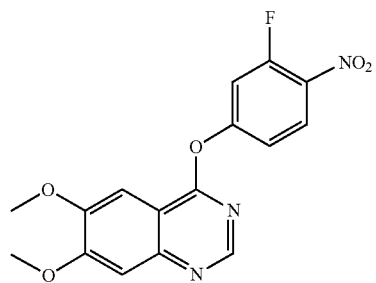 [SMILES: COc1cc2ncnc(Oc3ccc([N+](=O)[O-])c(F)c3)c2cc1OC]

5 g 4-chloro-6,7-dimethoxyquinoline, 4.2 g 3-fluoro-4-nitrophenol, 50 mL PhCl were added to a 100 mL eggplant-shaped flask, and then stirred overnight at 140° C. The reaction was monitored by thin layer chromatography (TLC). After the reaction, PhCl was spun off to precipitate yellow solid, which was suction filtered to obtain 6.5 g of solid. LRMS (EI) m z 346 (M+H)$^+$ The remaining steps are as in example 1 to provide product DC621021, yield 80%. $^1$HNMR (400 MHz, DMSO-d6) δ 10.89 (s, 1H), 8.57 (s, 1H), 8.50 (t, J=9.0 Hz, 1H), 7.59 (t, J=7.5 Hz, 2H), 7.56-7.51 (m, 2H), 7.50-7.46 (m, 2H), 7.44-7.39 (m, 2H), 7.16 (d, J=9.0 Hz, 1H), 3.99 (s, 3H), 3.97 (s, 3H), 3.58 (t, J=5.8 Hz, 2H), 3.22 (t, J=6.2 Hz, 2H), 2.04-1.94 (m, 2H), 1.88-1.78 (m, 2H). LRMS (EI) m/z: 556 (M+H)$^+$.

Example 20 1-(2,5-difluorophenyl)-N-(4-(((6,7-dimethoxyquinazoline-4-yl)oxy)phenyl)-2-oxo-1,2,4,5,6,7-hexahydropyrazolo[1,5-a]pyridine-3-formamide (DC621022)

2-fluoro-4-nitrophenol was replaced with p-nitrophenol, 4-chloro-6,7-dimethoxyquinoline was replaced with 4-chloro-6,7-dimethoxyquinazoline, and phenylhydrazine was replaced with 2,5-difluorophenylhydrazine, while the remaining raw materials, reagents and preparation methods were the same as those in example 1 to obtain the product DC621022, yield 80%. $^1$HNMR (400 MHz, DMSO-d6) δ 10.46 (s, 1H), 8.55 (s, 1H), 7.67-7.60 (m, 4H), 7.59-7.51 (m, 2H), 7.39 (s, 1H), 7.26 (d, J=8.9 Hz, 2H), 3.99 (s, 3H), 3.98 (s, 3H), 3.58 (t, J=5.8 Hz, 2H), 3.21 (t, J=6.1 Hz, 2H), 2.06-1.93 (m, 2H), 1.89-1.75 (m, 2H). LRMS (EI) m/z: 574 (M+H)$^+$.

Example 21 1-(2,5-difluorophenyl)-N-(4-(((6,7-dimethoxyquinazoline-4-yl)oxy)-3-fluorophenyl)-2-oxo-1,2,4,5,6,7-hexahydropyrazolo[1,5-a]pyridine-3-formamide (DC621023)

4-chloro-6,7-dimethoxyquinoline was replaced with 4-chloro-6,7-dimethoxyquinazoline, and phenylhydrazine was replaced with 2,5-difluorophenylhydrazine, while other raw materials, reagents and preparation methods were the same as in example 1 to provide the product DC621023, yield 80%. $^1$HNMR (400 MHz, DMSO-d6) δ 10.57 (s, 1H), 8.57 (s, 1H), 7.92 (dd, J=12.9, 2.4 Hz, 1H), 7.69-7.52 (m, 4H), 7.45-7.37 (m, 2H), 7.35-7.28 (m, 1H), 4.00 (s, 3H), 3.98 (s, 3H), 3.60 (t, J=5.8 Hz, 2H), 3.21 (t, J=6.2 Hz, 2H), 2.05-1.93 (m, 2H), 1.89-1.75 (m, 2H). LRMS (EI) m/z: 592 (M+H)$^+$.

Example 22 1-(2,5-difluorophenyl)-N-(4-(((6,7-bis(2-methoxyethoxy)quinazolin-4-yl)oxy)-3-fluorophenyl)-2-oxo-1,2,4,5,6,7-hexahydropyrazolo[1,5-a]pyridine-3-formamide (DC621024)

4-chloro-6,7-dimethoxyquinoline was replaced with 4-chloro-6,7-bis((2-methoxyethoxy) quinazoline, phenylhydrazine was replaced with 2,5-difluorophenylhydrazine, and other raw materials, reagents and preparation methods were the same as in example 1 to provide the product DC621024, yield 80%. $^1$HNMR (400 MHz, DMSO-d6) δ 10.57 (s, 1H), 8.56 (s, 1H), 7.92 (dd, J=12.8, 2.4 Hz, 1H), 7.68-7.52 (m, 5H), 7.44 (s, 1H), 7.40 (d, J=8.8 Hz, 1H), 7.35-7.28 (m, 1H), 4.38-4.31 (m, 4H), 3.80-3.72 (m, 4H), 3.53 (t, J=5.8 Hz, 2H), 3.36 (s, 3H), 3.36 (s, 3H), 3.21 (t, J=6.2 Hz, 2H), 2.04-1.95 (m, 2H), 1.87-1.77 (m, 2H). LRMS (EI) m/z: 680 (M+H)$^+$.

Example 23 1-(2,5-difluorophenyl)-N-(4-((6,7-bis (2-methoxyethoxy)quinazolin-4-yl)oxy)phenyl)-2-oxo-1,2,4,5,6,7-hexahydropyrazolo[1,5-a]pyridine-3-formamide (DC621025)

2-fluoro-4-nitrophenol was replaced with p-nitrophenol, and 4-chloro-6,7-dimethoxyquinoline was replaced with 4-chloro-6,7-bis(2-methoxyethoxy)quinazoline, phenylhydrazine was replaced with 2,5-difluorophenylhydrazine, and other raw materials, reagents and preparation methods were the same as in example 1 to provide the product DC621025, yield 80%. $^1$HNMR (400 MHz, DMSO-d6) δ 10.46 (s, 1H), 8.54 (s, 1H), 7.73-7.49 (m, 6H), 7.41 (s, 1H), 7.34-7.21 (m, 2H), 4.37-4.28 (m, 4H), 3.79-3.73 (m, 4H), 3.59 (t, J=5.8 Hz, 2H), 3.36 (s, 3H), 3.36 (s, 3H), 3.21 (t, J=6.2 Hz, 2H), 2.04-1.93 (m, 2H), 1.87-1.76 (m, 2H). LRMS (EI) m/z: 662 (M+H)$^+$.

Example 24 1-(2,5-difluorophenyl)-N-(4-((7-benzyloxy-6-methoxyquinazolin-4-yl)oxy)-3-fluorophenyl)-2-oxo-1,2,4,5,6,7-hexahydropyrazolo[1,5-a]pyridine-3-formamide (DC621026)

4-chloro-6,7-dimethoxyquinoline was replaced with 4-chloro-7-benzyloxy-6-methoxyquinazolin, and phenylhydrazine was replaced with 2,5-difluorophenylhydrazine, while other raw materials, reagents and preparation methods were the same as in example 1 to provide the product DC621026, yield 80%. $^1$HNMR (400 MHz, DMSO-d6) δ 10.57 (s, 1H), 8.56 (s, 1H), 7.92 (dd, J=12.8, 2.3 Hz, 1H), 7.69-7.59 (m, 3H), 7.58-7.51 (m, 4H), 7.47-7.37 (m, 4H), 7.35-7.29 (m, 1H), 5.36 (s, 2H), 3.99 (s, 3H), 3.58 (t, J=5.8 Hz, 2H), 3.21 (t, J=6.2 Hz, 2H), 2.05-1.93 (m, 2H), 1.87-1.75 (m, 2H). LRMS (EI) m/z: 668 (M+H)$^+$.

Example 25 1-(2,5-difluorophenyl)-N-(4-((7-benzyloxy-6-methoxyquinazolin-4-yl)oxy)phenyl)-2-oxo-1,2,4,5,6,7-hexahydropyrazolo[1,5-a]pyridine-3-formamide (DC621027)

2-fluoro-4-nitrophenol was replaced with p-nitrophenol, 4-chloro-6,7-dimethoxyquinoline was replaced with 4-chloro-7-benzyloxy-6-methoxyquinazoline, and phenylhydrazine was replaced with 2,5-difluorophenylhydrazine, while the remaining raw materials, reagents and preparation methods were the same as those in example 1 to obtain the product DC621027, yield 80%. $^1$HNMR (400 MHz, DMSO-d6) δ 10.46 (s, 1H), 8.54 (s, 1H), 7.73-7.49 (m, 9H), 7.44 (t, J=7.3 Hz, 2H), 7.41-7.34 (m, 1H), 7.26 (d, J=8.9 Hz, 2H), 5.35 (s, 2H), 3.98 (s, 3H), 3.58 (t, J=5.8 Hz, 2H), 3.21 (t, J=6.1 Hz, 2H), 2.06-1.91 (m, 2H), 1.88-1.76 (m, 2H). LRMS (EI) m/z: 650 (M+H)$^+$.

Example 26 1-(2,5-difluorophenyl)-N-(3-fluoro-4-(quinolin-4-yloxy)phenyl)-2-oxo-1,2,4,5,6,7-hexahydropyrazolo[1,5-a]pyridine-3-formamide (DC621028)

4-chloro-6,7-dimethoxyquinoline was replaced with 4-chloroquinoline, and phenylhydrazine was replaced with 2,5-difluorophenylhydrazine, while other raw materials, reagents and preparation methods were the same as in example 1 to provide the product DC621028, yield 80%. $^1$HNMR (400 MHz, DMSO-d6) δ 10.57 (s, 1H), 8.87 (d, J=2.9 Hz, 1H), 8.05-7.91 (m, 3H), 7.76-7.49 (m, 6H), 7.45-7.24 (m, 2H), 3.59 (t, J=5.8 Hz, 2H), 3.20 (t, J=6.2 Hz, 2H), 2.04-1.94 (m, 2H), 1.86-1.75 (m, 2H). LRMS (EI) m/z: 531 (M+H)$^+$.

Example 27 1-(2,5-difluorophenyl)-N-(4-((6,7-dimethoxyquinazoline-4-yl)oxy)-3-methoxyphenyl)-2-oxo-1,2,4,5,6,7-hexahydropyrazolo[1,5-a]pyridine-3-formamide (DC621029)

2-fluoro-4-nitrophenol was replaced with 2-methoxy-4-nitrophenol, 4-chloro-6,7-dimethoxyquinoline was replaced with 4-chloro-6,7-dimethoxyquinazoline, and phenylhydrazine was replaced with 2,5-difluorophenylhydrazine, while the remaining raw materials, reagents and preparation methods were the same as those in example 1 to obtain the product DC621029, yield 80%. $^1$HNMR (400 MHz, DMSO-d6) δ 10.49 (s, 1H), 8.51 (s, 1H), 7.70-7.51 (m, 5H), 7.38 (s, 1H), 7.19 (s, 2H), 3.99 (s, 3H), 3.97 (s, 3H), 3.68 (s, 3H), 3.53 (t, J=5.8 Hz, 2H), 3.22 (t, J=6.2 Hz, 2H), 2.03-1.95 (m, 2H), 1.86-1.78 (m, 2H). LRMS (EI) m/z: 604 (M+H)$^+$.

Example 28 1-(2,5-difluorophenyl)-N-(4-((6,7-bis (2-methoxyethoxy)quinazolin-4-yl)oxy)-3-methoxyphenyl)-2-oxo-1,2,4,5,6,7-hexahydropyrazolo[1,5-a]pyridine-3-formamide (DC621030)

2-fluoro-4-nitrophenol was replaced with 2-methoxy-4-nitrophenol, and 4-chloro-6,7-dimethoxyquinoline was replaced with 4-chloro-6,7-bis(2-methoxyethoxy)quinazoline, phenylhydrazine was replaced with 2,5-difluorophenylhydrazine, and other raw materials, reagents and preparation methods were the same as in example 1 to provide the product DC621030, yield 80%. $^1$HNMR (400 MHz, DMSO-d6) δ 10.49 (s, 1H), 8.50 (s, 1H), 7.71-7.51 (m, 5H), 7.40 (s, 1H), 7.19 (s, 2H), 4.43-4.26 (m, 4H), 3.79-3.71 (m, 4H), 3.68 (s, 3H), 3.52 (t, J=5.8 Hz, 2H), 3.36 (s, 3H), 3.36 (s, 3H), 3.22 (t, J=6.2 Hz, 2H), 2.05-1.93 (m, 2H), 1.87-1.76 (m, 2H). LRMS (EI) m/z: 692 (M+H)$^+$.

Example 29 1-(2,5-difluorophenyl)-N-(4-((6,7-dimethoxyquinazoline-4-yl)oxy)-3-methylphenyl)-2-oxo-1,2,4,5,6,7-hexahydropyrazolo[1,5-a]pyridine-3-formamide (DC621031)

2-fluoro-4-nitrophenol was replaced with 2-methyl-4-nitrophenol, 4-chloro-6,7-dimethoxyquinoline was replaced with 4-chloro-6,7-dimethoxyquinazoline, and phenylhydrazine was replaced with 2,5-difluorophenylhydrazine, while the remaining raw materials, reagents and preparation methods were the same as those in example 1 to obtain the product DC621031, yield 80%. $^1$HNMR (400 MHz, DMSO-d6) δ 10.42 (s, 1H), 8.52 (s, 1H), 7.70-7.48 (m, 6H), 7.39 (s, 1H), 7.16 (d, J=8.7 Hz, 1H), 3.99 (s, 3H), 3.98 (s, 3H), 3.58 (t, J=5.8 Hz, 2H), 3.21 (t, J=6.2 Hz, 2H), 2.07 (s, 3H), 2.02-1.95 (m, 2H), 1.88-1.76 (m, 2H). LRMS (EI) m/z: 588 (M+H)$^+$.

Example 30 1-(2,5-difluorophenyl)-N-(4-((6,7-bis (2-methoxyethoxy)quinazolin-4-yl)oxy)-3-methylphenyl)-2-oxo-1,2,4,5,6,7-hexahydropyrazolo[1,5-a]pyridine-3-formamide (DC621032)

2-fluoro-4-nitrophenol was replaced with 2-methoxy-4-nitrophenol, and 4-chloro-6,7-dimethoxyquinoline was replaced with 4-chloro-6,7-bis(2-methoxyethoxy)quinazoline, phenylhydrazine was replaced with 2,5-difluorophenylhydrazine, and other raw materials, reagents and preparation methods were the same as in example 1 to provide the product DC621032, yield 80%. ¹HNMR (400 MHz, DMSO-d6) δ 10.42 (s, 1H), 8.52 (s, 1H), 7.67-7.50 (m, 6H), 7.42 (m, 1H), 7.17 (d, J=8.7 Hz, 1H), 4.39-4.31 (m, 4H), 3.80-3.73 (m, 4H), 3.59 (t, J=5.8 Hz, 2H), 3.36 (s, 3H), 3.36 (s, 3H), 3.21 (t, J=6.2 Hz, 2H), 2.07 (s, 3H), 2.01-1.93 (m, 2H), 1.88-1.72 (m, 2H). LRMS (EI) m/z: 676 (M+H)$^+$.

Example 31 N-(4-((6,7-dimethoxyquinazoline-4-yl) oxy)phenyl)-1-(2-fluorophenyl)-2-oxo-1,2,4,5,6,7-hexahydropyrazolo[1,5-a]pyridine-3-formamide (DC621033)

2-fluoro-4-nitrophenol was replaced with p-nitrophenol, 4-chloro-6,7-dimethoxyquinoline was replaced with 4-chloro-6,7-dimethoxyquinazoline, and phenylhydrazine was replaced with 2-fluorophenylhydrazine, while the remaining raw materials, reagents and preparation methods were the same as those in example 1 to obtain the product DC621033, yield 80%. ¹HNMR (400 MHz, DMSO-d6) δ 10.54 (s, 1H), 8.55 (s, 1H), 7.72-7.60 (m, 4H), 7.58-7.50 (m, 2H), 7.47-7.41 (m, 1H), 7.39 (s, 1H), 7.30-7.23 (m, 2H), 3.99 (s, 3H), 3.98 (s, 3H), 3.56 (t, J=5.8 Hz, 2H), 3.21 (t, J=6.2 Hz, 2H), 2.04-1.93 (m, 2H), 1.86-1.78 (m, 2H). LRMS (EI) m/z: 556 (M+H)$^+$.

Example 32 N-(4-((6,7-dimethoxyquinazoline-4-yl) oxy)-3-fluorophenyl)-1-(2-fluorophenyl)-2-oxo-1,2, 4,5,6,7-hexahydropyrazolo[1,5-a]pyridine-3-formamide (DC621034)

4-chloro-6,7-dimethoxyquinoline was replaced with 4-chloro-6,7-dimethoxyquinazoline, and phenylhydrazine was replaced with 2-fluorophenylhydrazine, while other raw materials, reagents and preparation methods were the same as in example 1 to provide the product DC621034, yield 80%. ¹HNMR (400 MHz, DMSO-d6) δ 10.66 (s, 1H), 8.57 (s, 1H), 7.92 (dd, J=12.9, 2.4 Hz, 1H), 7.69-7.60 (m, 2H), 7.58-7.50 (m, 2H), 7.47-7.38 (m, 3H), 7.33-7.28 (m, 1H), 4.00 (s, 3H), 3.98 (s, 3H), 3.57 (t, J=5.8 Hz, 2H), 3.21 (t, J=6.2 Hz, 2H), 2.02-1.94 (m, 2H), 1.86-1.77 (m, 2H). LRMS (EI) m/z: 574 (M+H)$^+$.

Example 33 N-(4-((6,7-bis(2-methoxyethoxy)quinazolin-4-yl)oxy)-3-fluorophenyl)-1-(2-fluorophenyl)-2-oxo-1,2,4,5,6,7-hexahydropyrazolo[1,5-a] pyridine-3-formamide (DC621035)

4-chloro-6,7-dimethoxyquinoline was replaced with 4-chloro-6,7-bis((2-methoxyethoxy) quinazoline, phenylhydrazine was replaced with 2-fluorophenylhydrazine, and other raw materials, reagents and preparation methods were the same as in example 1 to provide the product DC621035, yield 80%. ¹HNMR (400 MHz, DMSO-d6) δ 10.66 (s, 1H), 8.56 (s, 1H), 7.92 (dd, J=12.9, 2.4 Hz, 1H), 7.69-7.59 (m, 3H), 7.54 (t, J=8.7 Hz, 1H), 7.48-7.38 (m, 3H), 7.33-7.28 (m, 1H), 4.42-4.27 (m, 4H), 3.79-3.72 (m, 4H), 3.58 (t, J=5.8 Hz, 2H), 3.36 (s, 3H), 3.36 (s, 3H), 3.21 (t, J=6.2 Hz, 2H), 2.02-1.92 (m, 2H), 1.85-1.78 (m, 2H). LRMS (EI) m/z: 662 (M+H)$^+$.

Example 34 N-(4-((6,7-bis(2-methoxyethoxy)quinazolin-4-yl)oxy)phenyl)-1-(2-fluorophenyl)-2-oxo-1,2,4,5,6,7-hexahydropyrazolo[1,5-a]pyridine-3-formamide (DC621036)

2-fluoro-4-nitrophenol was replaced with p-nitrophenol, and 4-chloro-6,7-dimethoxyquinoline was replaced with 4-chloro-6,7-bis(2-methoxyethoxy)quinazoline, phenylhydrazine was replaced with 2-fluorophenylhydrazine, and other raw materials, reagents and preparation methods were the same as in example 1 to provide the product DC621036, yield 80%. ¹HNMR (400 MHz, DMSO-d6) δ 10.54 (s, 1H), 8.54 (s, 1H), 7.71-7.59 (m, 5H), 7.53 (t, J=9.2 Hz, 1H), 7.47-7.40 (m, 2H), 7.26 (d, J=8.9 Hz, 2H), 4.39-4.24 (m, 4H), 3.79-3.73 (m, 4H), 3.53 (t, J=5.8 Hz, 2H), 3.36 (s, 3H), 3.36 (s, 3H), 3.21 (t, J=6.1 Hz, 2H), 2.03-1.94 (m, 2H), 1.86-1.76 (m, 2H). LRMS (EI) m/z: 644 (M+H)$^+$.

Example 35 N-(4-((7-benzyloxy-6-methoxyquinazolin-4-yl)oxy)-3-fluorophenyl)-1-(2-fluorophenyl)-2-oxo-1,2,4,5,6,7-hexahydropyrazolo[1,5-a]pyridine-3-formamide (DC621037)

4-chloro-6,7-dimethoxyquinoline was replaced with 4-chloro-7-benzyloxy-6-methoxyquinazoline, and phenylhydrazine was replaced with 2-fluorophenylhydrazine, while other raw materials, reagents and preparation methods were the same as in example 1 to provide the product DC621037, yield 80%. ¹HNMR (400 MHz, DMSO-d6) δ 10.66 (s, 1H), 8.56 (s, 1H), 7.92 (dd, J=12.8, 2.4 Hz, 1H), 7.69-7.58 (m, 3H), 7.57-7.51 (m, 4H), 7.47-7.35 (m, 5H), 7.33-7.28 (m, 1H), 5.36 (s, 2H), 3.99 (s, 3H), 3.60 (t, J=5.8 Hz, 2H), 3.20 (t, J=6.1 Hz, 2H), 2.02-1.93 (m, 2H), 1.86-1.77 (m, 2H). LRMS (EI) m/z: 650 (M+H)$^+$.

Example 36 N-(3-fluoro-4-(quinolin-3-yloxy)phenyl)-1-(2-fluorophenyl)-2-oxo-1,2,4,5,6,7-hexahydropyrazolo[1,5-a]pyridine-3-formamide (DC621038)

4-chloro-6,7-dimethoxyquinoline was replaced with 4-chloroquinoline, and phenylhydrazine was replaced with 2-fluorophenylhydrazine, while other raw materials, reagents and preparation methods were the same as in example 1 to provide the product DC621038, yield 80%. ¹HNMR (400 MHz, DMSO-d6) δ 10.65 (s, 1H), 8.87 (d, J=2.9 Hz, 1H), 8.05-7.89 (m, 3H), 7.70-7.50 (m, 6H), 7.44 (t, J=7.6 Hz, 1H), 7.39-7.28 (m, 2H), 3.54 (t, J=5.8 Hz, 2H), 3.20 (t, J=6.2 Hz, 2H), 2.01-1.93 (m, 2H), 1.86-1.76 (m, 2H). LRMS (EI) m/z: 513 (M+H)$^+$.

Example 37 N-(4-((6,7-dimethoxyquinazoline-4-yl) oxy)-3-methoxyphenyl)-1-(2-fluorophenyl)-2-oxo-1, 2,4,5,6,7-hexahydropyrazolo[1,5-a]pyridine-3-formamide (DC621039)

2-fluoro-4-nitrophenol was replaced with 2-methoxy-4-nitrophenol, 4-chloro-6,7-dimethoxyquinoline was replaced with 4-chloro-6,7-dimethoxyquinazoline, and phenylhydrazine was replaced with 2-fluorophenylhydrazine, while the remaining raw materials, reagents and preparation methods were the same as those in example 1 to obtain the product DC621039, yield 80%. ¹HNMR (400 MHz, DMSO-d6) δ 10.57 (s, 1H), 8.51 (s, 1H), 7.67-7.60 (m, 2H), 7.53 (t, J=9.0 Hz, 3H), 7.44 (t, J=7.7 Hz, 1H), 7.38 (s, 1H), 7.19 (s, 2H), 3.99 (s, 3H), 3.97 (s, 3H), 3.68 (s, 3H), 3.50 (t, J=5.8 Hz, 2H), 3.22 (t, J=6.2 Hz, 2H), 2.02-1.95 (m, 2H), 1.84-1.77 (m, 2H). LRMS (EI) m/z: 586 (M+H)$^+$.

Example 38 N-(4-((6,7-bis(2-methoxyethoxy)quinazolin-4-yl)oxy)-3-methoxyphenyl)-1-(2-fluorophenyl)-2-oxo-1,2,4,5,6,7-hexahydropyrazolo[1,5-a] pyridine-3-formamide (DC621040)

2-fluoro-4-nitrophenol was replaced with 2-methoxy-4-nitrophenol, and 4-chloro-6,7-dimethoxyquinoline was replaced with 4-chloro-6,7-bis(2-methoxyethoxy)quinazoline, phenylhydrazine was replaced with 2-fluorophenylhydrazine, and other raw materials, reagents and preparation methods were the same as in example 1 to provide the product DC621040, yield 80%. $^1$HNMR (400 MHz, DMSO-d6) δ 10.57 (s, 1H), 8.50 (s, 1H), 7.70-7.60 (m, 2H), 7.58-7.50 (m, 3H), 7.48-7.38 (m, 2H), 7.18 (s, 2H), 4.38-4.27 (m, 4H), 3.80-3.72 (m, 4H), 3.68 (s, 3H), 3.50 (t, J=5.8 Hz, 2H), 3.36 (s, 3H), 3.36 (s, 3H), 3.22 (t, J=6.1 Hz, 2H), 2.03-1.93 (m, 2H), 1.86-1.76 (m, 2H). LRMS (EI) m/z: 674 (M+H)$^+$.

Example 39 N-(4-((6,7-dimethoxyquinazoline-4-yl)oxy)-3-methylphenyl)-1-(2-fluorophenyl)-2-oxo-1,2,4,5,6,7-hexahydropyrazolo[1,5-a]pyridine-3-formamide (DC621041)

2-fluoro-4-nitrophenol was replaced with 2-methyl-4-nitrophenol, 4-chloro-6,7-dimethoxyquinoline was replaced with 4-chloro-6,7-dimethoxyquinazoline, and phenylhydrazine was replaced with 2-difluorophenylhydrazine, while the remaining raw materials, reagents and preparation methods were the same as those in example 1 to obtain the product DC621041, yield 80%. $^1$HNMR (400 MHz, DMSO-d6) δ 10.50 (s, 1H), 8.53 (s, 1H), 7.69-7.58 (m, 4H), 7.57-7.49 (m, 2H), 7.44 (t, J=7.7 Hz, 1H), 7.39 (s, 1H), 7.16 (d, J=8.7 Hz, 1H), 3.99 (s, 3H), 3.98 (s, 3H), 3.54 (t, J=5.8 Hz, 2H), 3.21 (t, J=6.2 Hz, 2H), 2.07 (s, 3H), 2.01-1.96 (m, 2H), 1.86-1.78 (m, 2H). LRMS (EI) m/z: 570 (M+H)$^+$.

Example 40 N-(4-((6,7-bis(2-methoxyethoxy)quinazolin-4-yl)oxy)-3-methylphenyl)-1-(2-fluorophenyl)-2-oxo-1,2,4,5,6,7-hexahydropyrazolo[1,5-a]pyridine-3-formamide (DC621042)

2-fluoro-4-nitrophenol was replaced with 2-methoxy-4-nitrophenol, and 4-chloro-6,7-dimethoxyquinoline was replaced with 4-chloro-6,7-bis(2-methoxyethoxy)quinazoline, phenylhydrazine was replaced with 2-fluorophenylhydrazine, and other raw materials, reagents and preparation methods were the same as in example 1 to provide the product DC621042, yield 80%. $^1$HNMR (400 MHz, DMSO-d6) δ 10.50 (s, 1H), 8.52 (s, 1H), 7.68-7.58 (m, 4H), 7.56-7.49 (m, 2H), 7.47-7.40 (m, 2H), 7.16 (d, J=8.7 Hz, 1H), 4.40-4.29 (m, 4H), 3.79-3.73 (m, 4H), 3.54 (t, J=5.8 Hz, 2H), 3.36 (s, 3H), 3.36 (s, 3H), 3.21 (t, J=6.2 Hz, 2H), 2.07 (s, 3H), 2.02-1.93 (m, 2H), 1.83-1.77 (m, 2H). LRMS (EI) m/z: 658 (M+H)$^+$.

Example 41 N-(4-((6,7-dimethoxyquinazoline-4-yl)oxy)-3-fluorophenyl)-1-(4-fluorophenyl)-2-oxo-1,2,4,5,6,7-hexahydropyrazolo[1,5-a]pyridine-3-formamide (DC621043)

4-chloro-6,7-dimethoxyquinoline was replaced with 4-chloro-6,7-dimethoxyquinazoline, and phenylhydrazine was replaced with 4-fluorophenylhydrazine, while other raw materials, reagents and preparation methods were the same as in example 1 to provide the product DC621043, yield 80%. $^1$HNMR (400 MHz, DMSO-d6) δ 10.66 (s, 1H), 8.57 (s, 1H), 7.92 (dd, J=12.9, 2.4 Hz, 1H), 7.69-7.60 (m, 2H), 7.58-7.50 (m, 2H), 7.47-7.38 (m, 3H), 7.33-7.28 (m, 1H), 4.00 (s, 3H), 3.98 (s, 3H), 3.57 (t, J=5.8 Hz, 2H), 3.21 (t, J=6.2 Hz, 2H), 2.03-1.93 (m, 2H), 1.86-1.77 (m, 2H). LRMS (EI) m/z: 574 (M+H)$^+$.

Example 42 N-(4-((6,7-bis(2-methoxyethoxy)quinazolin-4-yl)oxy)-3-fluorophenyl)-1-(4-fluorophenyl)-2-oxo-1,2,4,5,6,7-hexahydropyrazolo[1,5-a]pyridine-3-formamide (DC621044)

4-chloro-6,7-dimethoxyquinoline was replaced with 4-chloro-6,7-bis((2-methoxyethoxy) quinazoline, phenylhydrazine was replaced with 4-fluorophenylhydrazine, and other raw materials, reagents and preparation methods were the same as in example 1 to provide the product DC621044, yield 80%. $^1$HNMR (400 MHz, DMSO-d6) δ 10.77 (s, 1H), 8.56 (s, 1H), 7.92 (dd, J=12.9, 2.3 Hz, 1H), 7.61 (s, 1H), 7.59-7.50 (m, 2H), 7.48-7.37 (m, 4H), 7.34-7.27 (m, 1H), 4.40-4.29 (m, 4H), 3.79-3.73 (m, 4H), 3.56 (t, J=5.7 Hz, 2H), 3.36 (s, 3H), 3.36 (s, 3H), 3.20 (t, J=6.2 Hz, 2H), 2.01-1.93 (m, 2H), 1.86-1.77 (m, 2H). LRMS (EI) m/z: 662 (M+H)$^+$.

Example 43 N-(4-((6,7-bis(2-methoxyethoxy)quinazolin-4-yl)oxy)phenyl)-1-(4-fluorophenyl)-2-oxo-1,2,4,5,6,7-hexahydropyrazolo[1,5-a]pyridine-3-formamide (DC621045)

2-fluoro-4-nitrophenol was replaced with p-nitrophenol, and 4-chloro-6,7-dimethoxyquinoline was replaced with 4-chloro-6,7-bis(2-methoxyethoxy)quinazoline, phenylhydrazine was replaced with 4-fluorophenylhydrazine, and other raw materials, reagents and preparation methods were the same as in example 1 to provide the product DC621045, yield 80%. $^1$HNMR (400 MHz, DMSO-d6) δ 10.65 (s, 1H), 8.52 (d, J=12.9 Hz, 1H), 7.71-7.65 (m, 2H), 7.60 (s, 1H), 7.57-7.52 (m, 2H), 7.48-7.39 (m, 3H), 7.29-7.23 (m, 2H), 4.45-4.22 (m, 4H), 3.79-3.74 (m, 4H), 3.56 (t, J=5.9 Hz, 2H), 3.36 (s, 3H), 3.36 (s, 3H), 3.21 (t, J=6.2 Hz, 2H), 2.03-1.94 (m, 2H), 1.85-1.78 (m, 2H). LRMS (EI) m/z: 644 (M+H)$^+$.

Example 44 N-(4-((7-benzyloxy-6-methoxyquinazolin-4-yl)oxy)-3-fluorophenyl)-1-(4-fluorophenyl)-2-oxo-1,2,4,5,6,7-hexahydropyrazolo[1,5-a]pyridine-3-formamide (DC621046)

4-chloro-6,7-dimethoxyquinoline was replaced with 4-chloro-7-benzyloxy-6-methoxyquinazoline, and phenylhydrazine was replaced with 4-fluorophenylhydrazine, while other raw materials, reagents and preparation methods were the same as in example 1 to provide the product DC621046, yield 80%. $^1$HNMR (400 MHz, DMSO-d6) δ 10.77 (s, 1H), 8.56 (s, 1H), 7.92 (dd, J=12.9, 2.4 Hz, 1H), 7.59 (s, 1H), 7.58-7.51 (m, 5H), 7.47-7.37 (m, 7H), 7.31-7.21 (m, 1H), 5.36 (s, 2H), 3.99 (s, 3H), 3.56 (t, J=5.8 Hz, 2H), 3.20 (t, J=6.2 Hz, 2H), 2.03-1.93 (m, 2H), 1.85-1.77 (m, 2H). LRMS (EI) m/z: 650 (M+H)$^+$.

Example 45 N-(4-((6,7-dimethoxyquinazoline-4-yl)oxy)-3-methoxyphenyl)-1-(4-fluorophenyl)-2-oxo-1,2,4,5,6,7-hexahydropyrazolo[1,5-a]pyridine-3-formamide (DC621047)

2-fluoro-4-nitrophenol was replaced with 2-methoxy-4-nitrophenol, 4-chloro-6,7-dimethoxyquinoline was replaced with 4-chloro-6,7-dimethoxyquinazoline, and phenylhydrazine was replaced with 4-fluorophenylhydrazine, while the remaining raw materials, reagents and preparation methods were the same as those in example 1 to obtain the product DC621047, yield 80%. $^1$HNMR (400 MHz, DMSO-d6) δ 10.68 (s, 1H), 8.51 (s, 1H), 7.58-7.52 (m, 4H), 7.48-7.40 (m, 2H), 7.38 (s, 1H), 7.21-7.15 (m, 2H), 3.99 (s, 3H), 3.97 (s, 3H), 3.68 (s, 3H), 3.56 (t, J=5.8 Hz, 2H), 3.21 (t, J=6.2 Hz, 2H), 2.02-1.92 (m, 2H), 1.86-1.74 (m, 2H). LRMS (EI) m/z: 586 (M+H)$^+$.

Example 46 N-(4-((6,7-bis(2-methoxyethoxy)quinazolin-4-yl)oxy)-3-methoxyphenyl)-1-(4-fluorophenyl)-2-oxo-1,2,4,5,6,7-hexahydropyrazolo[1,5-a]pyridine-3-formamide (DC621048)

2-fluoro-4-nitrophenol was replaced with 2-methoxy-4-nitrophenol, and 4-chloro-6,7-dimethoxyquinoline was replaced with 4-chloro-6,7-bis(2-methoxyethoxy)quinazoline, phenylhydrazine was replaced with 4-fluorophenylhydrazine, and other raw materials, reagents and preparation methods were the same as in example 1 to provide the product DC621048, yield 80%. $^1$HNMR (400 MHz, DMSO-d6) δ 10.68 (s, 1H), 8.50 (s, 1H), 7.58-7.51 (m, 4H), 7.48-7.38 (m, 3H), 7.18 (s, 2H), 4.37-4.30 (m, 4H), 3.81-3.73 (m, 4H), 3.68 (s, 3H), 3.56 (t, J=5.7 Hz, 2H), 3.36 (s, 3H), 3.36 (s, 3H), 3.21 (t, J=6.2 Hz, 2H), 2.04-1.92 (m, 2H), 1.87-1.76 (m, 2H). LRMS (EI) m/z: 674 (M+H)$^+$.

Example 47 N-(4-((6,7-dimethoxyquinazoline-4-yl)oxy)-3-methylphenyl)-1-(4-fluorophenyl)-2-oxo-1,2,4,5,6,7-hexahydropyrazolo[1,5-a]pyridine-3-formamide (DC621049)

2-fluoro-4-nitrophenol was replaced with 2-methyl-4-nitrophenol, 4-chloro-6,7-dimethoxyquinoline was replaced with 4-chloro-6,7-dimethoxyquinazoline, and phenylhydrazine was replaced with 4-fluorophenylhydrazine, while the remaining raw materials, reagents and preparation methods were the same as those in example 1 to obtain the product DC621049, yield 80%. $^1$HNMR (400 MHz, DMSO-d6) δ 10.61 (s, 1H), 8.52 (s, 1H), 7.59 (d, J=3.1 Hz, 2H), 7.57-7.49 (m, 3H), 7.44 (t, J=8.8 Hz, 2H), 7.39 (s, 1H), 7.16 (d, J=8.7 Hz, 1H), 3.99 (s, 3H), 3.98 (s, 3H), 3.56 (t, J=5.8 Hz, 2H), 3.21 (t, J=6.3 Hz, 2H), 2.07 (s, 3H), 2.02-1.95 (m, 2H), 1.85-1.77 (m, 2H). LRMS (EI) m/z: 570 (M+H)$^+$.

Example 48 N-(4-((6,7-bis(2-methoxyethoxy)quinazolin-4-yl)oxy)-3-methylphenyl)-1-(4-fluorophenyl)-2-oxo-1,2,4,5,6,7-hexahydropyrazolo[1,5-a]pyridine-3-formamide (DC621050)

2-fluoro-4-nitrophenol was replaced with 2-methyl-4-nitrophenol, and 4-chloro-6,7-dimethoxyquinoline was replaced with 4-chloro-6,7-bis(2-methoxyethoxy)quinazoline, phenylhydrazine was replaced with 4-fluorophenylhydrazine, and other raw materials, reagents and preparation methods were the same as in example 1 to provide the product DC621050, yield 80%. $^1$HNMR (400 MHz, DMSO-d6) δ 10.61 (s, 1H), 8.51 (s, 1H), 7.64 (s, 1H), 7.59 (d, J=2.3 Hz, 1H), 7.58-7.50 (m, 3H), 7.48-7.40 (m, 3H), 7.16 (d, J=8.7 Hz, 1H), 4.38-4.30 (m, 4H), 3.79-3.73 (m, 4H), 3.56 (t, J=5.8 Hz, 2H), 3.36 (s, 3H), 3.36 (s, 3H), 3.21 (t, J=6.3 Hz, 2H), 2.07 (s, 3H), 2.02-1.95 (m, 2H), 1.86-1.76 (m, 2H). LRMS (EI) m/z: 658 (M+H)$^+$.

Example 49 N-(4-((6,7-bis(2-methoxyethoxy)quinazolin-4-yl)oxy)-2-fluorophenyl)-2-oxo-1-phenyl-1,2,4,5,6,7-hexahydropyrazolo[1,5-a]pyridine-3-formamide (DC621051)

2-fluoro-4-nitrophenol was replaced with 3-fluoro-4-nitrophenol, and 4-chloro-6,7-dimethoxyquinoline was replaced with 4-chloro-6,7-bis(2-methoxyethoxy)quinazoline, and other raw materials, reagents and preparation methods were the same as in example 21 to provide the product DC621051, yield 80%. $^1$HNMR (400 MHz, DMSO-d6) δ 10.89 (s, 1H), 8.57 (s, 1H), 8.50 (t, J=9.0 Hz, 1H), 7.63-7.56 (m, 3H), 7.53 (d, J=7.3 Hz, 1H), 7.51-7.45 (m, 2H), 7.44-7.39 (m, 2H), 7.21-7.11 (m, 1H), 4.40-4.26 (m, 4H), 3.79-3.73 (m, 4H), 3.58 (t, J=5.8 Hz, 2H), 3.36 (s, 3H), 3.36 (s, 3H), 3.22 (t, J=6.2 Hz, 2H), 2.03-1.95 (m, 2H), 1.87-1.77 (m, 2H). LRMS (EI) m/z: 644 (M+H)$^+$.

Example 50 N-(3-fluoro-4-((5-phenyl-7H-pyrrolo[2,3-d]pyrimidin-4-yl)oxy)phenyl)-2-oxo-1-phenyl-1,2,4,5,6,7-hexahydropyrazolo[1,5-a]pyridine-3-formamide (DC621052)

4-chloro-6,7-dimethoxyquinoline was replaced with 4-chloro-5-phenyl-7H-pyrrolo[2,3-d]pyrimidine, and other raw materials, reagents and preparation methods were the same as in example 1 to provide the product DC621052, yield 80%. $^1$HNMR (400 MHz, DMSO-d6) δ 12.54 (s, 1H), 10.78 (s, 1H), 8.33 (s, 1H), 7.89 (dd, J=12.8, 2.3 Hz, 1H), 7.79-7.75 (m, 3H), 7.59 (t, J=7.5 Hz, 2H), 7.54-7.44 (m, 3H), 7.43-7.35 (m, 3H), 7.30-7.23 (m, 2H), 3.57 (t, J=5.8 Hz, 2H), 3.21 (t, J=6.2 Hz, 2H), 2.03-1.95 (m, 2H), 1.86-1.78 (m, 2H). LRMS (EI) m/z: 561 (M+H)$^+$.

Example 51 1-(2,5-difluorophenyl)-N-(4-((6,7-dimethoxyquinazoline-4-yl)oxy)-2-fluorophenyl)-2-oxo-1,2,4,5,6,7-hexahydropyrazolo[1,5-a]pyridine-3-formamide (DC621053)

2-fluoro-4-nitrophenol was replaced with 3-fluoro-4-nitrophenol, 4-chloro-6,7-dimethoxyquinoline was replaced with 4-chloro-6,7-dimethoxyquinazoline, and phenylhydrazine was replaced with 2,5-difluorophenylhydrazine, while the remaining raw materials, reagents and preparation methods were the same as those in example 21 to obtain the product DC621053, yield 80%. $^1$HNMR (400 MHz, DMSO-d6) δ 10.45 (s, 1H), 8.52 (s, 1H), 7.67-7.50 (m, 6H), 7.42 (s, 1H), 7.17 (d, J=8.7 Hz, 1H), 3.99 (s, 3H), 3.98 (s, 3H), 3.55 (t, J=5.8 Hz, 2H), 3.21 (t, J=6.2 Hz, 2H), 2.01-1.95 (m, 2H), 1.88-1.74 (m, 2H). LRMS (EI) m/z: 592 (M+H)$^+$.

Example 52 1-(2,5-difluorophenyl)-N-(4-((6,7-bis(2-methoxyethoxy)quinazolin-4-yl)oxy)-2-fluorophenyl)-2-oxo-1,2,4,5,6,7-hexahydropyrazolo[1,5-a]pyridine-3-formamide (DC621054)

2-fluoro-4-nitrophenol was replaced with 3-fluoro-4-nitrophenol, and 4-chloro-6,7-dimethoxyquinoline was replaced with 4-chloro-6,7-bis(2-methoxyethoxy)quinazoline, phenylhydrazine was replaced with 2,5-difluorophenylhydrazine, and other raw materials, reagents and preparation methods were the same as in example 21 to provide the product DC621054, yield 80%. $^1$HNMR (400 MHz, DMSO-d6) δ 10.67 (s, 1H), 8.57 (s, 1H), 8.48 (t, J=9.0 Hz, 1H), 7.69-7.54 (m, 4H), 7.46-7.39 (m, 2H), 7.20-7.13 (m, 1H), 4.38-4.29 (m, 4H), 3.79-3.73 (m, 4H), 3.53 (t, J=5.8 Hz, 2H), 3.36 (s, 3H), 3.36 (s, 3H), 3.21 (t, J=6.3 Hz, 2H), 2.05-1.93 (m, 2H), 1.89-1.75 (m, 2H). LRMS (EI) m/z: 680 (M+H)$^+$.

Example 53 1-(2,5-difluorophenyl)-N-(3-fluoro-4-((5-phenyl-7H-pyrrolo[2,3-d]pyrimidin-4-yl)oxy)phenyl)-2-oxo-1,2,4,5,6,7-hexahydropyrazolo[1,5-a]pyridine-3-formamide (DC621055)

4-chloro-6,7-dimethoxyquinoline was replaced with 4-chloro-5-phenyl-7H-pyrrolo[2,3-d]pyrimidine, and phenylhydrazine was replaced with 2,5-difluorophenylhydrazine, while other raw materials, reagents and preparation methods were the same as in example 1 to provide the product DC621055, yield 80%. $^1$HNMR (400 MHz, DMSO-d6) δ 12.54 (s, 1H), 10.55 (s, 1H), 8.33 (s, 1H), 7.88 (dd, J=12.8, 2.2 Hz, 1H), 7.82-7.74 (m, 3H), 7.68-7.53 (m, 3H), 7.45-7.35 (m, 3H), 7.28 (d, J=7.5 Hz, 2H), 3.57 (t, J=5.8 Hz, 2H), 3.21 (t, J=6.0 Hz, 2H), 2.07-1.96 (m, 2H), 1.88-1.76 (m, 2H). LRMS (EI) m/z: 597 (M+H)$^+$.

Example 54 N-(4-((6,7-dimethoxyquinazoline-4-yl)oxy)-2-fluorophenyl)-1-(2-fluorophenyl)-2-oxo-1,2,4,5,6,7-hexahydropyrazolo[1,5-a]pyridine-3-formamide (DC621056)

2-fluoro-4-nitrophenol was replaced with 3-fluoro-4-nitrophenol, 4-chloro-6,7-dimethoxyquinoline was replaced with 4-chloro-6,7-dimethoxyquinazoline, and phenylhydrazine was replaced with 2-fluorophenylhydrazine, while the remaining raw materials, reagents and preparation methods were the same as those in example 21 to obtain the product DC621056, yield 80%. $^1$HNMR (400 MHz, DMSO-d6) δ 10.75 (s, 1H), 8.58 (s, 1H), 8.50 (t, J=9.0 Hz, 1H), 7.70-7.60 (m, 2H), 7.57-7.50 (m, 2H), 7.47-7.38 (m, 3H), 7.19-7.14 (m, 1H), 3.99 (s, 3H), 3.97 (s, 3H), 3.52 (t, J=5.8 Hz, 2H), 3.21 (t, J=6.2 Hz, 2H), 2.03-1.93 (m, 2H), 1.87-1.77 (m, 2H). LRMS (EI) m/z: 574 (M+H)$^+$.

Example 55 N-(4-((6,7-bis(2-methoxyethoxy)quinazolin-4-yl)oxy)-2-fluorophenyl)-1-(2-fluorophenyl)-2-oxo-1,2,4,5,6,7-hexahydropyrazolo[1,5-a]pyridine-3-formamide (DC621057)

2-fluoro-4-nitrophenol was replaced with 3-fluoro-4-nitrophenol, and 4-chloro-6,7-dimethoxyquinoline was replaced with 4-chloro-6,7-bis(2-methoxyethoxy)quinazoline, phenylhydrazine was replaced with 2-fluorophenylhydrazine, and other raw materials, reagents and preparation methods were the same as in example 21 to provide the product DC621057, yield 80%. $^1$HNMR (400 MHz, DMSO-d6) δ 10.74 (s, 1H), 8.57 (s, 1H), 8.49 (t, J=9.0 Hz, 1H), 7.69-7.61 (m, 2H), 7.59 (s, 1H), 7.58-7.50 (m, 1H), 7.47-7.39 (m, 3H), 7.20-7.13 (m, 1H), 4.38-4.26 (m, 4H), 3.79-3.73 (m, 4H), 3.52 (t, J=5.8 Hz, 2H), 3.36 (s, 3H), 3.36 (s, 3H), 3.21 (t, J=6.1 Hz, 2H), 2.03-1.93 (m, 2H), 1.86-1.77 (m, 2H). LRMS (EI) m/z: 662 (M+H)$^+$.

Example 56 N-(3-fluoro-4-((5-phenyl-7H-pyrrolo[2,3-d]pyrimidin-4-yl)oxy)phenyl)-1-(2-fluorophenyl)-2-oxo-1,2,4,5,6,7-hexahydropyrazolo[1,5-a]pyridine-3-formamide (DC621058)

4-chloro-6,7-dimethoxyquinoline was replaced with 4-chloro-5-phenyl-7H-pyrrolo[2,3-d]pyrimidine, and phenylhydrazine was replaced with 2-fluorophenylhydrazine, while other raw materials, reagents and preparation methods were the same as in example 1 to provide the product DC621058, yield 80%. $^1$HNMR (400 MHz, DMSO-d6) δ 12.54 (s, 1H), 10.63 (s, 1H), 8.33 (s, 1H), 7.88 (dd, J=12.8, 2.3 Hz, 1H), 7.77 (d, J=6.9 Hz, 3H), 7.70-7.58 (m, 2H), 7.53 (t, J=8.7 Hz, 1H), 7.46-7.34 (m, 4H), 7.27 (t, J=7.4 Hz, 2H), 3.54 (t, J=5.8 Hz, 2H), 3.20 (t, J=6.1 Hz, 2H), 2.02-1.93 (m, 2H), 1.86-1.76 (m, 2H). LRMS (EI) m/z: 579 (M+H)$^+$.

Example 57 N-(4-((6,7-dimethoxyquinazoline-4-yl)oxy)-2-fluorophenyl)-1-(4-fluorophenyl)-2-oxo-1,2,4,5,6,7-hexahydropyrazolo[1,5-a]pyridine-3-formamide (DC621059)

2-fluoro-4-nitrophenol was replaced with 3-fluoro-4-nitrophenol, 4-chloro-6,7-dimethoxyquinoline was replaced with 4-chloro-6,7-dimethoxyquinazoline, and phenylhydrazine was replaced with 4-fluorophenylhydrazine, while the remaining raw materials, reagents and preparation methods were the same as those in example 21 to obtain the product DC621059, yield 80%. $^1$HNMR (400 MHz, DMSO-d6) δ 10.75 (s, 1H), 8.58 (s, 1H), 8.50 (t, J=9.0 Hz, 1H), 7.70-7.60 (m, 2H), 7.57-7.50 (m, 2H), 7.47-7.38 (m, 3H), 7.19-7.14 (m, 1H), 3.99 (s, 3H), 3.97 (s, 3H), 3.53 (t, J=5.8 Hz, 2H), 3.22 (t, J=6.2 Hz, 2H), 2.03-1.96 (m, 2H), 1.87-1.75 (m, 2H). LRMS (EI) m/z: 574 (M+H)$^+$.

Example 58 N-(4-((6,7-bis(2-methoxyethoxy)quinazolin-4-yl)oxy)-4-fluorophenyl)-1-(2-fluorophenyl)-2-oxo-1,2,4,5,6,7-hexahydropyrazolo[1,5-a]pyridine-3-formamide (DC621060)

2-fluoro-4-nitrophenol was replaced with 3-fluoro-4-nitrophenol, and 4-chloro-6,7-dimethoxyquinoline was replaced with 4-chloro-6,7-bis(2-methoxyethoxy)quinazoline, phenylhydrazine was replaced with 4-fluorophenylhydrazine, and other raw materials, reagents and preparation methods were the same as in example 21 to provide the product DC621060, yield 80%. $^1$HNMR (400 MHz, DMSO-d6) δ 10.85 (s, 1H), 8.56 (s, 1H), 8.50 (t, J=9.0 Hz, 1H), 7.61-7.50 (m, 3H), 7.47-7.39 (m, 4H), 7.21-7.12 (m, 1H), 4.37-4.29 (m, 4H), 3.79-3.73 (m, 4H), 3.56 (t, J=5.8 Hz, 2H), 3.36 (s, 3H), 3.36 (s, 3H), 3.20 (t, J=6.3 Hz, 2H), 2.03-1.94 (m, 2H), 1.87-1.77 (m, 2H). LRMS (EI) m/z: 662 (M+H)$^+$.

Example 59 N-(3-fluoro-4-((7,8,10,11,13,14-hexahydro-[1,4,7,10]tetraoxacyclododecane [2,3-g]quinazolin-4-yl)oxy)phenyl)-2-oxo-1-phenyl-1,2,4,5,6,7-hexahydropyrazolo[1,5-a]pyridine-3-formamide (DC621061)

4-chloro-6,7-dimethoxyquinoline was replaced with 4-chloro-7,8,10,11,13,14-hexahydro-[1,4,7,10]tetraoxacyclododecane [2,3-g]quinazoline, and other raw materials, reagents and preparation methods were the same as in example 1 to provide the product DC621061, yield 80%. $^1$HNMR (400 MHz, DMSO-d6) δ10.80 (s, 1H), 8.59 (s, 1H), 7.93 (dd, J=12.9, 2.4 Hz, 1H), 7.83 (s, 1H), 7.59 (t, J=7.4 Hz, 2H), 7.54-7.44 (m, 4H), 7.41 (t, J=8.8 Hz, 1H), 7.31 (dd, J=8.9, 1.5 Hz, 1H), 4.40-4.30 (m, 4H), 3.84-3.79 (m, 2H), 3.76-3.72 (m, 2H), 3.64 (s, 4H), 3.58 (t, J=5.9 Hz, 2H), 3.21 (t, J=6.3 Hz, 2H), 2.02-1.94 (m, 2H), 1.86-1.78 (m, 2H). LRMS (EI) m/z: 642 (M+H)$^+$.

Example 60 N-(3-chloro-4-((7,8,10,11,13,14-hexahydro-[1,4,7,10]tetraoxacyclododecane [2,3-g]quinazolin-4-yl)oxy)phenyl)-2-oxo-1-phenyl-1,2,4,5,6,7-hexahydropyrazolo[1,5-a]pyridine-3-formamide (DC621062)

2-fluoro-4-nitrophenol was replaced with 2-chloro-4-nitrophenol, and 4-chloro-6,7-dimethoxyquinoline was replaced with 4-chloro-7,8,10,11,13,14-hexahydro-[1,4,7,10]tetraoxacyclododecane[2,3-g]quinazoline, and other raw materials, reagents and preparation methods were the same as in example 1 to provide the product DC621062, yield 80%. $^1$HNMR (400 MHz, DMSO-d6) δ 10.79 (s, 1H), 8.57 (s, 1H), 8.12 (d, J=2.3 Hz, 1H), 7.83 (s, 1H), 7.62-7.56 (m, 3H), 7.55-7.41 (m, 5H), 4.41-4.29 (m, 4H), 3.85-3.79 (m, 2H), 3.77-3.72 (m, 2H), 3.65 (s, 4H), 3.49 (t, J=5.9 Hz, 2H), 3.21 (t, J=6.3 Hz, 2H), 2.02-1.95 (m, 2H), 1.86-1.78 (m, 2H). LRMS (EI) m/z: 658 (M+H)$^+$.

Example 61 1-(2,5-difluorophenyl)-N-(3-fluoro-4-((7,8,10,11,13,14-hexahydro-[1,4,7,10]tetraoxacyclododecane[2,3-g]quinazolin-4-yl)oxy)phenyl)-2-oxo-1,2,4,5,6,7-hexahydropyrazolo[1,5-a]pyridine-3-formamide (DC621063)

4-chloro-6,7-dimethoxyquinoline was replaced with 4-chloro-7,8,10,11,13,14-hexahydro-[1,4,7,10]tetraoxacyclododecane[2,3-g]quinazoline, phenylhydrazine was replaced with 2-fluorophenylhydrazine, and other raw materials, reagents and preparation methods were the same as in example 1 to provide the product DC621063, yield 80%. $^1$HNMR (400 MHz, DMSO-d6) δ 10.57 (s, 1H), 8.59 (s, 1H), 7.92 (dd, J=12.7, 1.9 Hz, 1H), 7.83 (s, 1H), 7.69-7.50 (m, 4H), 7.42 (t, J=8.7 Hz, 1H), 7.32 (dd, J=8.7, 1.3 Hz, 1H), 4.42-4.26 (m, 4H), 3.84-3.78 (m, 2H), 3.77-3.70 (m, 2H), 3.64 (s, 4H), 3.47 (t, J=5.9 Hz, 2H), 3.21 (t, J=5.9 Hz, 2H), 2.04-1.94 (m, 2H), 1.87-1.77 (m, 2H). LRMS (EI) m/z: 678 (M+H)$^+$.

Example 62 1-(2,5-difluorophenyl)-N-(3-chloro-4-((7,8,10,11,13,14-hexahydro-[1,4,7,10]tetraoxacyclododecane [2,3-g]quinazolin-4-yl)oxy)phenyl)-2-oxo-1,2,4,5,6,7-hexahydropyrazolo[1,5-a]pyridine-3-formamide (DC621064)

2-fluoro-4-nitrophenol was replaced with 2-chloro-4-nitrophenol, and 4-chloro-6,7-dimethoxyquinoline was replaced with 4-chloro-7,8,10,11,13,14-hexahydro-[1,4,7,10]tetraoxacyclododecane[2,3-g]quinazoline, phenylhydrazine was replaced with 2,5-difluorophenylhydrazine, and other raw materials, reagents and preparation methods were the same as in example 1 to provide the product DC621064, yield 80%. $^1$HNMR (400 MHz, DMSO-d6) δ 10.56 (s, 1H), 8.57 (s, 1H), 8.12 (d, J=2.3 Hz, 1H), 7.83 (s, 1H), 7.69-7.52 (m, 4H), 7.50-7.41 (m, 2H), 4.39-4.30 (m, 4H), 3.84-3.79 (m, 2H), 3.77-3.72 (m, 2H), 3.65 (s, 4H), 3.49 (t, J=5.9 Hz, 2H), 3.21 (t, J=6.3 Hz, 2H), 2.03-1.95 (m, 2H), 1.86-1.77 (m, 2H). LRMS (EI) m/z: 694 (M+H)$^+$.

Example 63 N-(3-fluoro-4-((7,8,10,11,13,14-hexahydro-[1,4,7,10]tetraoxacyclododecane [2,3-g]quinazolin-4-yl)oxy)phenyl)-1-(2-fluorophenyl)-2-oxo-1,2,4,5,6,7-hexahydropyrazolo[1,5-a]pyridine-3-formamide (DC621065)

4-chloro-6,7-dimethoxyquinoline was replaced with 4-chloro-7,8,10,11,13,14-hexahydro-[1,4,7,10]tetraoxacyclododecane [2,3-g]quinazoline, phenylhydrazine was replaced with 2-fluorophenylhydrazine, and other raw materials, reagents and preparation methods were the same as in example 1 to provide the product DC621065, yield 80%. $^1$HNMR (400 MHz, DMSO-d6) δ 10.66 (s, 1H), 8.59 (s, 1H), 7.92 (dd, J=12.9, 2.1 Hz, 1H), 7.83 (s, 1H), 7.73-7.61 (m, 2H), 7.57-7.51 (m, 2H), 7.43 (dd, J=18.6, 8.4 Hz, 2H), 7.31 (d, J=8.6 Hz, 1H), 4.41-4.29 (m, 4H), 3.85-3.79 (m, 2H), 3.77-3.72 (m, 2H), 3.65 (s, 4H), 3.47 (t, J=5.8 Hz, 2H), 3.21 (t, J=6.1 Hz, 2H), 2.04-1.92 (m, 2H), 1.86-1.77 (m, 2H). LRMS (EI) m/z:660 (M+H)$^+$.

Example 64 N-(3-chloro-4-((7,8,10,11,13,14-hexahydro-[1,4,7,10]tetraoxacyclododecane[2,3-g]quinazolin-4-yl)oxy)phenyl)-1-(2-fluorophenyl)-2-oxo-1,2,4,5,6,7-hexahydropyrazolo[1,5-a]pyridine-3-formamide (DC621066)

2-fluoro-4-nitrophenol was replaced with 2-chloro-4-nitrophenol, and 4-chloro-6,7-dimethoxyquinoline was replaced with 4-chloro-7,8,10,11,13,14-hexahydro-[1,4,7,10]tetraoxacyclododecane [2,3-g]quinazoline, phenylhydrazine was replaced with 2-fluorophenylhydrazine, and other raw materials, reagents and preparation methods were the same as in example 1 to provide the product DC621066, yield 80%. $^1$HNMR (400 MHz, DMSO-d6) δ 10.64 (s, 1H), 8.57 (s, 1H), 8.12 (d, J=2.3 Hz, 1H), 7.83 (s, 1H), 7.70-7.59 (m, 2H), 7.57-7.50 (m, 2H), 7.49-7.41 (m, 3H), 4.40-4.29 (m, 4H), 3.86-3.79 (m, 2H), 3.78-3.71 (m, 2H), 3.65 (s, 4H), 3.48 (t, J=5.8 Hz, 2H), 3.20 (t, J=6.1 Hz, 2H), 2.03-1.94 (m, 2H), 1.87-1.76 (m, 2H). LRMS (EI) m/z: 676 (M+H)$^+$.

Example 65 N-(3-fluoro-4-((7,8,10,11,13,14-hexahydro-[1,4,7,10]tetraoxacyclododecane [2,3-g]quinazolin-4-yl)oxy)phenyl)-1-(4-fluorophenyl)-2-oxo-1,2,4,5,6,7-hexahydropyrazolo[1,5-a]pyridine-3-formamide (DC621067)

4-chloro-6,7-dimethoxyquinoline was replaced with 4-chloro-7,8,10,11,13,14-hexahydro-[1,4,7,10]tetraoxacyclododecane [2,3-g]quinazoline, phenylhydrazine was replaced with 4-fluorophenylhydrazine, and other raw materials, reagents and preparation methods were the same as in example 1 to provide the product DC621067, yield 80%. $^1$HNMR (400 MHz, DMSO-d6) δ 10.77 (s, 1H), 8.58 (s, 1H), 7.92 (dd, J=12.9, 2.4 Hz, 1H), 7.83 (s, 1H), 7.58-7.52 (m, 3H), 7.48-7.37 (m, 3H), 7.33-7.28 (m, 1H), 4.39-4.31 (m, 4H), 3.84-3.79 (m, 2H), 3.77-3.72 (m, 2H), 3.64 (s, 4H), 3.56 (t, J=5.8 Hz, 2H), 3.20 (t, J=6.2 Hz, 2H), 2.01-1.94 (m, 2H), 1.87-1.78 (m, 2H). LRMS (EI) m/z: 660 (M+H)$^+$.

Example 66 N-(3-chloro-4-((7,8,10,11,13,14-hexahydro-[1,4,7,10]tetraoxacyclododecane[2,3-g]quinazolin-4-yl)oxy)phenyl)-1-(4-fluorophenyl)-2-oxo-1,2,4,5,6,7-hexahydropyrazolo[1,5-a]pyridine-3-formamide (DC621068)

2-fluoro-4-nitrophenol was replaced with 2-chloro-4-nitrophenol, and 4-chloro-6,7-dimethoxyquinoline was replaced with 4-chloro-7,8,10,11,13,14-hexahydro-[1,4,7,10]tetraoxacyclododecane[2,3-g]quinazoline, phenylhydrazine was replaced with 4-fluorophenylhydrazine, and other raw materials, reagents and preparation methods were the same as in example 1 to provide the product DC621068, yield 80%. $^1$HNMR (400 MHz, DMSO-d6) δ 10.76 (s, 1H), 8.57 (s, 1H), 8.12 (d, J=2.2 Hz, 1H), 7.83 (s, 1H), 7.58-7.51 (m, 3H), 7.49-7.41 (m, 4H), 4.38-4.30 (m, 4H), 3.85-3.78 (m, 2H), 3.77-3.71 (m, 2H), 3.65 (s, 4H), 3.56 (t, J=5.8 Hz, 2H), 3.20 (t, J=6.3 Hz, 2H), 2.01-1.94 (m, 2H), 1.86-1.78 (m, 2H). LRMS (EI) m/z: 676 (M+H)$^+$.

Example 67 N-(4-((6,7-dimethoxyquinazoline-4-yl)oxy)-3-chlorophenyl)-2-oxo-1-phenyl-1,2,4,5,6,7-hexahydropyrazolo[1,5-a]pyridine-3-formamide (DC621069)

2-fluoro-4-nitrophenol was replaced with 2-chloro-4-nitrophenol, 4-chloro-6,7-dimethoxyquinoline was replaced with 4-chloro-6,7-dimethoxyquinazoline, and other raw materials, reagents and preparation methods were the same as in example 1 to provide the product DC621069, yield 80%. $^1$HNMR (400 MHz, DMSO-d6) δ 10.79 (s, 1H), 8.55 (s, 1H), 8.12 (d, J=2.4 Hz, 1H), 7.62-7.56 (m, 3H), 7.54-7.50 (m, 1H), 7.49-7.41 (m, 5H), 4.00 (s, 3H), 3.98 (s, 3H), 3.58 (t, J=5.8 Hz, 2H), 3.21 (t, J=6.3 Hz, 2H), 2.02-1.96 (m, 2H), 1.87-1.79 (m, 2H). LRMS (EI) m/z: 572 (M+H)$^+$.

Example 68 N-(4-((6,7-bis(2-methoxyethoxy)quinazolin-4-yl)oxy)-3-chlorophenyl)-2-oxo-1-phenyl-1,2,4,5,6,7-hexahydropyrazolo[1,5-a]pyridine-3-formamide (DC621070)

2-fluoro-4-nitrophenol was replaced with 2-chloro-4-nitrophenol, and 4-chloro-6,7-dimethoxyquinoline was replaced with 4-chloro-6,7-bis(2-methoxyethoxy)quinazoline, and other raw materials, reagents and preparation methods were the same as in example 1 to provide the product DC621070, yield 80%. $^1$HNMR (400 MHz, DMSO-d6) δ 10.81 (s, 1H), 8.46 (s, 1H), 8.05 (s, 1H), 7.72 (d, J=2.9 Hz, 1H), 7.60-7.46 (m, 3H), 7.41-7.31 (m, 3H), 7.29-7.23 (m, 1H), 7.03 (d, J=15.0 Hz, 1H), 4.43-4.29 (m, 4H), 3.84-3.67 (m, 4H), 3.58 (t, J=5.8 Hz, 2H), 3.36 (s, 3H), 3.36 (s, 3H), 3.21 (t, J=6.1 Hz, 2H), 2.06-1.96 (m, 2H), 1.88-1.76 (m, 2H). LRMS (EI) m/z: 660 (M+H)$^+$.

Example 69 N-(4-((6,7-dimethoxyquinazoline-4-yl)oxy)-3-trifluoromethylphenyl)-2-oxo-1-phenyl-1,2,4,5,6,7-hexahydropyrazolo[1,5-a]pyridine-3-formamide (DC621071)

2-fluoro-4-nitrophenol was replaced with 2-trifluoromethyl-4-nitrophenol, 4-chloro-6,7-dimethoxyquinoline was replaced with 4-chloro-6,7-dimethoxyquinazoline, and other raw materials, reagents and preparation methods were the same as in example 1 to provide the product DC621071, yield 80%. $^1$HNMR (400 MHz, DMSO-d6) δ 10.81 (s, 1H), 8.45 (s, 1H), 7.87 (s, 1H), 7.85 (d, J=3.1 Hz, 1H), 7.56-7.46 (m, 3H), 7.41-7.28 (m, 4H), 6.80 (d, J=15.0 Hz, 1H), 3.99 (s, 3H), 3.98 (s, 3H), 3.58 (t, J=5.8 Hz, 2H), 3.22 (t, J=6.2 Hz, 2H), 2.06-1.95 (m, 2H), 1.88-1.77 (m, 2H). LRMS (EI) m/z: 606 (M+H)$^+$.

Example 70 N-(4-((6,7-bis(2-methoxyethoxy)quinazolin-4-yl)oxy)-3-trifluoromethylphenyl)-2-oxo-1-phenyl-1,2,4,5,6,7-hexahydropyrazolo[1,5-a]pyridine-3-formamide (DC621072)

2-fluoro-4-nitrophenol was replaced with 2-trifluoromethyl-4-nitrophenol, and 4-chloro-6,7-dimethoxyquinoline was replaced with 4-chloro-6,7-bis(2-methoxyethoxy)quinazoline, and other raw materials, reagents and preparation methods were the same as in example 1 to provide the product DC621072, yield 80%. $^1$HNMR (400 MHz, DMSO-d6) δ 10.64 (s, 1H), 8.46 (s, 1H), 7.86 (d, J=3.1 Hz, 1H), 7.77 (s, 1H), 7.64-7.46 (m, 2H), 7.44-7.27 (m, 5H), 6.81 (d, J=15.0 Hz, 1H), 4.37-4.26 (m, 4H), 3.80-3.75 (m, 4H), 3.59 (t, J=5.8 Hz, 2H), 3.36 (s, 3H), 3.36 (s, 3H), 3.22 (t, J=6.3 Hz, 2H), 2.07-1.93 (m, 2H), 1.88-1.77 (m, 2H). LRMS (EI) m/z: 694 (M+H)$^+$.

Example 71 N-(4-((6,7-dimethoxyquinazoline-4-yl)oxy)naphthalene-1-yl)-2-oxo-1-phenyl-1,2,4,5,6,7-hexahydropyrazolo[1,5-a]pyridine-3-formamide (DC621073)

2-fluoro-4-nitrophenol was replaced with 4-nitro-1-naphthol, 4-chloro-6,7-dimethoxyquinoline was replaced with 4-chloro-6,7-dimethoxyquinazoline, and other raw materials, reagents and preparation methods were the same as in example 21 to provide the product DC621073, yield 80%. $^1$HNMR (400 MHz, DMSO-d6) δ 10.64 (s, 1H), 8.45 (s, 1H), 8.24 (dd, J=14.9, 3.0 Hz, 1H), 7.97 (dd, J=14.8, 3.1 Hz, 1H), 7.80 (s, 1H), 7.69-7.46 (m, 3H), 7.44-7.28 (m, 5H), 6.81 (d, J=15.0 Hz, 1H), 6.05 (d, J=14.8 Hz, 1H), 3.99 (s, 3H), 3.97 (s, 3H), 3.58 (t, J=5.8 Hz, 2H), 3.23 (t, J=6.3 Hz, 2H), 2.03-1.95 (m, 2H), 1.87-1.78 (m, 2H). LRMS (EI) m/z: 588 (M+H)$^+$.

Example 72 N-(4-((6,7-bis(2-methoxyethoxy)quinazolin-4-yl)oxy)-3-trifluoromethylphenyl)-2-oxo-1-phenyl-1,2,4,5,6,7-hexahydropyrazolo[1,5-a]pyridine-3-formamide (DC621074)

2-fluoro-4-nitrophenol was replaced with 4-nitro-1-naphthol, and 4-chloro-6,7-dimethoxyquinoline was replaced with 4-chloro-6,7-bis(2-methoxyethoxy)quinazoline, and other raw materials, reagents and preparation methods were the same as in example 21 to provide the product DC621074, yield 80%. $^1$HNMR (400 MHz, DMSO-d6) δ 10.64 (s, 1H), 8.46 (s, 1H), 8.25 (dd, J=14.9, 3.0 Hz, 1H), 8.10 (s, 1H), 7.98 (dd, J=14.9, 3.0 Hz, 1H), 7.68-7.47 (m, 3H), 7.44-7.30 (m, 5H), 6.82 (d, J=15.0 Hz, 1H), 6.06 (d, J=15.0 Hz, 1H), 4.38-4.27 (m, 4H), 3.78-3.71 (m, 4H), 3.56 (t, J=5.8 Hz, 2H), 3.36 (s, 3H), 3.36 (s, 3H), 3.21 (t, J=6.3 Hz, 2H), 2.04-1.95 (m, 2H), 1.86-1.77 (m, 2H). LRMS (EI) m/z: 676 (M+H)$^+$.

Example 73 N-(5-(6,7-dimethoxyquinazoline-4-yl)oxy)pyridine-2-yl)-2-oxo-1-phenyl-1,2,4,5,6,7-hexahydropyrazolo[1,5-a]pyridine-3-formamide (DC621075)

2-fluoro-4-nitrophenol was replaced with 5-hydroxy-2-nitropyridine, 4-chloro-6,7-dimethoxyquinoline was replaced with 4-chloro-6,7-dimethoxyquinazoline, and other raw materials, reagents and preparation methods were the same as in example 1 to provide the product DC621075, yield 80%. $^1$HNMR (400 MHz, DMSO-d6) δ 10.89 (s, 1H), 8.82 (d, J=15.0 Hz, 1H), 8.42 (s, 1H), 8.12 (d, J=2.9 Hz, 1H), 7.66 (s, 1H), 7.58-7.41 (m, 2H), 7.35-7.29 (m, 4H), 7.28-7.23 (m, 1H), 3.99 (s, 3H), 3.98 (s, 3H), 3.59 (t, J=5.8 Hz, 2H), 3.21 (t, J=6.2 Hz, 2H), 2.04-1.94 (m, 2H), 1.88-1.78 (m, 2H). LRMS (EI) m/z: 539 (M+H)$^+$.

Example 74 N-(5-(6,7-bis(2-methoxyethoxy)quinazolin-4-yl)pyridine-2-yl)-2-oxo-1-phenyl-1,2,4,5,6,7-hexahydropyrazolo[1,5-a]pyridine-3-formamide (DC621076)

2-fluoro-4-nitrophenol was replaced with 5-hydroxy-2-nitrophenol, and 4-chloro-6,7-dimethoxyquinoline was replaced with 4-chloro-6,7-bis(2-methoxyethoxy)quinazoline, and other raw materials, reagents and preparation methods were the same as in example 1 to provide the product DC621076, yield 80%. $^1$HNMR (400 MHz, DMSO-d6) δ 10.89 (s, 1H), 8.84 (d, J=14.8 Hz, 1H), 8.44 (s, 1H), 8.14 (d, J=3.1 Hz, 1H), 8.02 (s, 1H), 7.69 (s, 1H), 7.55-7.46 (m, 2H), 7.40-7.24 (m, 4H), 4.39-4.25 (m, 4H), 3.78-3.71 (m, 4H), 3.59 (t, J=5.8 Hz, 2H), 3.36 (s, 3H), 3.36 (s, 3H), 3.21 (t, J=6.2 Hz, 2H), 2.02-1.95 (m, 2H), 1.88-1.76 (m, 2H). LRMS (EI) m/z: 627 (M+H)$^+$.

Example 75 (R)—N-(3-fluoro-4-((6-methoxy-7-((tetrahydrofuran-3-yl)oxy)quinazolin-4-yl)oxy)phenyl)-2-oxo-1-phenyl-1,2,4,5,6,7-hexahydropyrazolo[1,5-a]pyridine-3-formamide (DC621077)

4-chloro-6,7-dimethoxyquinoline was replaced with (R)-4-chloro-6-methoxy-7-((tetrahydrofuran-3-yl)oxy)quinazoline, and other raw materials, reagents and preparation methods were the same as in example 1 to provide the product DC621077, yield 80%. ¹HNMR (400 MHz, DMSO-d6) δ 10.89 (s, 1H), 8.44 (s, 1H), 7.81 (s, 1H), 7.65-7.42 (m, 3H), 7.39-7.28 (m, 4H), 7.13 (dd, J=15.0, 3.0 Hz, 1H), 6.84 (dd, J=14.9, 10.0 Hz, 1H), 5.03-4.95 (m, 1H), 4.23-4.13 (m, 1H), 4.07-4.01 (m, 1H), 3.91 (s, 3H) 3.87-3.80 (m, 1H), 3.78-3.73 (m, 1H), 3.58 (t, J=5.8 Hz, 2H), 3.22 (t, J=6.2 Hz, 2H), 2.44-2.31 (m, 1H), 2.19-2.10 (m, 1H), 2.02-1.95 (m, 2H), 1.88-1.76 (m, 2H). LRMS (EI) m/z: 612 (M+H)⁺.

Example 76 (S)—N-(3-fluoro-4-((6-methoxy-7-((tetrahydrofuran-3-yl)oxy)quinazolin-4-yl)oxy)phenyl)-2-oxo-1-phenyl-1,2,4,5,6,7-hexahydropyrazolo[1,5-a]pyridine-3-formamide (DC621078)

4-chloro-6,7-dimethoxyquinoline was replaced with (S)-4-chloro-6-methoxy-7-((tetrahydrofuran-3-yl)oxy)quinazoline, and other raw materials, reagents and preparation methods were the same as in example 1 to provide the product DC621078, yield 80%. ¹HNMR (400 MHz, DMSO-d6) δ 10.89 (s, 1H), 8.42 (s, 1H), 7.82 (s, 1H), 7.66-7.41 (m, 3H), 7.37-7.27 (m, 4H), 7.15 (dd, J=15.0, 3.0 Hz, 1H), 6.86 (dd, J=14.9, 10.0 Hz, 1H), 5.05-4.97 (m, 1H), 4.21-4.12 (m, 1H), 4.06-4.02 (m, 1H), 3.93 (s, 3H) 3.86-3.80 (m, 1H), 3.77-3.72 (m, 1H), 3.59 (t, J=5.8 Hz, 2H), 3.23 (t, J=6.2 Hz, 2H), 2.45-2.30 (m, 1H), 2.18-2.11 (m, 1H), 2.04-1.93 (m, 2H), 1.85-1.75 (m, 2H). LRMS (EI) m/z: 612 (M+H)⁺.

Example 77 1-(2,5-difluorophenyl)-N-(4-((6,7-dimethoxyquinazoline-4-yl)oxy)-3-chlorophenyl)-2-oxo-1,2,4,5,6,7-hexahydropyrazolo[1,5-a]pyridine-3-formamide (DC621079)

2-fluoro-4-nitrophenol was replaced with 2-chloro-4-nitrophenol, 4-chloro-6,7-dimethoxyquinoline was replaced with 4-chloro-6,7-dimethoxyquinazoline, and phenylhydrazine was replaced with 2,5-difluorophenylhydrazine, while the remaining raw materials, reagents and preparation methods were the same as those in example 1 to obtain the product DC621079, yield 80%. ¹HNMR (400 MHz, DMSO-d6) δ 10.56 (s, 1H), 8.56 (s, 1H), 8.12 (d, J=2.4 Hz, 1H), 7.68-7.53 (m, 4H), 7.50-7.45 (m, 1H), 7.44-7.39 (m, 2H), 4.00 (s, 3H), 3.98 (s, 3H), 3.55 (t, J=5.8 Hz, 2H), 3.21 (t, J=6.3 Hz, 2H), 2.04-1.94 (m, 2H), 1.89-1.76 (m, 2H). LRMS (EI) m/z: 608 (M+H)⁺.

Example 78 1-(2,5-difluorophenyl)-N-(4-((6,7-bis(2-methoxyethoxy)quinazolin-4-yl)oxy)-3-chlorophenyl)-2-oxo-1,2,4,5,6,7-hexahydropyrazolo[1,5-a]pyridine-3-formamide (DC621080)

2-fluoro-4-nitrophenol was replaced with 2-chloro-4-nitrophenol, and 4-chloro-6,7-dimethoxyquinoline was replaced with 4-chloro-6,7-bis(2-methoxyethoxy)quinazoline, phenylhydrazine was replaced with 2,5-difluorophenylhydrazine, and other raw materials, reagents and preparation methods were the same as in example 1 to provide the product DC621080, yield 80%. ¹HNMR (400 MHz, DMSO-d6) δ 10.57 (s, 1H), 8.46 (s, 1H), 8.05 (s, 1H), 7.72 (d, J=3.1 Hz, 1H), 7.51 (s, 1H), 7.26 (dd, J=15.0, 2.9 Hz, 1H), 7.18-7.07 (m, 1H), 7.05-6.92 (m, 2H), 6.64-6.54 (m, 1H), 4.39-4.32 (m, 4H), 3.82-3.74 (m, 4H), 3.55 (t, J=5.8 Hz, 2H), 3.36 (s, 3H), 3.36 (s, 3H), 3.24 (t, J=6.2 Hz, 2H), 2.06-1.97 (m, 2H), 1.85-1.76 (m, 2H). LRMS (EI) m/z: 696 (M+H)⁺.

Example 79 1-(2,5-difluorophenyl)-N-(4-((6,7-dimethoxyquinazoline-4-yl)oxy)-3-trifluoromethylphenyl)-2-oxo-1,2,4,5,6,7-hexahydropyrazolo[1,5-a]pyridine-3-formamide (DC621081)

2-fluoro-4-nitrophenol was replaced with 2-trifluoromethyl-4-nitrophenol, 4-chloro-6,7-dimethoxyquinoline was replaced with 4-chloro-6,7-dimethoxyquinazoline, and phenylhydrazine was replaced with 2,5-difluorophenylhydrazine, while the remaining raw materials, reagents and preparation methods were the same as those in example 1 to obtain the product DC621081, yield 80%. ¹HNMR (400 MHz, DMSO-d6) δ 10.57 (s, 1H), 8.46 (s, 1H), 7.86 (d, J=3.1 Hz, 1H), 7.76 (s, 1H), 7.38 (dd, J=14.9, 3.0 Hz, 1H), 7.35 (s, 1H), 7.16-7.07 (m, 1H), 7.03-6.95 (m, 1H), 6.81 (d, J=15.0 Hz, 1H), 6.67-6.52 (m, 1H), 3.99 (s, 3H), 3.98 (s, 3H), 3.58 (t, J=5.8 Hz, 2H), 3.23 (t, J=6.2 Hz, 2H), 2.06-1.95 (m, 2H), 1.88-1.73 (m, 2H). LRMS (EI) m/z: 642 (M+H)⁺.

Example 80 1-(2,5-difluorophenyl)-N-(4-((6,7-bis(2-methoxyethoxy)quinazolin-4-yl)oxy)-3-trifluoromethylphenyl)-2-oxo-1,2,4,5,6,7-hexahydropyrazolo[1,5-a]pyridine-3-formamide (DC621082)

2-fluoro-4-nitrophenol was replaced with 2-trifluoromethyl-4-nitrophenol, and 4-chloro-6,7-dimethoxyquinoline was replaced with 4-chloro-6,7-bis(2-methoxyethoxy)quinazoline, phenylhydrazine was replaced with 2,5-difluorophenylhydrazine, and other raw materials, reagents and preparation methods were the same as in example 1 to provide the product DC621082, yield 80%. ¹HNMR (400 MHz, DMSO-d6) δ 10.68 (s, 1H), 8.45 (s, 1H), 7.85 (d, J=3.1 Hz, 1H), 7.79 (s, 1H), 7.43 (s, 1H), 7.37 (dd, J=15.0, 2.9 Hz, 1H), 7.17-7.07 (m, 1H), 7.02-6.93 (m, 1H), 6.80 (d, J=15.0 Hz, 1H), 6.63-6.54 (m, 1H), 4.38-4.30 (m, 4H), 3.83-3.74 (m, 4H), 3.58 (t, J=5.7 Hz, 2H), 3.36 (s, 3H), 3.36 (s, 3H), 3.24 (t, J=6.2 Hz, 2H), 2.05-1.93 (m, 2H), 1.88-1.76 (m, 2H). LRMS (EI) m/z: 730 (M+H)⁺.

Example 81 1-(2,5-difluorophenyl)-N-(4-((6,7-dimethoxyquinazoline-4-yl)oxy)naphthalene-1-yl)-2-oxo-1,2,4,5,6,7-hexahydropyrazolo[1,5-a]pyridine-3-formamide (DC621083)

2-fluoro-4-nitrophenol was replaced with 4-nitro-1-naphthol, 4-chloro-6,7-dimethoxyquinoline was replaced with 4-chloro-6,7-dimethoxyquinazoline, and phenylhydrazine was replaced with 2,5-difluorophenylhydrazine, while the remaining raw materials, reagents and preparation methods were the same as those in example 21 to obtain the product DC621083, yield 80%. ¹HNMR (400 MHz, DMSO-d6) δ 10.42 (s, 1H), 8.44 (s, 1H), 8.24 (dd, J=14.9, 3.0 Hz, 1H), 7.97 (dd, J=14.9, 3.0 Hz, 1H), 7.82 (s, 1H), 7.67-7.55 (m, 2H), 7.43-7.32 (m, 1H), 7.17-7.08 (m, 1H), 7.02-6.93 (m, 1H), 6.81 (d, J=15.0 Hz, 1H), 6.63-6.52 (m, 1H), 6.05 (d, J=15.0 Hz, 1H), 4.00 (s, 3H), 3.98 (s, 3H), 3.56 (t, J=5.8 Hz, 2H), 3.22 (t, J=6.2 Hz, 2H), 2.03-1.94 (m, 2H), 1.89-1.78 (m, 2H). LRMS (EI) m/z: 624 (M+H)⁺.

Example 82 1-(2,5-difluorophenyl)-N-(4-((6,7-bis(2-methoxyethoxy)quinazolin-4-yl)oxy)naphthalene-1-yl)-2-oxo-1,2,4,5,6,7-hexahydropyrazolo[1,5-a]pyridine-3-formamide (DC621084)

2-fluoro-4-nitrophenol was replaced with 4-nitro-1-naphthol, and 4-chloro-6,7-dimethoxyquinoline was replaced with 4-chloro-6,7-bis(2-methoxyethoxy)quinazoline, phenylhydrazine was replaced with 2,5-difluorophenylhydrazine, and other raw materials, reagents and preparation methods were the same as in example 21 to provide the product DC621084, yield 80%. ¹HNMR (400 MHz, DMSO-d6) δ 10.42 (s, 1H), 8.46 (s, 1H), 8.25 (dd, J=14.9, 3.0 Hz, 1H), 8.10 (s, 1H), 7.98 (dd, J=14.9, 3.1 Hz, 1H), 7.67-7.58 (m, 1H), 7.48-7.31 (m, 2H), 7.18-7.08 (m, 1H), 7.03-6.94

(m, 1H), 6.82 (d, J=15.0 Hz, 1H), 6.64-6.53 (m, 1H), 6.06 (d, J=15.0 Hz, 1H), 4.38-4.30 (m, 4H), 3.80-3.72 (m, 4H), 3.58 (t, J=5.8 Hz, 2H), 3.36 (s, 3H), 3.36 (s, 3H), 3.23 (t, J=6.2 Hz, 2H), 2.03-1.95 (m, 2H), 1.85-1.71 (m, 2H). LRMS (EI) m/z: 712 (M+H)$^+$.

Example 83 1-(2,5-difluorophenyl)-N-(5-(6,7-dimethoxyquinazoline-4-yl)oxy)pyridine-2-yl)-2-oxo-1,2,4,5,6,7-hexahydropyrazolo[1,5-a]pyridine-3-formamide (DC621085)

2-fluoro-4-nitrophenol was replaced with 5-hydroxy-2-nitropyridine, 4-chloro-6,7-dimethoxyquinoline was replaced with 4-chloro-6,7-dimethoxyquinazoline, and phenylhydrazine was replaced with 2,5-difluorophenylhydrazine, while the remaining raw materials, reagents and preparation methods were the same as those in example 1 to obtain the product DC621085, yield 80%. $^1$HNMR (400 MHz, DMSO-d6) δ 10.45 (s, 1H), 8.85 (d, J=15.0 Hz, 1H), 8.45 (s, 1H), 8.15 (d, J=2.9 Hz, 1H), 7.68 (s, 1H), 7.35 (s, 1H), 7.28 (dd, J=15.0, 3.1 Hz, 1H), 7.16-7.07 (m, 1H), 7.02-6.93 (m, 1H), 6.63-6.52 (m, 1H), 4.00 (s, 3H), 3.98 (s, 3H), 3.57 (t, J=5.8 Hz, 2H), 3.22 (t, J=6.2 Hz, 2H), 2.02-1.94 (m, 2H), 1.87-1.75 (m, 2H). LRMS (EI) m/z: 575 (M+H)$^+$.

Example 84 1-(2,5-difluorophenyl)-N-(5-(6,7-bis(2-methoxyethoxy)quinazolin-4-yl)pyridine-2-yl)-2-oxo-1,2,4,5,6,7-hexahydropyrazolo[1,5-a]pyridine-3-formamide (DC621086)

2-fluoro-4-nitrophenol was replaced with 5-hydroxy-2-nitropyridine, and 4-chloro-6,7-dimethoxyquinoline was replaced with 4-chloro-6,7-bis(2-methoxyethoxy)quinazoline, phenylhydrazine was replaced with 2,5-difluorophenylhydrazine, and other raw materials, reagents and preparation methods were the same as in example 1 to provide the product DC621086, yield 80%. $^1$HNMR (400 MHz, DMSO-d6) δ 10.67 (s, 1H), 8.86 (d, J=15.0 Hz, 1H), 8.46 (s, 1H), 8.16 (d, J=3.1 Hz, 1H), 8.02 (s, 1H), 7.53 (s, 1H), 7.29 (dd, J=15.0, 3.1 Hz, 1H), 7.18-7.08 (m, 1H), 7.03-6.92 (m, 1H), 6.64-6.54 (m, 1H), 4.37-4.29 (m, 4H), 3.78-3.72 (m, 4H), 3.55 (t, J=5.8 Hz, 2H), 3.36 (s, 3H), 3.36 (s, 3H), 3.23 (t, J=6.3 Hz, 2H), 2.02-1.93 (m, 2H), 1.86-1.75 (m, 2H). LRMS (EI) m/z: 663 (M+H)$^+$.

Example 85 (R)-1-(2,5-difluorophenyl)-N-(3-fluoro-4-((6-methoxy-7-((tetrahydrofuran-3-yl)oxy)quinazolin-4-yl)oxy)phenyl)-2-oxo-1,2,4,5,6,7-hexahydropyrazolo[1,5-a]pyridine-3-formamide (DC621087)

4-chloro-6,7-dimethoxyquinoline was replaced with (R)-4-chloro-6-methoxy-7-((tetrahydrofuran-3-yl)oxy)quinazoline, phenylhydrazine was replaced with 2,5-difluorophenylhydrazine, and other raw materials, reagents and preparation methods were the same as in example 1 to provide the product DC621087, yield 80%. $^1$HNMR (400 MHz, DMSO-d6) δ 10.89 (s, 1H), 8.45 (s, 1H), 7.77 (s, 1H), 7.61 (s, 1H), 7.57 (dd, J=15.9, 2.9 Hz, 1H), 7.18-7.06 (m, 2H), 7.02-6.93 (m, 1H), 6.85 (dd, J=15.0, 10.1 Hz, 1H), 6.64-6.53 (m, 1H), 5.04-4.96 (m, 1H), 4.22-4.13 (m, 1H), 4.07-4.02 (m, 1H), 3.93 (s, 3H) 3.86-3.80 (m, 1H), 3.79-3.73 (m, 1H), 3.56 (t, J=5.8 Hz, 2H), 3.21 (t, J=6.2 Hz, 2H), 2.42-2.31 (m, 1H), 2.18-2.10 (m, 1H), 2.02-1.94 (m, 2H), 1.88-1.79 (m, 2H). LRMS (EI) m/z: 648 (M+H)$^+$.

Example 86 (S)-1-(2,5-difluorophenyl)-N-(3-fluoro-4-((6-methoxy-7-((tetrahydrofuran-3-yl)oxy)quinazolin-4-yl)oxy)phenyl)-2-oxo-1,2,4,5,6,7-hexahydropyrazolo[1,5-a]pyridine-3-formamide (DC621088)

4-chloro-6,7-dimethoxyquinoline was replaced with (S)-4-chloro-6-methoxy-7-((tetrahydrofuran-3-yl)oxy)quinazoline, phenylhydrazine was replaced with 2,5-difluorophenylhydrazine, and other raw materials, reagents and preparation methods were the same as in example 1 to provide the product DC621088, yield 80%. $^1$HNMR (400 MHz, DMSO-d6) δ 10.88 (s, 1H), 8.43 (s, 1H), 7.75 (s, 1H), 7.63 (s, 1H), 7.59 (dd, J=15.9, 2.9 Hz, 1H), 7.17-7.07 (m, 2H), 7.01-6.93 (m, 1H), 6.86 (dd, J=15.0, 10.1 Hz, 1H), 6.62-6.53 (m, 1H), 5.03-4.96 (m, 1H), 4.21-4.13 (m, 1H), 4.08-4.02 (m, 1H), 3.95 (s, 3H) 3.87-3.80 (m, 1H), 3.79-3.71 (m, 1H), 3.54 (t, J=5.8 Hz, 2H), 3.23 (t, J=6.2 Hz, 2H), 2.42-2.33 (m, 1H), 2.18-2.11 (m, 1H), 2.02-1.95 (m, 2H), 1.89-1.79 (m, 2H). LRMS (EI) m/z: 648 (M+H)$^+$.

Example 87 N-(4-((6,7-dimethoxyquinazoline-4-yl)oxy)-3-chlorophenyl)-1-(2-fluorophenyl)-2-oxo-1,2,4,5,6,7-hexahydropyrazolo[1,5-a]pyridine-3-formamide (DC621089)

2-fluoro-4-nitrophenol was replaced with 2-chloro-4-nitrophenol, 4-chloro-6,7-dimethoxyquinoline was replaced with 4-chloro-6,7-dimethoxyquinazoline, and phenylhydrazine was replaced with 2-fluorophenylhydrazine, while the remaining raw materials, reagents and preparation methods were the same as those in example 1 to obtain the product DC621089, yield 80%. $^1$HNMR (400 MHz, DMSO-d6) δ 10.64 (s, 1H), 8.56 (s, 1H), 8.12 (d, J=2.3 Hz, 1H), 7.70-7.60 (m, 2H), 7.58-7.50 (m, 2H), 7.49-7.40 (m, 4H), 4.00 (s, 3H), 3.98 (s, 3H), 3.56 (t, J=5.8 Hz, 2H), 3.21 (t, J=6.2 Hz, 2H), 2.03-1.93 (m, 2H), 1.86-1.77 (m, 2H). LRMS (EI) m/z: 590 (M+H)$^+$.

Example 88 N-(4-((6,7-bis(2-methoxyethoxy)quinazolin-4-yl)oxy)-3-chlorophenyl)-1-(2-fluorophenyl)-2-oxo-1,2,4,5,6,7-hexahydropyrazolo[1,5-a]pyridine-3-formamide (DC621090)

2-fluoro-4-nitrophenol was replaced with 2-chloro-4-nitrophenol, and 4-chloro-6,7-dimethoxyquinoline was replaced with 4-chloro-6,7-bis(2-methoxyethoxy)quinazoline, phenylhydrazine was replaced with 2-fluorophenylhydrazine, and other raw materials, reagents and preparation methods were the same as in example 1 to provide the product DC621090, yield 80%. $^1$HNMR (400 MHz, DMSO-d6) δ 10.66 (s, 1H), 8.44 (s, 1H), 8.01 (s, 1H), 7.70 (d, J=2.9 Hz, 1H), 7.41 (s, 1H), 7.24 (dd, J=15.0, 2.9 Hz, 1H), 7.06-6.93 (m, 3H), 6.92-6.82 (m, 1H), 6.70-6.55 (m, 1H), 4.41-4.27 (m, 4H), 3.79-3.71 (m, 4H), 3.58 (t, J=5.8 Hz, 2H), 3.36 (s, 3H), 3.36 (s, 3H), 3.21 (t, J=6.2 Hz, 2H), 2.01-1.92 (m, 2H), 1.86-1.78 (m, 2H). LRMS (EI) m/z: 678 (M+H)$^+$.

Example 89 N-(4-((6,7-dimethoxyquinazoline-4-yl)oxy)-3-trifluoromethylphenyl)-1-(2-fluorophenyl)-2-oxo-1,2,4,5,6,7-hexahydropyrazolo[1,5-a]pyridine-3-formamide (DC621091)

2-fluoro-4-nitrophenol was replaced with 2-trifluoromethyl-4-nitrophenol, 4-chloro-6,7-dimethoxyquinoline was replaced with 4-chloro-6,7-dimethoxyquinazoline, and phenylhydrazine was replaced with 2-difluorophenylhydrazine, while the remaining raw materials, reagents and preparation methods were the same as those in example 1 to obtain the product DC621091, yield 80%. ¹HNMR (400 MHz, DMSO-d6) δ 10.57 (s, 1H), 8.45 (s, 1H), 8.04-7.73 (m, 2H), 7.57 (s, 1H), 7.37 (dd, J=14.9, 3.0 Hz, 1H), 7.10-6.95 (m, 2H), 6.93-6.83 (m, 1H), 6.80 (d, J=15.0 Hz, 1H), 6.68-6.56 (m, 1H), 3.99 (s, 3H), 3.97 (s, 3H), 3.50 (t, J=5.8 Hz, 2H), 3.22 (t, J=6.2 Hz, 2H), 2.02-1.95 (m, 2H), 1.84-1.77 (m, 2H). LRMS (EI) m/z: 624 (M+H)⁺.

Example 90 N-(4-((6,7-bis(2-methoxyethoxy)quinazolin-4-yl)oxy)-3-trifluoromethylphenyl)-1-(2-fluorophenyl)-2-oxo-1,2,4,5,6,7-hexahydropyrazolo[1,5-a]pyridine-3-formamide (DC621092)

2-fluoro-4-nitrophenol was replaced with 2-trifluoromethyl-4-nitrophenol, and 4-chloro-6,7-dimethoxyquinoline was replaced with 4-chloro-6,7-bis(2-methoxyethoxy)quinazoline, phenylhydrazine was replaced with 2-fluorophenylhydrazine, and other raw materials, reagents and preparation methods were the same as in example 1 to provide the product DC621092, yield 80%. ¹HNMR (400 MHz, DMSO-d6) δ 10.50 (s, 1H), 8.45 (s, 1H), 8.01 (s, 1H), 7.85 (d, J=3.1 Hz, 1H), 7.40 (s, 1H), 7.37 (dd, J=15.0, 3.1 Hz, 1H), 7.06-6.95 (m, 2H), 6.92-6.83 (m, 1H), 6.80 (d, J=15.0 Hz, 1H), 6.67-6.56 (m, 1H), 4.40-4.28 (m, 4H), 3.79-3.73 (m, 4H), 3.56 (t, J=5.8 Hz, 2H), 3.36 (s, 3H), 3.36 (s, 3H), 3.23 (t, J=6.2 Hz, 2H), 2.02-1.94 (m, 2H), 1.83-1.75 (m, 2H). LRMS (EI) m/z: 712 (M+H)⁺.

Example 91 N-(4-((6,7-dimethoxyquinazoline-4-yl)oxy)naphthalene-1-yl)-1-(2-fluorophenyl)-2-oxo-1,2,4,5,6,7-hexahydropyrazolo[1,5-a]pyridine-3-formamide (DC621093)

2-fluoro-4-nitrophenol was replaced with 4-nitro-1-naphthol, 4-chloro-6,7-dimethoxyquinoline was replaced with 4-chloro-6,7-dimethoxyquinazoline, and phenylhydrazine was replaced with 2-fluorophenylhydrazine, while the remaining raw materials, reagents and preparation methods were the same as those in example 21 to obtain the product DC621093, yield 80%. ¹HNMR (400 MHz, DMSO-d6) δ 10.57 (s, 1H), 8.45 (s, 1H), 8.24 (dd, J=14.9, 3.0 Hz, 1H), 7.97 (dd, J=14.9, 3.0 Hz, 1H), 7.89 (s, 1H), 7.68-7.53 (m, 2H), 7.42-7.34 (m, 1H), 7.08-6.94 (m, 2H), 6.92-6.84 (m, 1H), 6.81 (d, J=15.0 Hz, 1H), 6.65-6.56 (m, 1H), 6.05 (d, J=15.0 Hz, 1H), 3.98 (s, 3H), 3.97 (s, 3H), 3.54 (t, J=5.8 Hz, 2H), 3.23 (t, J=6.2 Hz, 2H), 2.03-1.95 (m, 2H), 1.84-1.75 (m, 2H). LRMS (EI) m/z: 606 (M+H)⁺.

Example 92 N-(4-((6,7-bis(2-methoxyethoxy)quinazolin-4-yl)oxy)naphthalene-1-yl)-1-(2-fluorophenyl)-2-oxo-1,2,4,5,6,7-hexahydropyrazolo[1,5-a]pyridine-3-formamide (DC621094)

2-fluoro-4-nitrophenol was replaced with 4-nitro-1-naphthol, and 4-chloro-6,7-dimethoxyquinoline was replaced with 4-chloro-6,7-bis(2-methoxyethoxy)quinazoline, phenylhydrazine was replaced with 2-fluorophenylhydrazine, and other raw materials, reagents and preparation methods were the same as in example 21 to provide the product DC621094, yield 80%. ¹HNMR (400 MHz, DMSO-d6) δ 10.57 (s, 1H), 8.45 (s, 1H), 8.24 (dd, J=14.9, 3.0 Hz, 1H), 8.07 (s, 1H), 7.97 (dd, J=14.9, 3.0 Hz, 1H), 7.66-7.58 (m, 1H), 7.47-7.29 (m, 2H), 7.06-6.95 (m, 2H), 6.92-6.83 (m, 1H), 6.81 (d, J=15.0 Hz, 1H), 6.70-6.56 (m, 1H), 6.05 (d, J=15.0 Hz, 1H), 4.39-4.27 (m, 4H), 3.81-3.72 (m, 4H), 3.53 (t, J=5.8 Hz, 2H), 3.36 (s, 3H), 3.36 (s, 3H), 3.24 (t, J=6.1 Hz, 2H), 2.02-1.93 (m, 2H), 1.85-1.76 (m, 2H). LRMS (EI) m/z: 694 (M+H)⁺.

Example 93 N-(5-(6,7-dimethoxyquinazoline-4-yl)oxy)pyridine-2-yl)-1-(2-fluorophenyl)-2-oxo-1,2,4,5,6,7-hexahydropyrazolo[1,5-a]pyridine-3-formamide (DC621095)

2-fluoro-4-nitrophenol was replaced with 5-hydroxy-2-nitropyridine, 4-chloro-6,7-dimethoxyquinoline was replaced with 4-chloro-6,7-dimethoxyquinazoline, and phenylhydrazine was replaced with 2-fluorophenylhydrazine, while the remaining raw materials, reagents and preparation methods were the same as those in example 1 to obtain the product DC621095, yield 80%. ¹HNMR (400 MHz, DMSO-d6) δ 10.75 (s, 1H), 8.85 (d, J=15.0 Hz, 1H), 8.45 (s, 1H), 8.15 (d, J=2.9 Hz, 1H), 7.83 (s, 1H), 7.72 (s, 1H), 7.28 (dd, J=15.0, 2.9 Hz, 1H), 7.07-6.94 (m, 2H), 6.91-6.85 (m, 1H), 6.67-6.56 (m, 1H), 3.99 (s, 3H), 3.98 (s, 3H), 3.54 (t, J=5.8 Hz, 2H), 3.24 (t, J=6.2 Hz, 2H), 2.02-1.93 (m, 2H), 1.85-1.77 (m, 2H). LRMS (EI) m/z: 557 (M+H)⁺.

Example 94 N-(5-(6,7-bis(2-methoxyethoxy)quinazolin-4-yl)pyridine-2-yl)-1-(2-fluorophenyl)-2-oxo-1,2,4,5,6,7-hexahydropyrazolo[1,5-a]pyridine-3-formamide (DC621096)

2-fluoro-4-nitrophenol was replaced with 5-hydroxy-2-nitropyridine, and 4-chloro-6,7-dimethoxyquinoline was replaced with 4-chloro-6,7-bis(2-methoxyethoxy)quinazoline, phenylhydrazine was replaced with 2-fluorophenylhydrazine, and other raw materials, reagents and preparation methods were the same as in example 1 to provide the product DC621096, yield 80%. ¹HNMR (400 MHz, DMSO-d6) δ 10.74 (s, 1H), 8.86 (d, J=15.0 Hz, 1H), 8.46 (s, 1H), 8.16 (d, J=3.1 Hz, 1H), 7.85 (s, 1H), 7.40 (s, 1H), 7.29 (dd, J=14.9, 3.0 Hz, 1H), 7.15-6.95 (m, 2H), 6.94-6.79 (m, 1H), 6.67-6.56 (m, 1H), 4.36-4.26 (m, 4H), 3.79-3.74 (m, 4H), 3.55 (t, J=5.8 Hz, 2H), 3.36 (s, 3H), 3.36 (s, 3H), 3.23 (t, J=6.1 Hz, 2H), 2.02-1.93 (m, 2H), 1.86-1.75 (m, 2H). LRMS (EI) m/z: 645 (M+H)⁺.

Example 95 (R)—N-(3-fluoro-4-((6-methoxy-7-((tetrahydrofuran-3-yl)oxy)quinazolin-4-yl)oxy)phenyl)-1-(2-fluorophenyl)-2-oxo-1,2,4,5,6,7-hexahydropyrazolo[1,5-a]pyridine-3-formamide (DC621097)

4-chloro-6,7-dimethoxyquinoline was replaced with (R)-4-chloro-6-methoxy-7-((tetrahydrofuran-3-yl)oxy)quinazoline, phenylhydrazine was replaced with 2-fluorophenylhydrazine, and other raw materials, reagents and preparation methods were the same as in example 1 to provide the product DC621097, yield 80%. ¹HNMR (400 MHz, DMSO-d6) δ 10.89 (s, 1H), 8.46 (s, 1H), 7.72 (s, 1H), 7.58 (dd, J=16.0, 3.0 Hz, 1H), 7.42 (s, 1H), 7.15 (dd, J=15.0, 3.0 Hz, 1H), 7.09-6.95 (m, 2H), 6.93-6.81 (m, 2H), 6.67-6.57 (m, 1H), 5.05-4.96 (m, 1H), 4.21-4.13 (m, 1H), 4.06-4.02 (m, 1H), 3.94 (s, 3H), 3.85-3.80 (m, 1H), 3.78-3.73 (m, 1H), 3.54 (t, J=5.8 Hz, 2H), 3.20 (t, J=6.2 Hz, 2H), 2.44-2.31 (m, 1H), 2.18-2.11 (m, 1H), 2.02-1.95 (m, 2H), 1.88-1.77 (m, 2H). LRMS (EI) m/z: 630 (M+H)⁺.

Example 96 (S)—N-(3-fluoro-4-((6-methoxy-7-((tetrahydrofuran-3-yl)oxy)quinazolin-4-yl)oxy)phenyl)-1-(2-fluorophenyl)-2-oxo-1,2,4,5,6,7-hexahydropyrazolo[1,5-a]pyridine-3-formamide (DC621098)

4-chloro-6,7-dimethoxyquinoline was replaced with (S)-4-chloro-6-methoxy-7-((tetrahydrofuran-3-yl)oxy)quinazoline, phenylhydrazine was replaced with 2-fluorophenylhydrazine, and other raw materials, reagents and preparation methods were the same as in example 1 to provide the product DC6210898, yield 80%. ¹HNMR (400 MHz, DMSO-d6) δ 10.88 (s, 1H), 8.45 (s, 1H), 7.73 (s, 1H), 7.56 (dd, J=16.0, 3.0 Hz, 1H), 7.44 (s, 1H), 7.13 (dd, J=15.0, 3.0 Hz, 1H), 7.09-6.97 (m, 2H), 6.93-6.84 (m, 2H), 6.67-6.59 (m, 1H), 5.07-4.96 (m, 1H), 4.23-4.13 (m, 1H), 4.06-4.01 (m, 1H), 3.96 (s, 3H), 3.86-3.80 (m, 1H), 3.78-3.71 (m, 1H), 3.56 (t, J=5.8 Hz, 2H), 3.22 (t, J=6.2 Hz, 2H), 2.42-2.31 (m, 1H), 2.18-2.11 (m, 1H), 2.04-1.95 (m, 2H), 1.89-1.77 (m, 2H). LRMS (EI) m/z: 630 (M+H)⁺.

Example 97 N-(4-((6,7-dimethoxyquinazoline-4-yl)oxy)-3-chlorophenyl)-1-(4-fluorophenyl)-2-oxo-1,2,4,5,6,7-hexahydropyrazolo[1,5-a]pyridine-3-formamide (DC621099)

2-fluoro-4-nitrophenol was replaced with 2-chloro-4-nitrophenol, 4-chloro-6,7-dimethoxyquinoline was replaced with 4-chloro-6,7-dimethoxyquinazoline, and phenylhydrazine was replaced with 4-fluorophenylhydrazine, while the remaining raw materials, reagents and preparation methods were the same as those in example 1 to obtain the product DC621099, yield 80%. ¹HNMR (400 MHz, DMSO-d6) δ 10.76 (s, 1H), 8.55 (s, 1H), 8.12 (d, J=2.3 Hz, 1H), 7.58-7.53 (m, 3H), 7.49-7.40 (m, 5H), 4.00 (s, 3H), 3.98 (s, 3H), 3.56 (t, J=5.8 Hz, 2H), 3.20 (t, J=6.3 Hz, 2H), 2.02-1.94 (m, 2H), 1.85-1.78 (m, 2H). LRMS (EI) m/z: 590 (M+H)⁺.

Example 98 N-(4-((6,7-bis(2-methoxyethoxy)quinazolin-4-yl)oxy)-3-chlorophenyl)-1-(4-fluorophenyl)-2-oxo-1,2,4,5,6,7-hexahydropyrazolo[1,5-a]pyridine-3-formamide (DC621100)

2-fluoro-4-nitrophenol was replaced with 2-chloro-4-nitrophenol, and 4-chloro-6,7-dimethoxyquinoline was replaced with 4-chloro-6,7-bis(2-methoxyethoxy)quinazoline, phenylhydrazine was replaced with 4-fluorophenylhydrazine, and other raw materials, reagents and preparation methods were the same as in example 1 to provide the product DC621100, yield 80%. ¹HNMR (400 MHz, DMSO-d6) δ 10.66 (s, 1H), 8.46 (s, 1H), 8.04 (s, 1H), 7.72 (d, J=3.1 Hz, 1H), 7.41 (s, 1H), 7.26 (dd, J=14.9, 3.0 Hz, 1H), 7.07-6.95 (m, 3H), 6.88 (dd, J=15.0, 10.0 Hz, 2H), 4.42-4.27 (m, 4H), 3.79-3.72 (m, 4H), 3.57 (t, J=5.8 Hz, 2H), 3.36 (s, 3H), 3.36 (s, 3H), 3.22 (t, J=6.2 Hz, 2H), 2.02-1.92 (m, 2H), 1.87-1.78 (m, 2H). LRMS (EI) m/z: 678 (M+H)⁺.

Example 99 N-(4-((6,7-dimethoxyquinazoline-4-yl)oxy)-3-trifluoromethylphenyl)-1-(4-fluorophenyl)-2-oxo-1,2,4,5,6,7-hexahydropyrazolo[1,5-a]pyridine-3-formamide (DC621101)

2-fluoro-4-nitrophenol was replaced with 2-trifluoromethyl-4-nitrophenol, 4-chloro-6,7-dimethoxyquinoline was replaced with 4-chloro-6,7-dimethoxyquinazoline, and phenylhydrazine was replaced with 4-fluorophenylhydrazine, while the remaining raw materials, reagents and preparation methods were the same as those in example 1 to obtain the product DC621101, yield 80%. ¹HNMR (400 MHz, DMSO-d6) δ 10.57 (s, 1H), 8.46 (s, 1H), 7.90 (s, 1H), 7.86 (d, J=3.1 Hz, 1H), 7.66 (s, 1H), 7.38 (dd, J=14.9, 3.0 Hz, 1H), 7.05-6.95 (m, 2H), 6.94-6.75 (m, 3H), 3.98 (s, 3H), 3.97 (s, 3H), 3.53 (t, J=5.8 Hz, 2H), 3.20 (t, J=6.2 Hz, 2H), 2.01-1.95 (m, 2H), 1.85-1.77 (m, 2H). LRMS (EI) m/z: 624 (M+H)⁺.

Example 100 N-(4-((6,7-bis(2-methoxyethoxy)quinazolin-4-yl)oxy)-3-trifluoromethylphenyl)-1-(4-fluorophenyl)-2-oxo-1,2,4,5,6,7-hexahydropyrazolo[1,5-a]pyridine-3-formamide (DC621102)

2-fluoro-4-nitrophenol was replaced with 2-trifluoromethyl-4-nitrophenol, and 4-chloro-6,7-dimethoxyquinoline was replaced with 4-chloro-6,7-bis(2-methoxyethoxy)quinazoline, phenylhydrazine was replaced with 4-fluorophenylhydrazine, and other raw materials, reagents and preparation methods were the same as in example 1 to provide the product DC621102, yield 80%. ¹HNMR (400 MHz, DMSO-d6) δ 10.50 (s, 1H), 8.46 (s, 1H), 8.02 (s, 1H), 7.86 (d, J=3.1 Hz, 1H), 7.45-7.32 (m, 2H), 7.15-6.95 (m, 2H), 6.94-6.70 (m, 3H), 4.40-4.29 (m, 4H), 3.79-3.72 (m, 4H), 3.58 (t, J=5.8 Hz, 2H), 3.36 (s, 3H), 3.36 (s, 3H), 3.24 (t, J=6.2 Hz, 2H), 2.03-1.94 (m, 2H), 1.84-1.75 (m, 2H). LRMS (EI) m/z: 712 (M+H)⁺.

Example 101 N-(4-((6,7-dimethoxyquinazoline-4-yl)oxy)naphthalene-1-yl)-1-(4-fluorophenyl)-2-oxo-1,2,4,5,6,7-hexahydropyrazolo[1,5-a]pyridine-3-formamide (DC621103)

2-fluoro-4-nitrophenol was replaced with 4-nitro-1-naphthol, 4-chloro-6,7-dimethoxyquinoline was replaced with 4-chloro-6,7-dimethoxyquinazoline, and phenylhydrazine was replaced with 4-fluorophenylhydrazine, while the remaining raw materials, reagents and preparation methods were the same as those in example 21 to obtain the product DC621103, yield 80%. ¹HNMR (400 MHz, DMSO-d6) δ 10.57 (s, 1H), 8.44 (s, 1H), 8.23 (dd, J=14.9, 3.0 Hz, 1H), 7.96 (dd, J=14.9, 3.0 Hz, 1H), 7.83 (s, 1H), 7.66-7.48 (m, 2H), 7.42-7.33 (m, 1H), 7.04-6.95 (m, 2H), 6.89-6.78 (m, 3H), 6.04 (d, J=14.8 Hz, 1H), 3.99 (s, 3H), 3.97 (s, 3H), 3.56 (t, J=5.8 Hz, 2H), 3.21 (t, J=6.2 Hz, 2H), 2.02-1.95 (m, 2H), 1.86-1.75 (m, 2H). LRMS (EI) m/z: 606 (M+H)⁺.

Example 102 N-(4-((6,7-bis(2-methoxyethoxy)quinazolin-4-yl)oxy)naphthalene-1-yl)-1-(4-fluorophenyl)-2-oxo-1,2,4,5,6,7-hexahydropyrazolo[1,5-a]pyridine-3-formamide (DC621104)

2-fluoro-4-nitrophenol was replaced with 4-nitro-1-naphthol, and 4-chloro-6,7-dimethoxyquinoline was replaced with 4-chloro-6,7-bis(2-methoxyethoxy)quinazoline, phenylhydrazine was replaced with 4-fluorophenylhydrazine, and other raw materials, reagents and preparation methods were the same as in example 21 to provide the product DC621104, yield 80%. ¹HNMR (400 MHz, DMSO-d6) δ 10.57 (s, 1H), 8.46 (s, 1H), 8.25 (dd, J=14.9, 3.0 Hz, 1H), 8.06 (s, 1H), 7.98 (dd, J=14.8, 3.1 Hz, 1H), 7.62 (d, J=3.1 Hz, 1H), 7.49-7.26 (m, 2H), 7.09-6.95 (m, 2H), 6.94-6.74 (m, 3H), 6.06 (d, J=15.0 Hz, 1H), 4.38-4.27 (m, 4H), 3.83-3.72 (m, 4H), 3.51 (t, J=5.8 Hz, 2H), 3.36 (s, 3H), 3.36

(s, 3H), 3.22 (t, J=6.1 Hz, 2H), 2.02-1.94 (m, 2H), 1.87-1.76 (m, 2H). LRMS (EI) m z 694 (M+H)⁺.

Example 103 N-(5-(6,7-dimethoxyquinazoline-4-yl)oxy)pyridine-2-yl)-1-(4-fluorophenyl)-2-oxo-1,2,4,5,6,7-hexahydropyrazolo[1,5-a]pyridine-3-formamide (DC621105)

2-fluoro-4-nitrophenol was replaced with 5-hydroxy-2-nitropyridine, 4-chloro-6,7-dimethoxyquinoline was replaced with 4-chloro-6,7-dimethoxyquinazoline, and phenylhydrazine was replaced with 4-fluorophenylhydrazine, while the remaining raw materials, reagents and preparation methods were the same as those in example 1 to obtain the product DC621105, yield 80%. ¹HNMR (400 MHz, DMSO-d6) δ 10.75 (s, 1H), 8.86 (d, J=15.0 Hz, 1H), 8.46 (s, 1H), 8.16 (d, J=3.1 Hz, 1H), 7.85 (s, 1H), 7.62 (s, 1H), 7.29 (dd, J=15.0, 3.1 Hz, 1H), 7.12-6.95 (m, 2H), 6.94-6.81 (m, 2H), 3.99 (s, 3H), 3.97 (s, 3H), 3.56 (t, J=5.8 Hz, 2H), 3.23 (t, J=6.2 Hz, 2H), 2.02-1.94 (m, 2H), 1.85-1.76 (m, 2H). LRMS (EI) m/z: 557 (M+H)⁺.

Example 104 N-(5-(6,7-bis(2-methoxyethoxy)quinazolin-4-yl)pyridine-2-yl)-1-(4-fluorophenyl)-2-oxo-1,2,4,5,6,7-hexahydropyrazolo[1,5-a]pyridine-3-formamide (DC621106)

2-fluoro-4-nitrophenol was replaced with 5-hydroxy-2-nitropyridine, and 4-chloro-6,7-dimethoxyquinoline was replaced with 4-chloro-6,7-bis(2-methoxyethoxy)quinazoline, phenylhydrazine was replaced with 4-fluorophenylhydrazine, and other raw materials, reagents and preparation methods were the same as in example 1 to provide the product DC621106, yield 80%. ¹HNMR (400 MHz, DMSO-d6) δ 10.74 (s, 1H), 8.85 (d, J=15.0 Hz, 1H), 8.45 (s, 1H), 8.15 (d, J=3.1 Hz, 1H), 7.84 (s, 1H), 7.40 (s, 1H), 7.28 (dd, J=15.0, 2.9 Hz, 1H), 7.11-6.94 (m, 2H), 6.92-6.82 (m, 2H), 4.36-4.25 (m, 4H), 3.79-3.73 (m, 4H), 3.57 (t, J=5.8 Hz, 2H), 3.36 (s, 3H), 3.36 (s, 3H), 3.21 (t, J=6.1 Hz, 2H), 2.02-1.94 (m, 2H), 1.86-1.77 (m, 2H). LRMS (EI) m/z: 645 (M+H)⁺.

Example 105 (R)—N-(3-fluoro-4-((6-methoxy-7-((tetrahydrofuran-3-yl)oxy)quinazolin-4-yl)oxy)phenyl)-1-(4-fluorophenyl)-2-oxo-1,2,4,5,6,7-hexahydropyrazolo[1,5-a]pyridine-3-formamide (DC621107)

4-chloro-6,7-dimethoxyquinoline was replaced with (R)-4-chloro-6-methoxy-7-((tetrahydrofuran-3-yl)oxy)quinazoline, phenylhydrazine was replaced with 4-fluorophenylhydrazine, and other raw materials, reagents and preparation methods were the same as in example 1 to provide the product DC621107, yield 80%. ¹HNMR (400 MHz, DMSO-d6) δ 10.89 (s, 1H), 8.44 (s, 1H), 7.76 (d, J=8.8 Hz, 2H), 7.57 (dd, J=15.9, 2.9 Hz, 1H), 7.14 (dd, J=15.0, 3.1 Hz, 1H), 7.07-6.93 (m, 2H), 6.91-6.77 (m, 3H), 5.05-4.97 (m, 1H), 4.22-4.13 (m, 1H), 4.06-4.01 (m, 1H), 3.95 (s, 3H), 3.86-3.80 (m, 1H), 3.78-3.72 (m, 1H), 3.56 (t, J=5.8 Hz, 2H), 3.22 (t, J=6.2 Hz, 2H), 2.44-2.33 (m, 1H), 2.19-2.11 (m, 1H), 2.02-1.96 (m, 2H), 1.88-1.76 (m, 2H). LRMS (EI) m/z: 630 (M+H)⁺.

Example 106 (S)—N-(3-fluoro-4-((6-methoxy-7-((tetrahydrofuran-3-yl)oxy)quinazolin-4-yl)oxy)phenyl)-1-(4-fluorophenyl)-2-oxo-1,2,4,5,6,7-hexahydropyrazolo[1,5-a]pyridine-3-formamide (DC621108)

4-chloro-6,7-dimethoxyquinoline was replaced with (S)-4-chloro-6-methoxy-7-((tetrahydrofuran-3-yl)oxy)quinazoline, phenylhydrazine was replaced with 4-fluorophenylhydrazine, and other raw materials, reagents and preparation methods were the same as in example 1 to provide the product DC621108, yield 80%. ¹HNMR (400 MHz, DMSO-d6) δ 10.88 (s, 1H), 8.45 (s, 1H), 7.75 (d, J=8.8 Hz, 2H), 7.56 (dd, J=15.9, 2.9 Hz, 1H), 7.15 (dd, J=15.0, 3.1 Hz, 1H), 7.05-6.93 (m, 2H), 6.92-6.78 (m, 3H), 5.06-4.97 (m, 1H), 4.21-4.13 (m, 1H), 4.07-4.01 (m, 1H), 3.93 (s, 3H), 3.87-3.80 (m, 1H), 3.78-3.73 (m, 1H), 3.56 (t, J=5.8 Hz, 2H), 3.21 (t, J=6.2 Hz, 2H), 2.42-2.33 (m, 1H), 2.18-2.11 (m, 1H), 2.03-1.96 (m, 2H), 1.88-1.78 (m, 2H). LRMS (EI) m/z: 630 (M+H)⁺.

Comparative Example 1 N-(4-((4,6-dimethoxy-1,3,5-triazine-2-yl)oxy)phenyl)-2-oxo-1-phenyl-1,2,4,5,6,7-hexahydro[1,5-a]pyridine-3-formamide (DC621003)

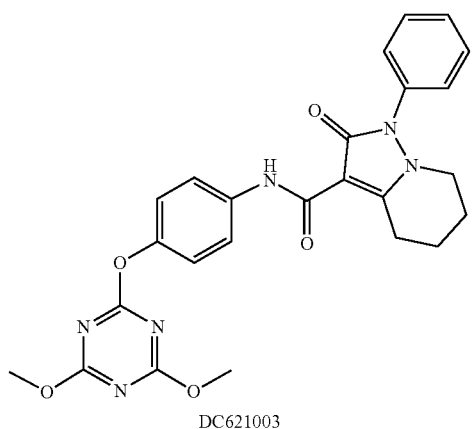 [SMILES: COc1nc(OC)nc(Oc2ccc(NC(=O)c3c4n(n(-c5ccccc5)c3=O)CCCC4)cc2)n1]

DC621003

Synthesis of key Intermediate 2,4-dimethoxy-6-(4-nitrophenoxy)-1,3,5-triazine

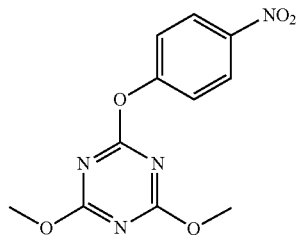 [SMILES: COc1nc(OC)nc(Oc2ccc([N+](=O)[O-])cc2)n1]

5 g 2-chloro-4,6-dimethoxy-1,3,5-triazine, 4.4 g p-nitrophenol, 18.6 g Cs₂CO₃ and 75 mL DMF were added to a 100 mL eggplant-shaped flask, then stirred at room temperature overnight. The reaction was monitored by thin layer chromatography (TLC). After the reaction was completed, a large amount of water was added to the reaction solution to precipitate a yellow solid, suction filtered to obtain 7 g solid. LRMS (EI) 279 (M+H)⁺. (directly used in the next step without purification)

The remaining steps are the same as in Example 1 to provide product DC621003, yield 82%. 1H NMR (400 MHz, DMSO-d6) δ 10.67 (s, 1H), 7.69-7.62 (m, 2H), 7.62-7.55 (m, 2H), 7.53-7.43 (m, 3H), 7.21-7.13 (m, 2H), 3.90 (s, 6H), 3.56 (t, J=5.8 Hz, 2H), 3.21 (t, J=6.3 Hz, 2H), 2.01-1.95 (m, 2H), 1.87-1.74 (m, 2H). $^{13}$C NMR (101 MHz, DMSO-d6) δ 173.7, 173.3, 163.1, 161.5, 153.9, 147.1, 137.1, 133.1, 129.8, 129.3, 127.7, 122.4, 120.1, 96.5, 55.7, 46.8, 23.8, 22.2, 19.0. LRMS (EI) m/z 489 (M+H)$^+$.

Comparative Example 2 N-(4-((2-methylpyrimidine-4-yl)oxy)phenyl)-2-oxo-1-phenyl-1,2,4,5,6,7-hexahydro[1,5-a]pyridine-3-formamide (DC621005)

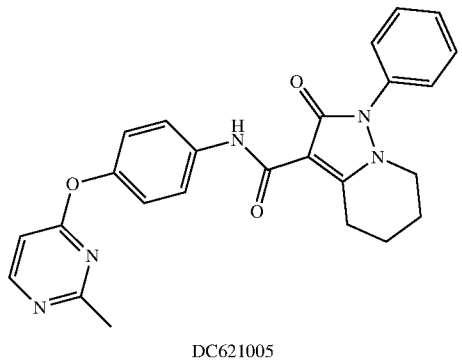 [SMILES: Cc1nccc(Oc2ccc(NC(=O)c3c4n(n(-c5ccccc5)c3=O)CCCC4)cc2)n1]

DC621005

2-chloro-4,6-dimethoxy-1,3,5-triazine was replaced with 4-chloro-2-methylpyrimidine, and other raw materials, reagents and preparation methods were the same as in example 107 to provide the product DC621005, yield 83%. 1H NMR (400 MHz, DMSO-d6) δ 10.67 (s, 1H), 8.53 (d, J=5.8 Hz, 1H), 7.67 (d, J=8.9 Hz, 2H), 7.58 (t, J=7.5 Hz, 2H), 7.54-7.44 (m, 3H), 7.16 (d, J=8.9 Hz, 2H), 6.84 (d, J=5.8 Hz, 1H), 3.56 (t, J=5.8 Hz, 2H), 3.21 (t, J=6.2 Hz, 2H), 2.44 (s, 3H), 2.04-1.92 (m, 2H), 1.87-1.73 (m, 2H). $^{13}$C NMR (101 MHz, DMSO-d6) δ 169.4, 168.1, 163.1, 161.5, 159.5, 153.9, 147.6, 136.8, 133.1, 129.8, 129.3, 127.7, 122.5, 120.6, 105.4, 96.5, 46.8, 25.9, 23.9, 22.2, 19.1. LRMS (EI) m/z 442 (M+H)$^+$.

Pharmacological Activity Test Example

Experimental Example 1: Screening the Influence of Compounds on the Enzyme Activity of Receptor Tyrosine Kinase AXL Detection method: Enzyme-linked immunosorbent assay (ELISA)
Tested receptor tyrosine kinase: AXL
Test batch: 2 batches
Reagents, consumables and equipment: The kinase used in the experiment was expressed and purified by our laboratory using the insect baculovirus expression system to express and purify the recombinant protein kinase domain; polyglutamic acid-tyrosine peptide segment [Poly(Glu,Tyr)$_{4:1}$] and sodium vanadate were purchased from Sigma; anti-phosphorylated monoclonal antibody PY99 was purchased from Santa Cruz; horseradish peroxidase-labeled goat anti-mouse secondary antibody was purchased from Calbiochem; ATP and OPD were purchased from Shanghai Shenggong; other reagents used were all purchased from Sinopharm Chemical Reagent Co., Ltd. The reaction microplate (#2592) was purchased from Corning. The full-wavelength microplate reader for experiment reading was a product of Molecular Device, model: SpectraMax 190; the experiment water was distilled water produced by Sinopharm Group.

Compound preparation: The compounds were centrifuged at 12,000 g for 5 min, and DMSO was added to prepare a $10^{-2}$M stock solution, vortexed evenly and sonicated for 10 min for use, and stored at −40° C. During the test, the compound was diluted from the stock solution to 100 times the tested concentration with DMSO (the DMSO concentration in the system was 1%).

Experimental Method

1. Enzyme reaction substrate Poly(Glu,Tyr)4:1 was diluted with PBS without potassium ion (10 mM sodium phosphate buffer, 150 mM NaCl, pH7.2-7.4) to 20 g/mL, 125 L/well to coat enzyme plate, and reacted under 37° C. for 12-16 hours. Discard the liquid from the well. The plate was washed and washed three times with T-PBS (0.1% Tween-20 in potassium-free PBS, 200 μL/well) for 5 minutes each time. The enzyme plate was dried in 37° C. dryer for 1-2 hours.

2. 49 μL of ATP solution diluted with reaction buffer (50 mM HEPES pH 7.4, 50 mM MgCl$_2$, 0.5 mM MnCl$_2$, 0.2 mM Na$_3$VO$_4$, 1 mM DTT) was added to each well, and 1 L of the tested compound was added to each well, and then 50 μL of AXL kinase domain recombinant protein diluted in reaction buffer was added to start the reaction. Two control wells without ATP were added in each experiment. (100 rpm) Reacted in 37° C. shaker for 1 hour. Discard the liquid from the well, and the plate was washed with T-PBS for three times.

3. The antibody PY99 dilution (antibody 1:500 diluted with 5 mg/mL BSA in T-PBS), 100 μL/well, and reacted in 37° C. shaker for 0.5 hours. Discard the liquid from the well, and the plate was washed with T-PBS for three times.

4. The horseradish peroxidase-labeled goat anti-mouse second antibody dilution (antibody diluted 1:2000 with BSA 5 mg/mL in T-PBS), 100 μL/well, and reacted in 37° C. shaker for 0.5 hours. Discard the liquid from the well, and the plate was washed with T-PBS for three times.

5. 2 mg/mL OPD coloration solution (diluted with 0.1M citric acid-sodium citrate buffer containing 0.03% H$_2$O$_2$ (pH=5.4)) was added, 100 L/well, and reacted in dark for 1-10 minutes at 25° C.

6. The reaction was quenched with 50 μL/well 2M H$_2$S$_4$, and read at 490 nm using a tunable microplate reader VERSAmax.

7. Analysis of results $$\text{inhibition rate (\%)} := \left(1 - \frac{OD \text{ of the compound} - OD \text{ of the control well (without } ATP)}{OD \text{ of the negative control} - OD \text{ of the control well (without } ATP)}\right) \times 100\%$$

The IC$_{50}$ values were obtained by four-parameter regression analysis using the software supplied with the microplate reader.

TABLE 1

Inhibitory rate of compound on receptor tyrosine kinase AXL enzyme activity (%)

| Compound | AXL activity | | | | |
|---|---|---|---|---|---|
| | 1000 (nM) | 100(nM) | 10(nM) | 1(nM) | $IC_{50}$ (nM) |
| | | Inhibitory rate(%) | | | |
| DC621001 | / | 100 | 80.0 | 32.2 | 2.5 ± 0.3 |
| DC621004 | 100 | 95.2 | 35.2 | / | / |
| DC621011 | / | 100 | 66.6 | 17.0 | 8.1 ± 0.2 |
| DC621022 | / | 100 | 66.5 | 13.5 | 9.1 ± 0.2 |
| DC621023 | / | 100 | 80.2 | 37.5 | 5.5 ± 1.6 |
| DC621024 | / | 100 | 72.5 | 29.9 | 8.7 ± 1.0 |
| DC621034 | / | 89.4 | 70.1 | 14.2 | 9.4 ± 3.2 |
| DC621043 | 100 | 98.5 | 49.1 | / | 7.8 ± 1.1 |
| DC621044 | / | 80.7 | 61.2 | 20.7 | 7.6 ± 0.3 |
| DC621051 | / | 100 | 54.2 | 8.2 | / |
| DC621053 | / | 89.8 | 60.0 | 28.0 | / |
| DC621054 | / | 95.9 | 58.2 | 12.2 | / |
| DC621056 | / | 98.8 | 69.4 | 24.0 | / |
| DC621057 | / | 91.9 | 55.1 | 16.0 | / |
| DC621059 | / | 94.4 | 61.6 | 32.5 | / |
| DC621060 | / | 84.2 | 54.4 | 21.5 | / |
| DC621061 | / | 91.8 | 66.7 | 22.9 | / |
| DC621062 | / | 70.6 | 43.0 | 6.3 | / |
| DC621063 | / | 91.8 | 60.5 | 11.5 | / |
| DC621064 | / | 83.4 | 47.4 | 30.8 | / |
| DC621065 | / | 95.0 | 45.8 | 29.6 | / |
| DC621067 | / | 89.0 | 54.5 | 8.6 | / |
| DC621068 | / | 85.8 | 55.1 | 16.5 | / |
| DC621069 | / | 96.0 | 71.2 | 9.7 | / |
| DC621070 | / | 91.1 | 60.5 | 2.4 | / |
| DC621072 | / | 75.9 | 52.1 | 34.8 | / |
| DC621079 | / | 100 | 82.9 | 34.4 | / |
| DC621080 | / | 100 | 76.4 | 35.5 | / |
| DC621081 | / | 79.2 | 34.9 | 16.3 | / |
| DC621089 | / | 97.8 | 52.2 | 31.6 | / |
| DC621090 | / | 92.7 | 62.9 | 21.1 | / |
| DC621092 | / | 78.0 | 61.0 | 4.8 | / |
| DC621099 | / | 100 | 64.4 | 19.2 | / |
| DC621100 | / | 93.0 | 59.2 | 18.9 | / |
| XL-184 | / | / | / | / | 10.6 ± 1.8 |
| DC621003 | −7.2 | 2.8 | −15.5 | / | / |
| DC621005 | −7.8 | 18.3 | −14.6 | / | 1 |

Note:
"/" means not tested.

Conclusion: The applicant found that compounds with bicyclic ring A have better activity. When ring A is monocyclic, the compound (such as the control compounds DC621003 and DC621005) shows almost no activity at 1000, 100, and 10 nM. After preliminary in vitro enzyme activity inhibition test, 25 compounds were found to have good AXL kinase inhibitory activity, and their Inhibitory rate on AXL at 10 nM was over 50% (shown in Table 1). We completed the $IC_{50}$ determination of 8 compounds including DC621001 and found their inhibition $IC_{50}$ were less than 10 nM, which means having potent AXL inhibitory activity, and better than the positive drugs R428 and Cabozantinib.

Experimental Example 2: Study on the Selectivity of the Kinase Profile of the Compound Due to compound's potent inhibitory activity against AXL, we selected one of the compounds, DC621044, to screen 369 kinase profiles in order to investigate the compound's selectivity to the kinase profile.

The results are shown in FIG. 1 and the table below:

| Kinase | 50 nM kinase activity inhibition % DC621044 | |
|---|---|---|
| | The first time | The second time |
| MER | 99.43 | 99.54 |
| c-MET | 98.57 | 99.03 |
| AXL | 94.59 | 95.16 |
| HIPK4 | 77.19 | 77.20 |
| DDR1 | 64.14 | 64.17 |
| TRKA | 59.24 | 60.31 |
| EPHA6 | 57.33 | 57.78 |
| LCK | 52.82 | 53.10 |
| TRKB | 52.09 | 52.23 |
| FGR | 41.19 | 41.21 |
| TYRO3/SKY | 41.05 | 41.18 |
| BLK | 29.50 | 29.85 |
| FLT3 | 28.01 | 29.28 |
| PLK4/SAK | 27.20 | 29.76 |
| RON/MSTIR | 25.88 | 27.16 |
| IRR/INSRR | 25.84 | 28.27 |
| TRKC | 23.78 | 24.10 |
| ASK1/MAP3K5 | 22.48 | 23.52 |
| FYN | 22.41 | 27.73 |
| MLK2/MAP3K10 | 22.40 | 23.88 |
| c-Src | 20.04 | 20.97 |
| BRK | 18.91 | 19.39 |
| EGFR | 17.88 | 18.59 |
| FRK/PTK5 | 17.12 | 17.67 |

The results showed that the compound DC621044 has good selectivity for AXL kinase. Among the 369 kinases screened, the compound DC621044 only shows certain inhibitory effect to MER and TYRO3 (kinases of the same family of AXL), and c-Met (kinase with high homology), while having basically no inhibitory effect on other kinases, which shows good kinase profile selectivity. DC621044 have better selectivity than reported AXL inhibitors in the field (R428 and Cabozantinib), which provides optimistic basis for the development of selective AXL inhibitors.

Experimental Example 3: Study of In Vitro c-Met Kinase Inhibitory Activity

Since the screening results of 369 kinase profiles of compound DC621044 has shown that the compound has a certain inhibitory activity on c-Met. We further screened some compounds for their inhibitory activity on c-Met kinase. As shown in table 2, there are 18 compounds have inhibitory rate of over 50% to c-Met kinase at 10 nM, which shows good c-Met inhibitory activity.

TABLE 2

Inhibitory activity of receptor tyrosine kinase c-Met of compounds

| Compound (nM) | 100 | 10 | 1 |
|---|---|---|---|
| | | Inhibitory rate (%) | |
| DC621001 | 92.0 | 84.7 | 51.7 |
| | 100 | 97.6 | 72.4 |
| DC621011 | 86.6 | 74.4 | 34.5 |
| | 100 | 89.2 | 84.6 |
| DC621022 | 81.9 | 41.7 | 35.4 |
| | 96.5 | 57.0 | 51.1 |
| DC621023 | 99.2 | 80.9 | 58.9 |
| | 100 | 92.3 | 60.9 |
| DC621024 | 99.4 | 66.8 | 40.5 |
| | 100 | 80.5 | 53.5 |
| DC621034 | 97.5 | 48.3 | 34.8 |
| | 97.0 | 66.5 | 63.9 |

TABLE 2-continued

Inhibitory activity of receptor tyrosine kinase c-Met of compounds

| Compound (nM) | 100 | 10 | 1 |
|---|---|---|---|
| | | Inhibitory rate (%) | |
| DC621044 | 97.1 | 69.4 | 30.6 |
| | 100 | 75.1 | 52.3 |
| DC621051 | 93.9 | 62.4 | 39.5 |
| | 97.5 | 75.9 | 55.2 |
| DC621052 | 84.5 | 55.1 | 32.7 |
| | 94.1 | 85.0 | 43.0 |
| DC621053 | 92.8 | 50.9 | 24.0 |
| | 98.7 | 68.5 | 59.0 |
| DC621054 | 94.1 | 48.9 | 61.1 |
| | 100 | 69.6 | 60.0 |
| DC621055 | 96.0 | 68.2 | 30.8 |
| | 100 | 74.2 | 53.9 |
| DC621056 | 92.0 | 72.8 | 16.7 |
| | 94.1 | 49.8 | 42.1 |
| DC621057 | 94.6 | 55.2 | 34.0 |
| | 95.9 | 64.0 | 51.3 |
| DC621058 | 89.2 | 54.6 | 17.4 |
| | 83.6 | 45.1 | 65.0 |
| DC621060 | 91.9 | 43.9 | 18.3 |
| | 95.4 | 58.1 | 51.7 |
| DC621061 | 94.7 | 51.1 | 35.7 |
| | 95.7 | 62.4 | 61.1 |
| DC621062 | 99.8 | 78.1 | 35.9 |
| | 100 | 98.9 | 68.6 |
| DC621063 | 94.8 | 46.4 | 17.7 |
| | 99.2 | 56.2 | 32.4 |
| DC621068 | 100 | 71.2 | 34.0 |
| | 100 | 85.9 | 46.0 |
| DC621072 | 95.8 | 67.6 | 24.1 |
| | 96.6 | 68.4 | 34.3 |
| DC621080 | 97.1 | 68.8 | 9.1 |
| | 93.5 | 58.3 | 19.6 |
| DC621092 | 94.2 | 71.6 | 25.3 |
| | 89.8 | 53.1 | 16.8 |
| DC621100 | 94.4 | 63.7 | 22.1 |
| | 89.1 | 38.0 | −1.4 |
| DC621101 | 96.5 | 75.0 | 27.2 |
| | 91.0 | 60.9 | 19.6 |
| DC621102 | 99.1 | 77.2 | 25.6 |
| | 93.9 | 53.4 | 17.2 |

Experimental Example 4: Effect of the Compound on the Proliferation Effect of BaF3/TEL-AXL Cells Based on the above-mentioned enzyme activity research results, we further explored the effect of the compound on cell proliferation mediated by receptor tyrosine kinase AXL. As shown in Table 3, compounds such as DC621024, DC621044, DC621051 inhibited the proliferation of BaF3/TEL-AXL cells by >7000 at a concentration of 1 nM, which shows potent cell proliferation inhibitory effect.

TABLE 3

Inhibitory to the proliferation of BaF3/TEL-AXL cells of compounds

| concentration (nM) | 100 | 10 | 1 |
|---|---|---|---|
| | | Inhibitory rate (%) | |
| DC621001 | 82.0 | 54.9 | 48.4 |
| | 71.3 | 59.1 | 16.2 |
| DC621011 | 84.8 | 60.5 | 52.1 |
| | 83.9 | 56.1 | 3.7 |
| DC621022 | 83.2 | 71.8 | 66.3 |
| | 80.9 | 58.0 | 48.3 |
| DC621023 | 76.8 | 66.5 | 62.2 |
| | 65.0 | 67.6 | 41.4 |
| DC621024 | 85.0 | 81.0 | 79.8 |
| | 81.3 | 80.5 | 75.0 |

TABLE 3-continued

Inhibitory to the proliferation of BaF3/TEL-AXL cells of compounds

| concentration (nM) | 100 | 10 | 1 |
|---|---|---|---|
| | | Inhibitory rate (%) | |
| DC621044 | 85.9 | 79.8 | 78.9 |
| | 88.2 | 75.9 | 64.2 |
| DC621051 | 86.7 | 85.8 | 84.7 |
| | 86.6 | 85.9 | 82.9 |
| DC621053 | 83.8 | 67.5 | 65.3 |
| | 84.2 | 71.6 | 56.7 |
| DC621054 | 84.7 | 82.8 | 79.6 |
| | 86.1 | 82.5 | 81.8 |
| DC621056 | 86.6 | 70.0 | 45.3 |
| | 84.9 | 74.1 | 58.8 |
| DC621057 | 87.5 | 83.2 | 69.5 |
| | 86.0 | 83.2 | 76.6 |
| DC621059 | 83.7 | 71.4 | 68.4 |
| | 84.2 | 82.7 | 78.3 |
| DC621060 | 85.4 | 71.0 | 64.5 |
| | 85.3 | 73.4 | 66.3 |
| DC621063 | 82.3 | 67.2 | 47.8 |
| | 78.2 | 66.0 | 61.0 |
| DC621067 | 80.8 | 87.2 | 80.6 |
| | 83.0 | 85.4 | 74.8 |

All literatures mentioned in the present application are incorporated herein by reference, as though each one is individually incorporated by reference. Additionally, it should be understood that after reading the above teachings, those skilled in the art can make various changes and modifications to the present invention. These equivalents also fall within the scope defined by the appended claims.

The invention claimed is:

1. A fused-cyclic pyrazolone formamide compound having the structure of formula I, or its racemate, R-isomer, S-isomer, pharmaceutically acceptable salt or the mixture thereof:

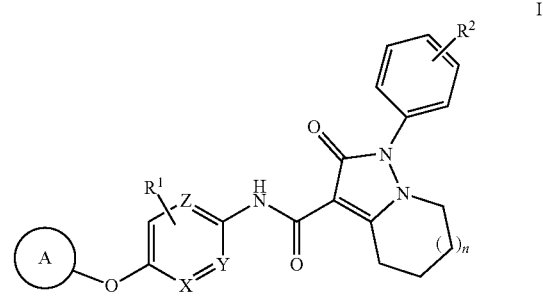

I wherein:
n is an integer of 0-2;
X, Y and Z are each independently CH or N;
$R^1$ and $R^2$ are each independently selected from the group consisting of hydrogen, deuterium, tritium, halogen, substituted or unsubstituted $C_1$-$C_6$ alkyl, substituted or unsubstituted $C_1$-$C_6$ alkoxy, substituted or unsubstituted $C_3$-$C_8$ cycloalkyl, $C_2$-$C_6$ alkenyl, cyano, nitro, amino, hydroxy, hydroxymethyl, carboxy, and —O[(CH$_2$)$_q$O]$_r$R$^3$; wherein the "substituted" refers to one or more hydrogen atoms on the group replaced by a substituent selected from the group consisting of halogen, $C_1$-$C_6$ alkyl, halogen-substituted $C_1$-$C_6$ alkyl, $C_1$-$C_6$ alkoxy, halogen-substituted $C_1$-$C_6$ alkoxy, $C_1$-$C_6$ alkoxycarbonyl, $C_3$-$C_8$ cycloalkyl, halogen-substituted $C_3$-$C_8$ cycloalkyl, cyano, nitro, amino, hydroxyl, hydroxymethyl, carboxyl, mercapto, sulfonyl, $C_6$-$C_{10}$ aryl, and 3-12 membered heterocyclic group;

$R^3$ is selected from the group consisting of hydrogen, $C_1$-$C_6$ alkyl, halogen-substituted $C_1$-$C_6$ alkyl, and hydroxymethyl;

q is 1, 2, 3, or 4;

r is 0, 1, 2, 3 or 4;

or two $R^1$ and their adjacent carbon atoms together form a group selected from the group consisting of a benzene ring and a 5-8 membered heteroaromatic ring;

or two $R^2$ and their adjacent carbon atoms together form a group selected from the group consisting of a benzene ring and a 5-8 membered heteroaromatic ring;

Ⓐ ring is selected from the group consisting of substituted or unsubstituted 7-20 membered polycyclic heterocyclic ring, substituted or unsubstituted 7-20 membered polycyclic aromatic ring, and substituted or unsubstituted 7-20 membered polycyclic aromatic heterocyclic ring, wherein the "substituted" refers to the hydrogen atom on the group is replaced by 1, 2, 3 or 4 substituents selected from the group consisting of deuterium (D), tritium (T), halogen, substituted or unsubstituted $C_1$-$C_6$ alkyl, substituted or unsubstituted $C_1$-$C_6$ alkoxy, —O[$(CH_2)_qO]_rR^3$, —NH[$(CH_2)_qO]_rR^3$, —NH(C=O)[$(CH_2)_qO]_rR^3$, —NH(SO_2)[$(CH_2)_qO]_rR^3$, —O$(CH_2)_s$Ar, substituted or unsubstituted $C_3$-$C_8$ cycloalkoxy, substituted or unsubstituted $C_3$-$C_8$ cycloalkylamino, substituted or unsubstituted $C_3$-$C_8$ epoxy alkyl, substituted or unsubstituted $C_3$-$C_8$ cycloaminoalkyl, cyano, nitro, amino, $C_1$-$C_6$ amino, hydroxyl, hydroxymethyl, carboxyl, $C_6$-$C_{10}$ aryl, $C_6$-$C_{10}$ aryloxy, substituted or unsubstituted 3-12 membered heterocyclic group, substituted or unsubstituted 3-12 membered heterocyclyloxy and substituted or unsubstituted 3-12 membered heterocyclylamino;

wherein each of the aromatic heterocyclic group, heterocyclic group independently contains 1 to 4 heteroatoms selected from the group consisting of oxygen, sulfur and nitrogen; or two adjacent substituents and their adjacent carbon atoms together form a structure of substituted or unsubstituted 6-20 membered heterocyclic ring, and wherein the heterocyclic ring optionally includes 1, 2, 3 or 4 heteroatoms selected from the group consisting of N, O and S;

s is selected from the group consisting of 0, 1, 2, 3 and 4;

Ar is selected from the group consisting of substituted or unsubstituted $C_6$-$C_{12}$ aryl, and substituted or unsubstituted 5-12 membered heteroaryl;

unless otherwise specified, the "substituted" refers to one or more hydrogen atoms on the group replaced by a substituent selected from the group consisting of halogen, $C_1$-$C_6$ alkyl, halogen-substituted $C_1$-$C_6$ alkyl, $C_1$-$C_6$ alkoxy, $C_1$-$C_6$ alkoxycarbonyl, halogen-substituted $C_1$-$C_6$ alkoxy, $C_3$-$C_8$ cycloalkyl, cyano, nitro, amino, hydroxyl, hydroxymethyl, carboxyl.

2. The fused-cyclic pyrazolone formamide compound of formula I of claim 1, or its racemate, R-isomer, S-isomer, pharmaceutically acceptable salt or mixture thereof, wherein, $R^1$ and $R^2$ are each independently selected from group consisting of hydrogen, deuterium, tritium, halogen, substituted or unsubstituted $C_1$-$C_6$ alkyl, substituted or unsubstituted $C_1$-$C_6$ alkoxy, cyano, hydroxyl, carboxyl; wherein, the "substituted" refers to one or more hydrogen atoms replaced by a substituent selected from group consisting of halogen, $C_1$-$C_6$ alkyl, $C_1$-$C_6$ alkoxy, $C_1$-$C_6$ alkoxycarbonyl, cyano, amino, hydroxyl, hydroxymethyl, carboxyl; or two $R^1$ and their adjacent carbon atoms together form a group selected from group consisting of benzene ring, 5-8 membered heteroaromatic ring.

3. The fused-cyclic pyrazolone formamide compound of formula I of claim 1, or its racemate, R-isomer, S-isomer, pharmaceutically acceptable salt or mixture thereof, wherein the Ⓐ ring is selected from the group consisting of:

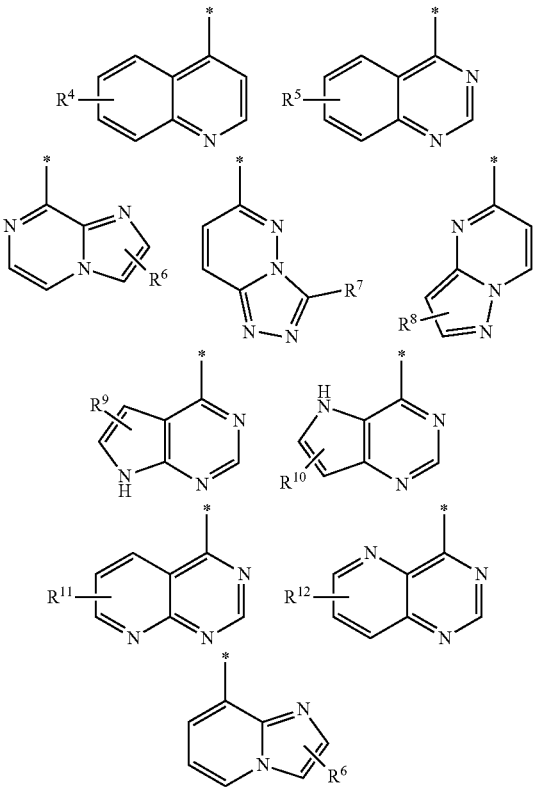

wherein, $R^4$, $R^5$, $R^6$, $R^7$, $R^8$, $R^9$, $R^{10}$, $R^{11}$, $R^{12}$ are 1-4 substituents selected from group consisting of H, D, T, halogen, substituted or unsubstituted $C_1$-$C_6$ alkyl, substituted or unsubstituted $C_1$-$C_6$ alkoxy, —O[$(CH_2)_qO]_rR3$, —NH[$(CH_2)_qO]_rR^3$, —NH(C=O)[$(CH_2)_qO]_rR3$, —NH(SO_2)[$(CH_2)_qO]_rR^3$, —O$(CH_2)_s$Ar, substituted or unsubstituted $C_3$-$C_8$ cycloalkoxy, substituted or unsubstituted $C_3$-$C_8$ cycloalkylamino, substituted or unsubstituted $C_3$-$C_8$ epoxy alkyl, substituted or unsubstituted $C_3$-$C_5$ cycloamine alkyl, cyano, nitro, amino, $C_1$-$C_6$ amino, hydroxyl, hydroxymethyl, carboxy, $C_6$-$C_{10}$ aryl, $C_6$-$C_{10}$ aryloxy, substituted or unsubstituted 3-12 membered heterocyclic group, substituted or unsubstituted 3-12 membered heterocyclyloxy and substituted or unsubstituted 3-12 membered heterocyclic amino; or two adjacent groups mentioned above and their connected atoms t may together form a structure selected from substituted or unsubstituted 6-20 membered heterocycle, wherein the heterocycle may optionally include 1, 2, 3 or 4 heteroatoms selected from N, O or S.

4. The fused-cyclic pyrazolone formamide compound of formula I of claim 2, or its racemate, R-isomer, S-isomer, pharmaceutically acceptable salt or mixture thereof, wherein the (A) ring is selected from the group consisting of:

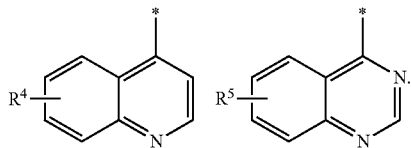

5. The fused-cyclic pyrazolone formamide compound of formula I of claim 4, or its racemate, R-isomer, S-isomer, pharmaceutically acceptable salt or mixture thereof, wherein $R^4$ and $R^5$ are respectively 1-4 substituents selected from the group consisting of substituted or unsubstituted $C_1$-$C_6$ alkoxy, —O[(CH$_2$)$_q$O]$_r$R$^3$, —NH[(CH$_2$)$_q$O]$_r$R$^3$, —NH(C=O)[(CH$_2$)$_q$O]$_r$R$^3$, —NH(SO$_2$)[(CH$_2$)$_q$O]$_r$R$^3$, —O(CH$_2$)$_s$Ar, substituted or unsubstituted 3-12 membered heterocyclyloxy and substituted or unsubstituted 3-12 membered heterocyclylamino; or two adjacent groups and their connected atoms together form a structure selected from substituted or unsubstituted 6-20 membered heterocycle, wherein the heterocycle may optionally include 1, 2, 3, or 4 heteroatoms selected from N, O or S.

6. The fused-cyclic pyrazolone formamide compound of formula I of claim 1, or its racemate, R-isomer, S-isomer, pharmaceutically acceptable salt or mixture thereof, wherein the fused cyclic pyrazolone carboxamide compound is selected from the group consisting of:

| No. | Structure |
|---|---|
| DC621001 | |
| DC621002 | |
| DC621004 | |

-continued
| No. | Structure |
|---|---|
| DC621006 | 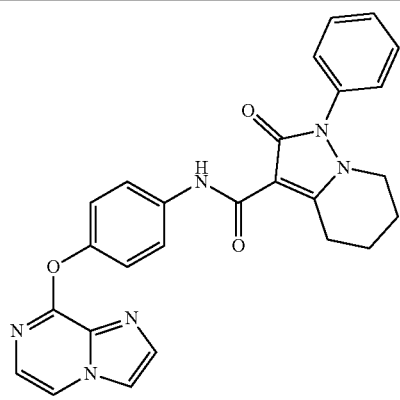 [SMILES: O=C(Nc1ccc(Oc2nccn3ccnc23)cc1)c1c2n(n(-c3ccccc3)c1=O)CCCC2] |
| DC621007 | 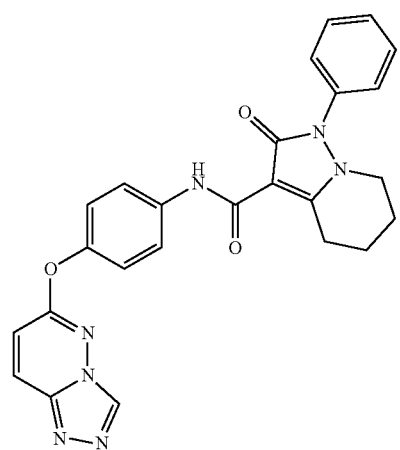 [SMILES: O=C(Nc1ccc(Oc2ccc3nncn3n2)cc1)c1c2n(n(-c3ccccc3)c1=O)CCCC2] |
| DC621008 | 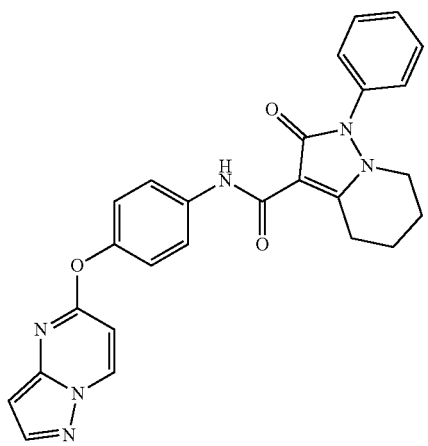 [SMILES: O=C(Nc1ccc(Oc2ccn3nccc3n2)cc1)c1c2n(n(-c3ccccc3)c1=O)CCCC2] |

-continued

| No. | Structure |
|---|---|
| DC621009 | |
| DC621010 | |
| DC621011 | |
| DC621012 | |

-continued
| No. | Structure |
|---|---|
| DC621013 | 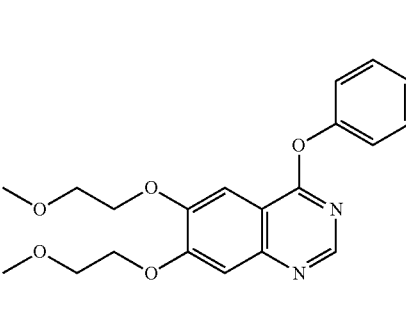 |
| DC621014 | 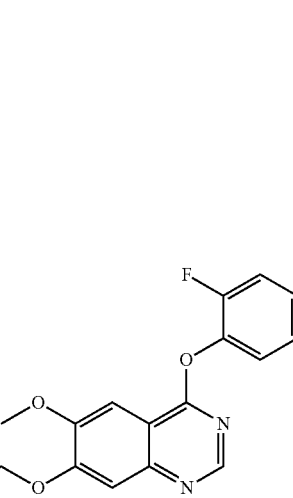 |
| DC621015 | 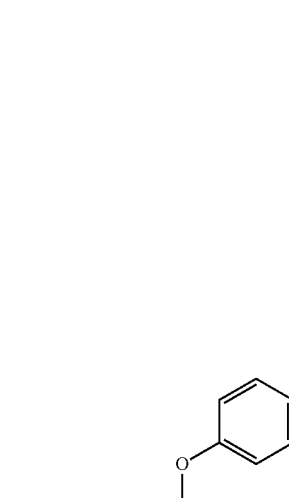 |

| No. | Structure |
|---|---|
| DC621016 | 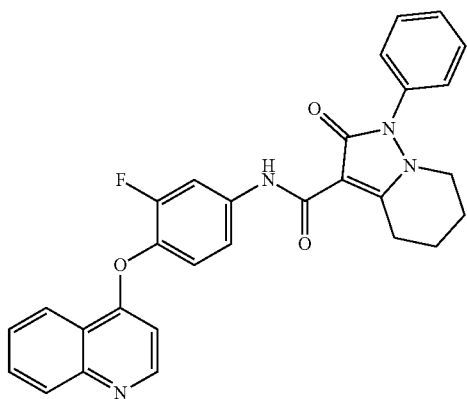 [SMILES: O=C(Nc1ccc(Oc2ccnc3ccccc23)c(F)c1)c1c2n(n(-c3ccccc3)c1=O)CCCC2] |
| DC621017 | 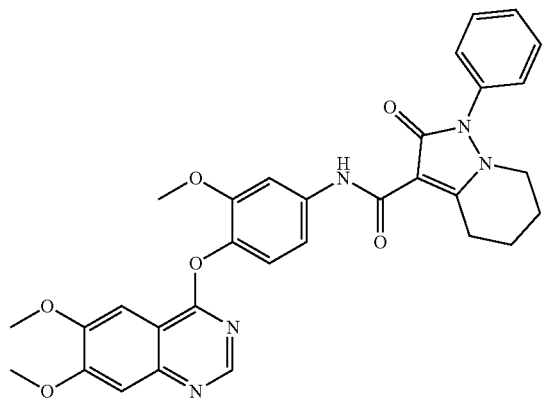 |
| DC621018 | 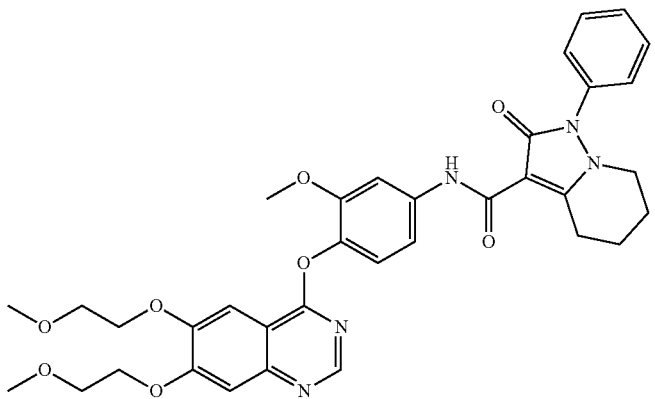 [SMILES: COCCOc1cc2ncnc(Oc3ccc(NC(=O)c4c5n(n(-c6ccccc6)c4=O)CCCC5)cc3OC)c2cc1OCCOC] |
| DC621019 | 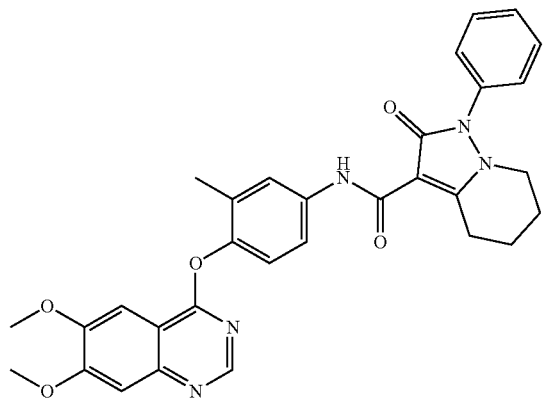 |

| No. | Structure |
|---|---|
| DC621020 | 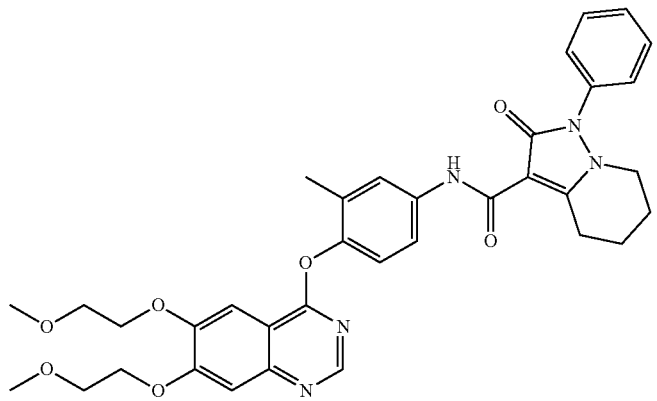 |
| DC621021 | 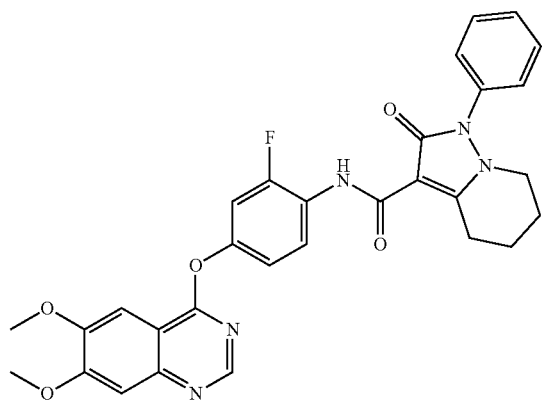 [SMILES: COc1cc2ncnc(Oc3ccc(NC(=O)c4c5n(n(-c6ccccc6)c4=O)CCCC5)c(F)c3)c2cc1OC] |
| DC621022 | 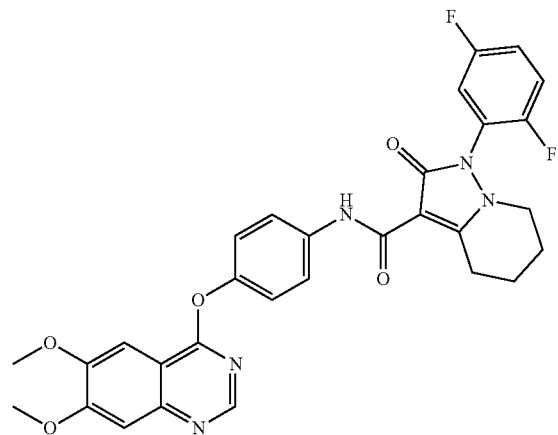 [SMILES: COc1cc2ncnc(Oc3ccc(NC(=O)c4c5n(n(-c6cc(F)ccc6F)c4=O)CCCC5)cc3)c2cc1OC] |

| No. | Structure |
|---|---|
| DC621023 | 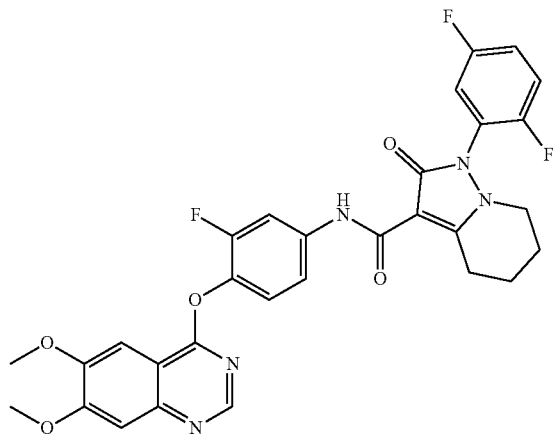 [SMILES: COc1cc2ncnc(Oc3ccc(NC(=O)c4c5n(n(-c6cc(F)ccc6F)c4=O)CCCC5)cc3F)c2cc1OC] |
| DC621024 | 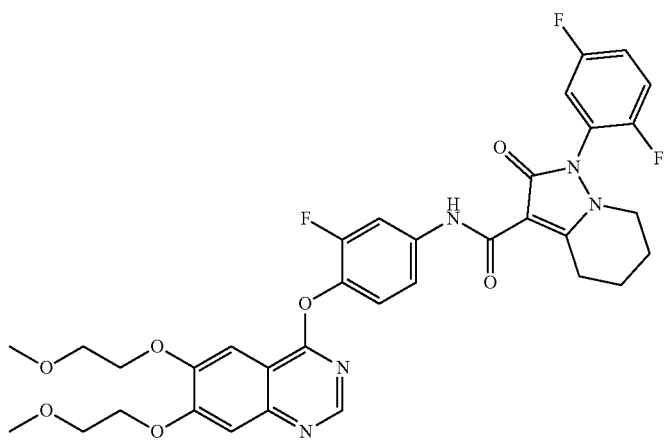 |
| DC621025 | 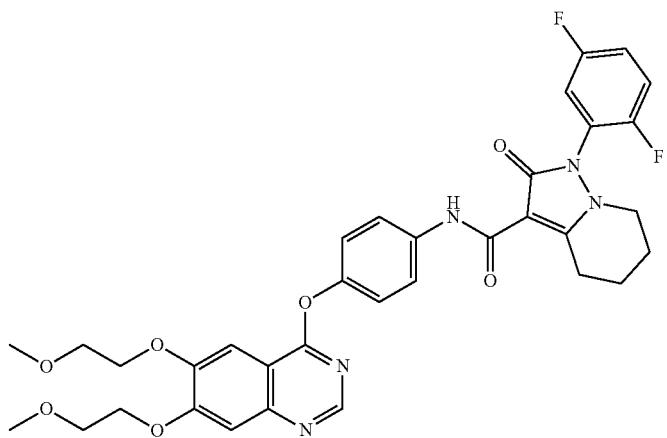 [SMILES: COCCOc1cc2ncnc(Oc3ccc(NC(=O)c4c5n(n(-c6cc(F)ccc6F)c4=O)CCCC5)cc3)c2cc1OCCOC] |

-continued
| No. | Structure |
|---|---|
| DC621026 | 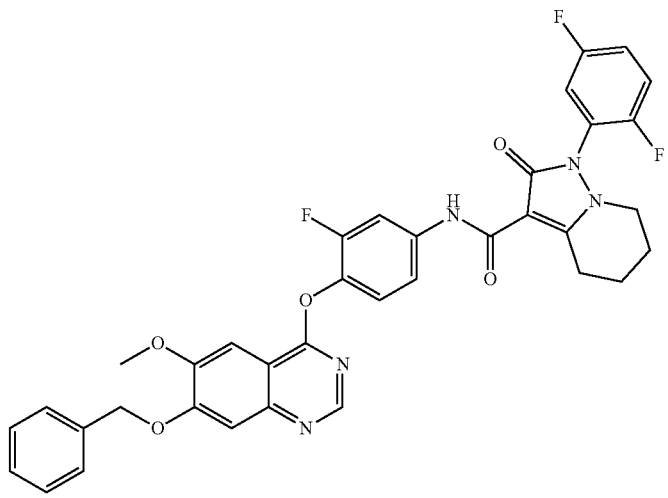 [SMILES: COc1cc2c(Oc3ccc(NC(=O)c4c5n(n(-c6cc(F)ccc6F)c4=O)CCCC5)cc3F)ncnc2cc1OCc1ccccc1] |
| DC621027 | 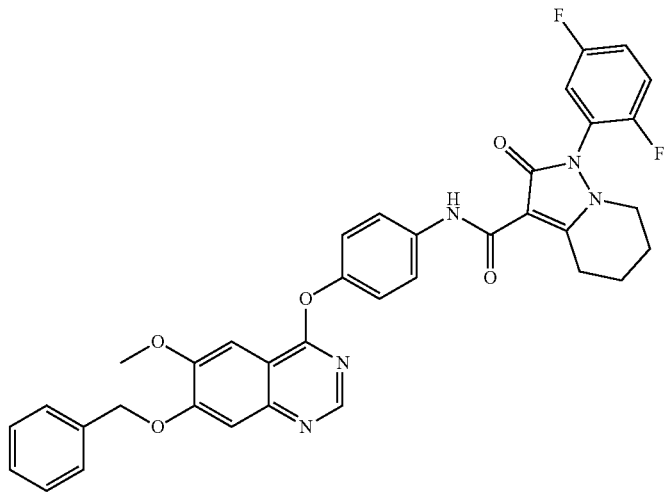 [SMILES: COc1cc2c(Oc3ccc(NC(=O)c4c5n(n(-c6cc(F)ccc6F)c4=O)CCCC5)cc3)ncnc2cc1OCc1ccccc1] |
| DC621028 | 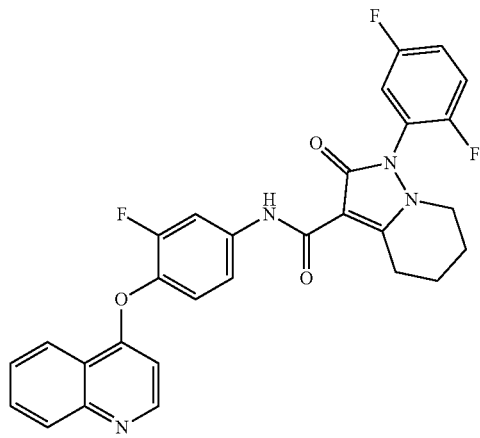 [SMILES: O=C(Nc1ccc(Oc2ccnc3ccccc23)c(F)c1)c1c2n(n(-c3cc(F)ccc3F)c1=O)CCCC2] |

-continued
| No. | Structure |
|---|---|
| DC621029 | 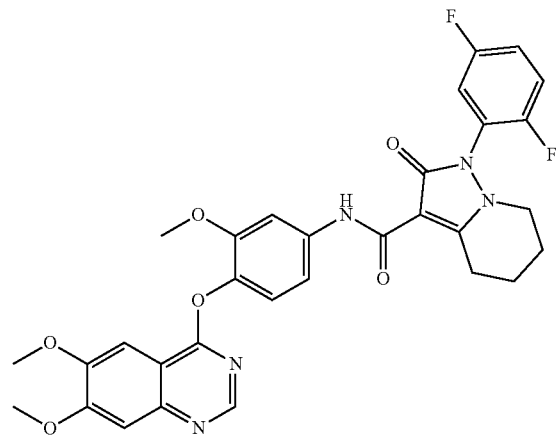 [SMILES: COc1cc2ncnc(Oc3ccc(NC(=O)c4c5n(n(-c6cc(F)ccc6F)c4=O)CCCC5)cc3OC)c2cc1OC] |
| DC621030 | 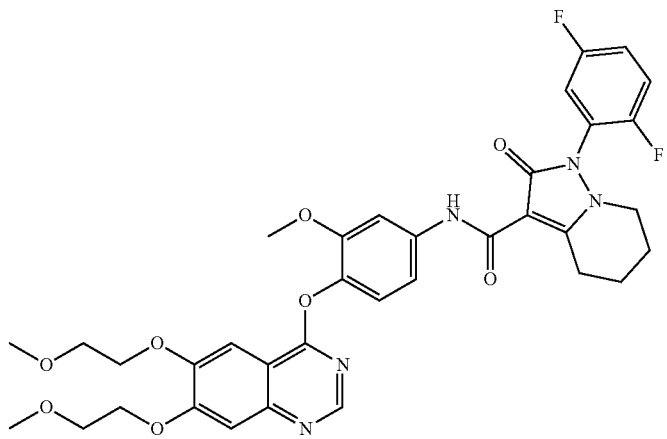 [SMILES: COCCOc1cc2ncnc(Oc3ccc(NC(=O)c4c5n(n(-c6cc(F)ccc6F)c4=O)CCCC5)cc3OC)c2cc1OCCOC] |
| DC621031 | 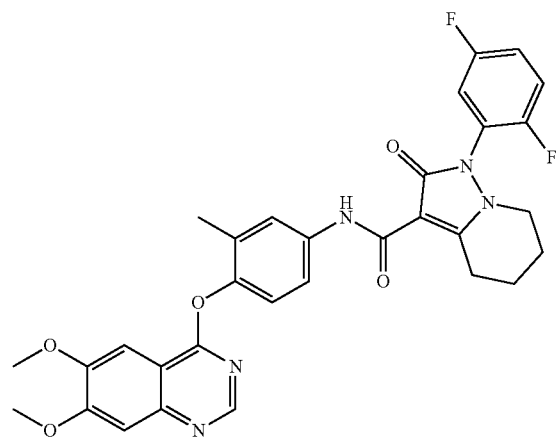 |

| No. | Structure |
|---|---|
| DC621032 | 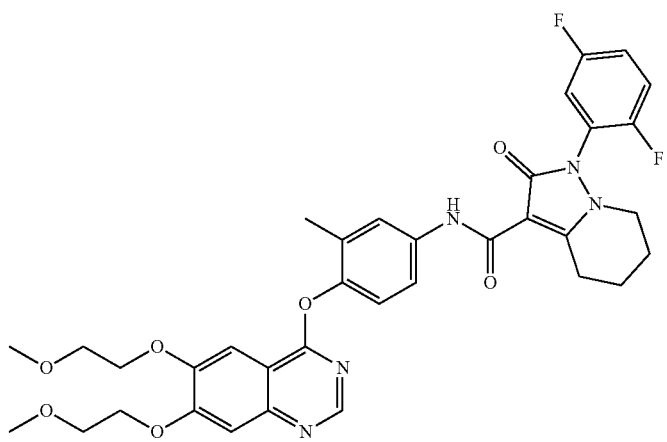 [SMILES: COCCOc1cc2ncnc(Oc3ccc(NC(=O)c4c5n(n(-c6cc(F)ccc6F)c4=O)CCCC5)cc3C)c2cc1OCCOC] |
| DC621033 | 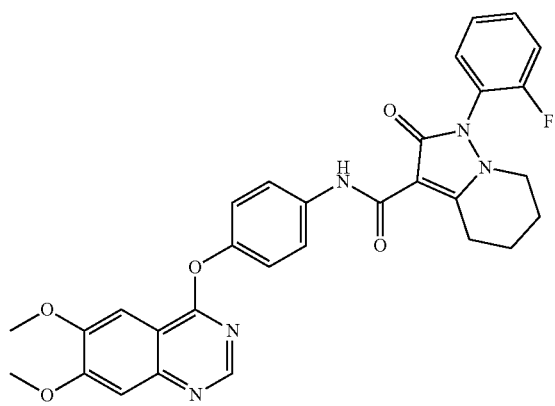 [SMILES: COc1cc2ncnc(Oc3ccc(NC(=O)c4c5n(n(-c6ccccc6F)c4=O)CCCC5)cc3)c2cc1OC] |
| DC621034 | 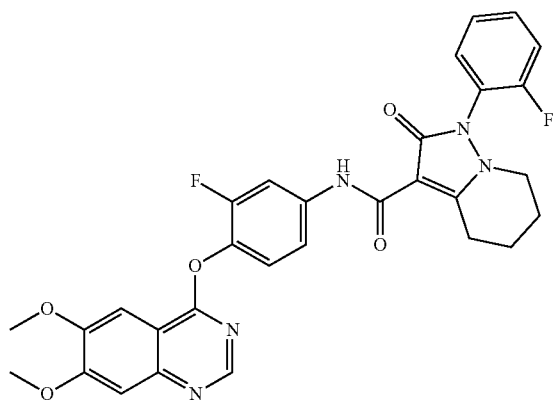 |

-continued
| No. | Structure |
|---|---|
| DC621035 | 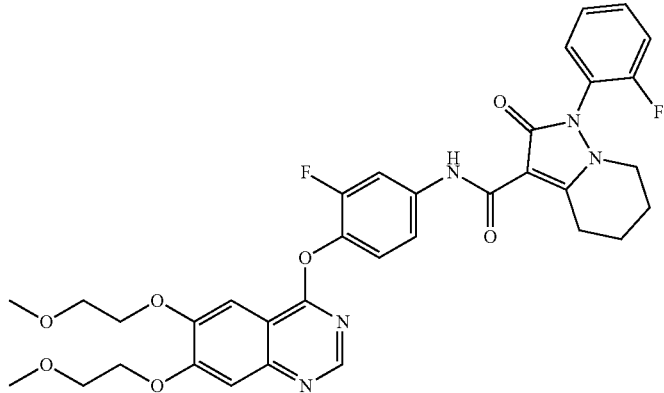 [SMILES: COCCOc1cc2ncnc(Oc3ccc(NC(=O)c4c5n(n(-c6ccccc6F)c4=O)CCCC5)cc3F)c2cc1OCCOC] |
| DC621036 | 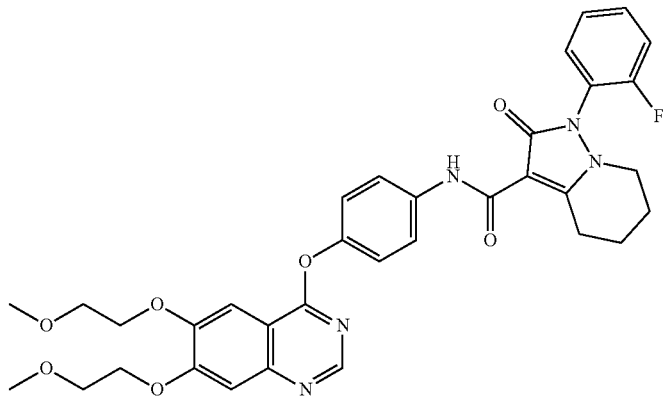 [SMILES: COCCOc1cc2ncnc(Oc3ccc(NC(=O)c4c5n(n(-c6ccccc6F)c4=O)CCCC5)cc3)c2cc1OCCOC] |
| DC621105 | 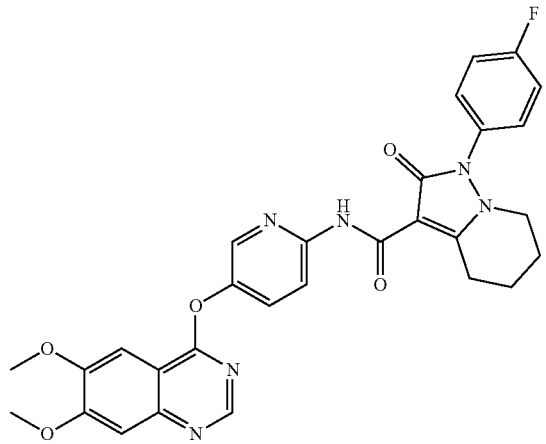 [SMILES: COc1cc2ncnc(Oc3ccc(NC(=O)c4c5n(n(-c6ccc(F)cc6)c4=O)CCCC5)nc3)c2cc1OC] |

-continued
| No. | Structure |
|---|---|
| DC621106 | 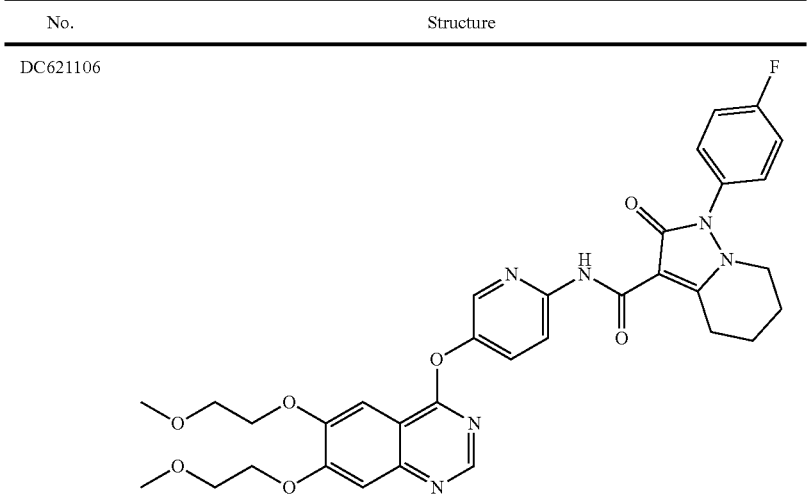 |
| DC621037 | 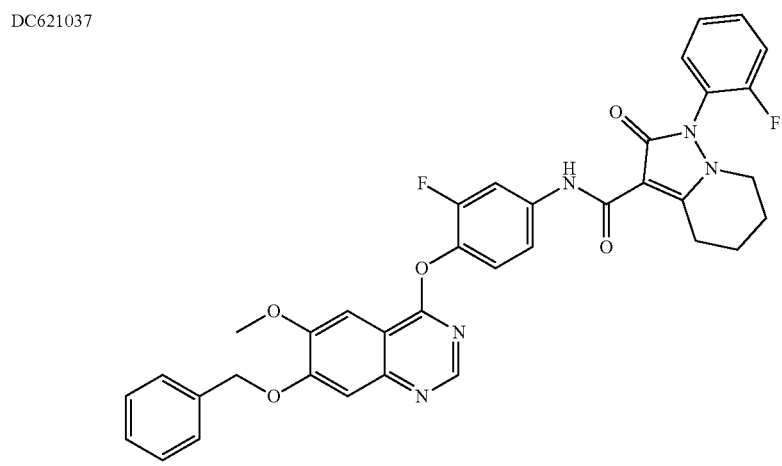 |
| DC621038 | 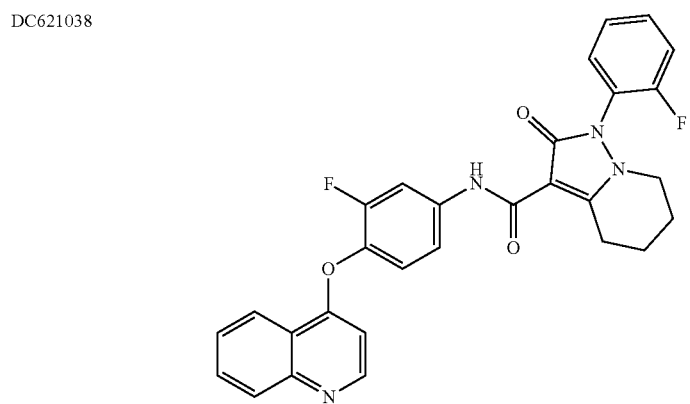 |

-continued
| No. | Structure |
|---|---|
| DC621039 | 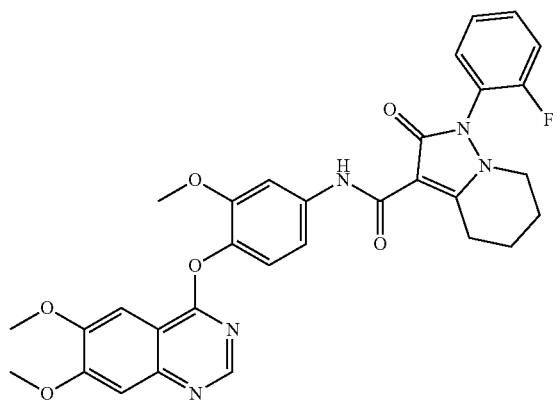 [SMILES: COc1cc2ncnc(Oc3ccc(NC(=O)c4c5n(n(-c6ccccc6F)c4=O)CCCC5)cc3OC)c2cc1OC] |
| DC621040 | 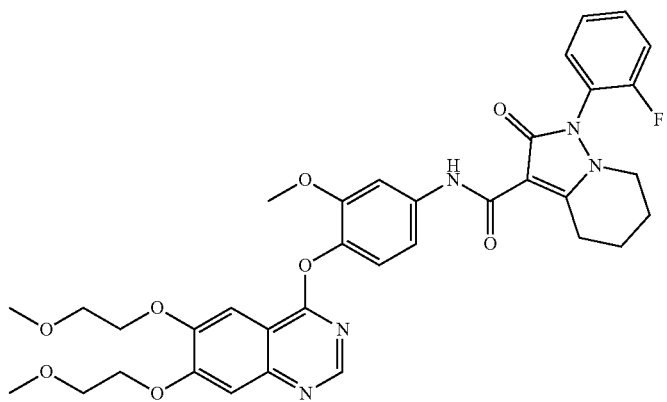 [SMILES: COCCOc1cc2ncnc(Oc3ccc(NC(=O)c4c5n(n(-c6ccccc6F)c4=O)CCCC5)cc3OC)c2cc1OCCOC] |
| DC621041 | 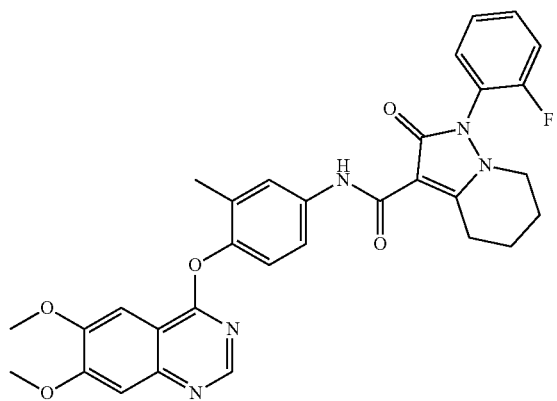 [SMILES: COc1cc2ncnc(Oc3ccc(NC(=O)c4c5n(n(-c6ccccc6F)c4=O)CCCC5)cc3C)c2cc1OC] |
| DC621042 | 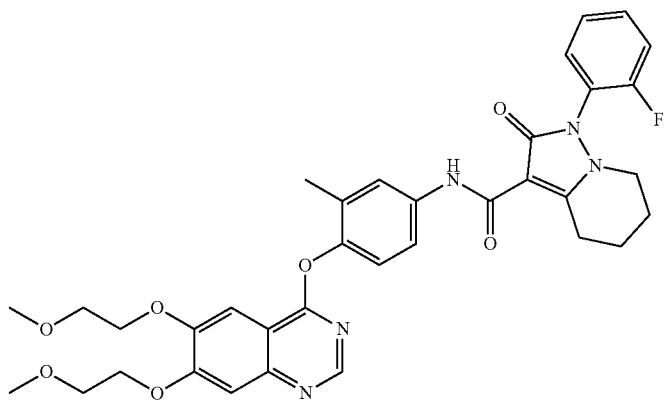 [SMILES: COCCOc1cc2ncnc(Oc3ccc(NC(=O)c4c5n(n(-c6ccccc6F)c4=O)CCCC5)cc3C)c2cc1OCCOC] |

| No. | Structure |
|---|---|
| DC621043 | 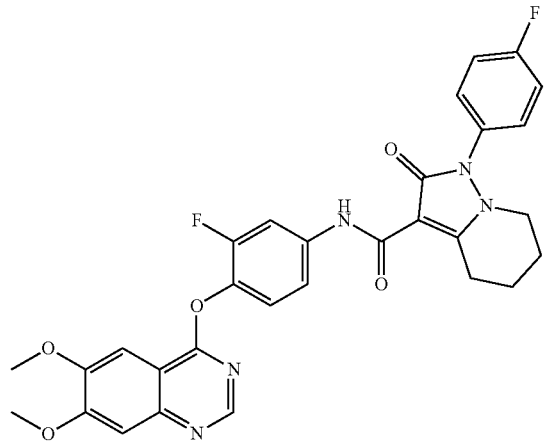 [SMILES: COc1cc2ncnc(Oc3ccc(NC(=O)c4c5n(n(-c6ccc(F)cc6)c4=O)CCCC5)cc3F)c2cc1OC] |
| DC621044 | 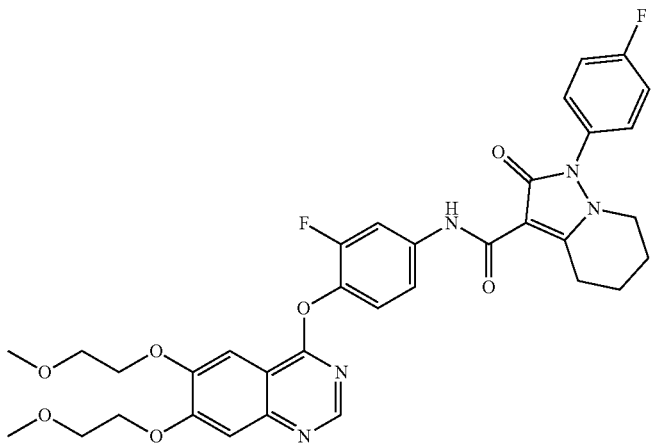 |
| DC621045 | 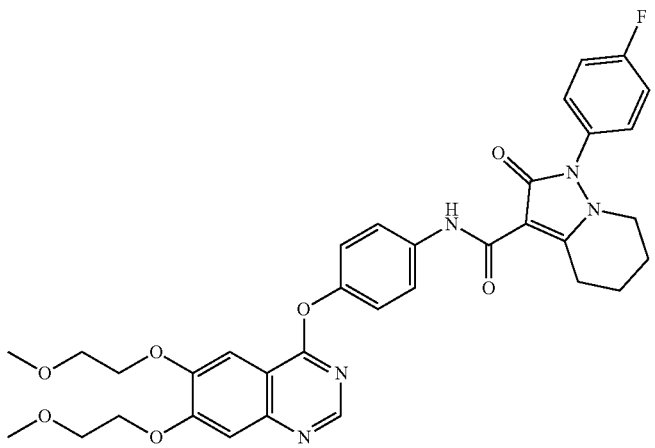 [SMILES: COCCOc1cc2ncnc(Oc3ccc(NC(=O)c4c5n(n(-c6ccc(F)cc6)c4=O)CCCC5)cc3)c2cc1OCCOC] |

| No. | Structure |
|---|---|
| DC621046 | 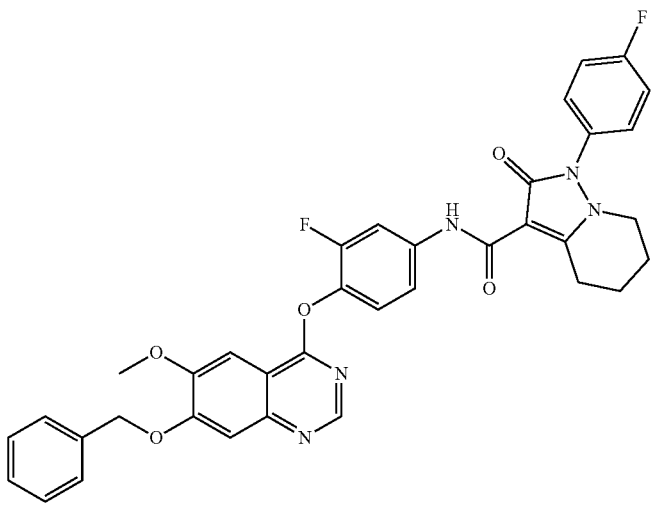 [SMILES: COc1cc2c(Oc3ccc(NC(=O)c4c5n(n(-c6ccc(F)cc6)c4=O)CCCC5)cc3F)ncnc2cc1OCc1ccccc1] |
| DC621047 | 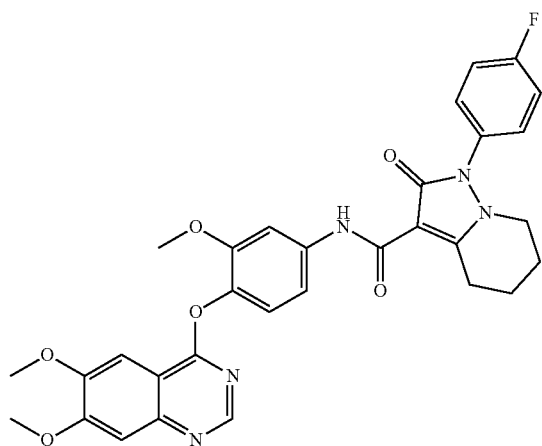 [SMILES: COc1cc2ncnc(Oc3ccc(NC(=O)c4c5n(n(-c6ccc(F)cc6)c4=O)CCCC5)cc3OC)c2cc1OC] |
| DC621048 | 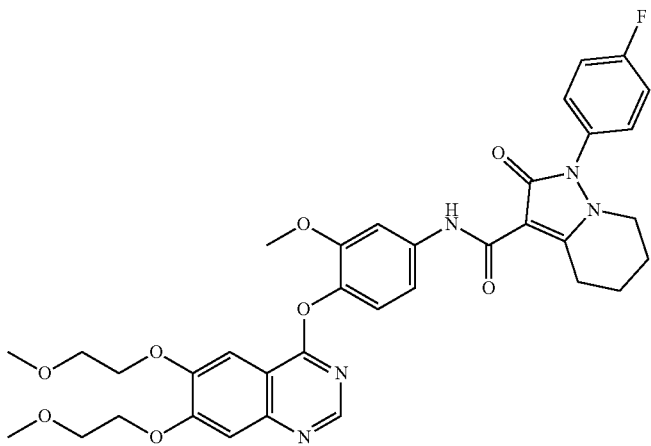 [SMILES: COCCOc1cc2ncnc(Oc3ccc(NC(=O)c4c5n(n(-c6ccc(F)cc6)c4=O)CCCC5)cc3OC)c2cc1OCCOC] |

| No. | Structure |
|---|---|
| DC621049 | 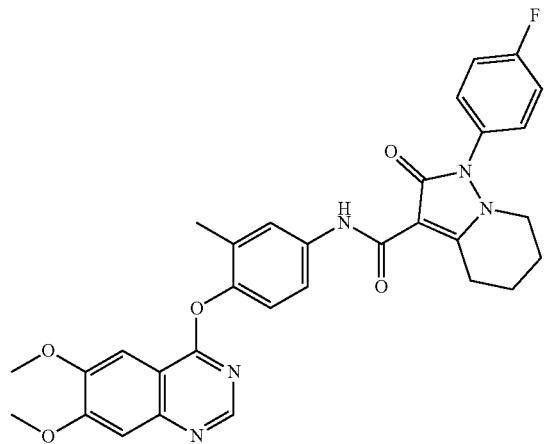 [SMILES: COc1cc2ncnc(Oc3ccc(NC(=O)c4c5n(n(-c6ccc(F)cc6)c4=O)CCCC5)cc3C)c2cc1OC] |
| DC621050 | 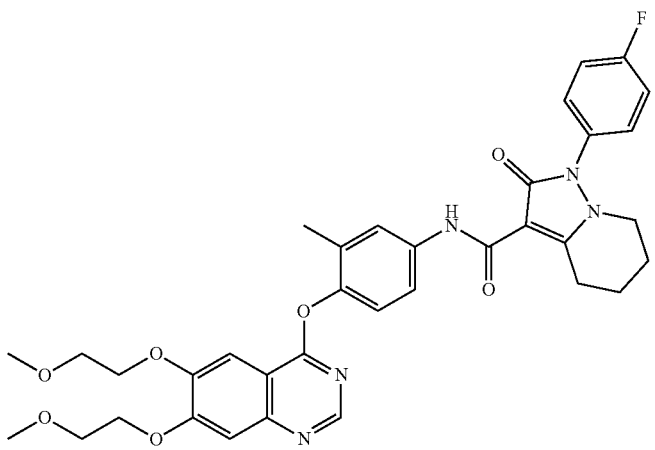 [SMILES: COCCOc1cc2ncnc(Oc3ccc(NC(=O)c4c5n(n(-c6ccc(F)cc6)c4=O)CCCC5)cc3C)c2cc1OCCOC] |
| DC621051 | 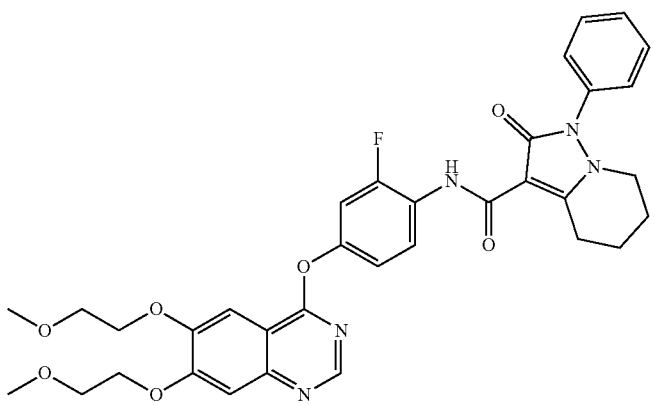 [SMILES: COCCOc1cc2ncnc(Oc3ccc(NC(=O)c4c5n(n(-c6ccccc6)c4=O)CCCC5)c(F)c3)c2cc1OCCOC] |

-continued

| No. | Structure |
|---|---|
| DC621052 | |
| DC621053 | |
| DC621054 | |
| DC621055 | |

| No. | Structure |
|---|---|
| DC621056 | 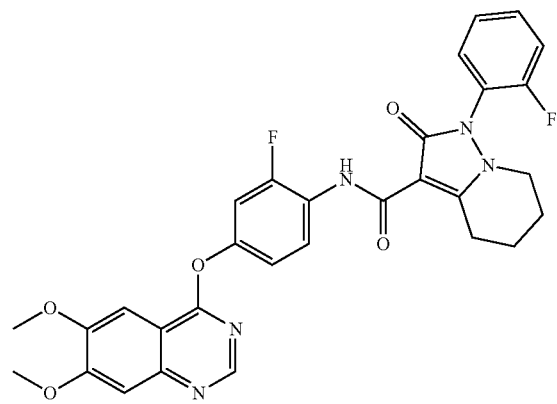 [SMILES: COc1cc2ncnc(Oc3ccc(NC(=O)c4c5n(n(-c6ccccc6F)c4=O)CCCC5)c(F)c3)c2cc1OC] |
| DC621057 | 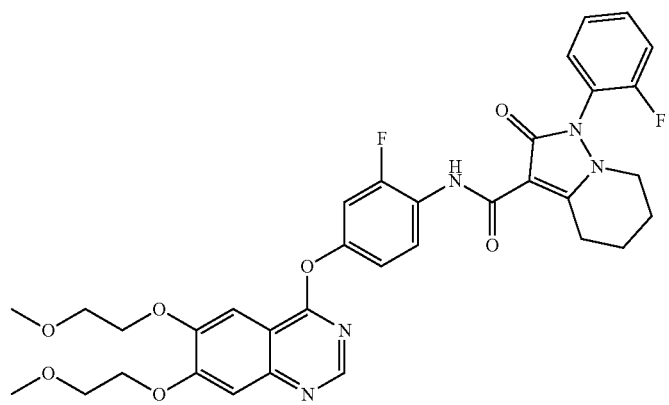 [SMILES: COCCOc1cc2ncnc(Oc3ccc(NC(=O)c4c5n(n(-c6ccccc6F)c4=O)CCCC5)c(F)c3)c2cc1OCCOC] |
| DC621058 | 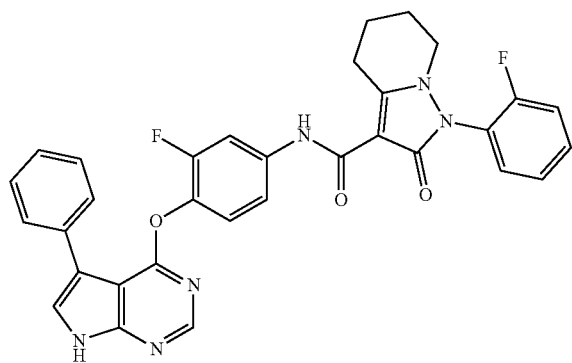 [SMILES: O=C(Nc1ccc(Oc2ncnc3[nH]cc(-c4ccccc4)c23)c(F)c1)c1c2n(n(-c3ccccc3F)c1=O)CCCC2] |

| No. | Structure |
|---|---|
| DC621059 | 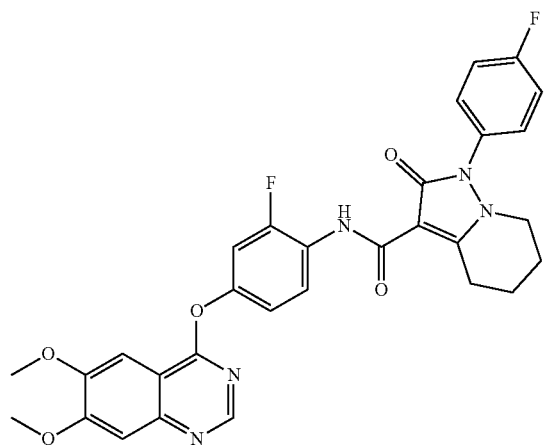 [SMILES: COc1cc2ncnc(Oc3ccc(NC(=O)c4c5n(n(-c6ccc(F)cc6)c4=O)CCCC5)c(F)c3)c2cc1OC] |
| DC621060 | 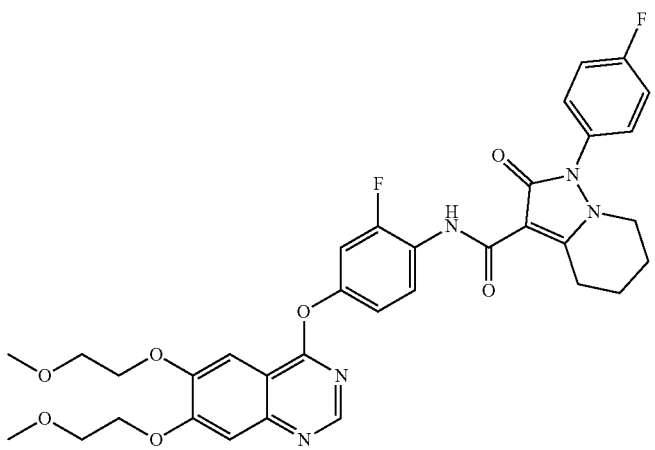 [SMILES: COCCOc1cc2ncnc(Oc3ccc(NC(=O)c4c5n(n(-c6ccc(F)cc6)c4=O)CCCC5)c(F)c3)c2cc1OCCOC] |
| DC621061 | 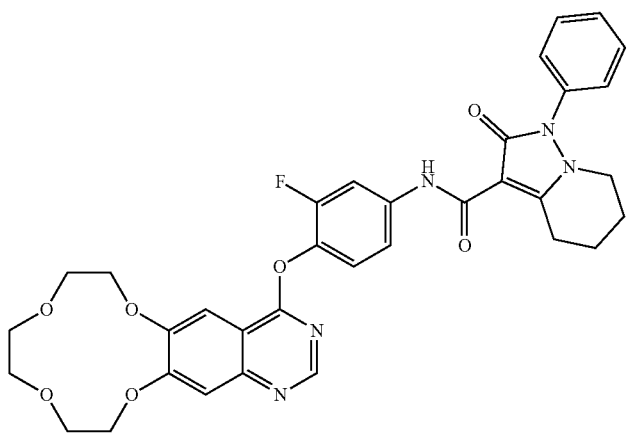 |

| No. | Structure |
|---|---|
| DC621062 | 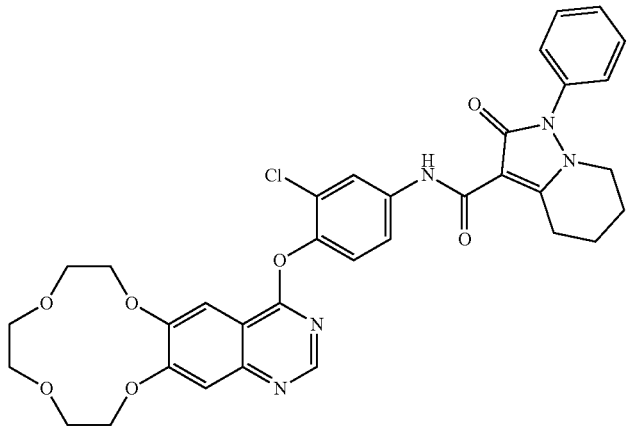 |
| DC621063 | 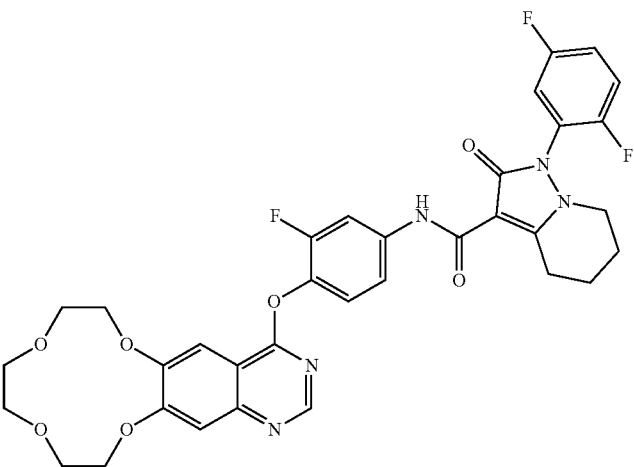 |
| DC621064 | 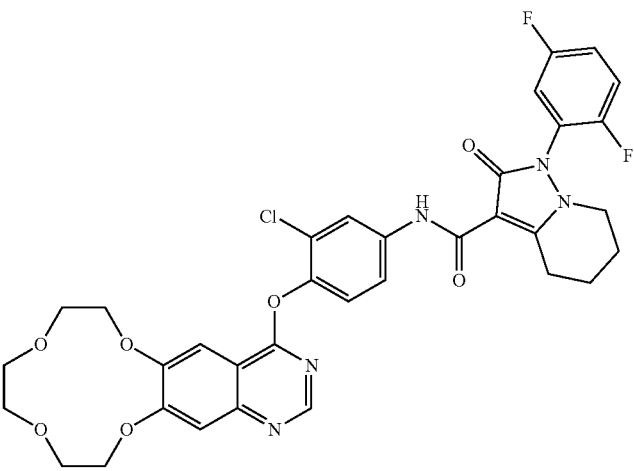 |

| No. | Structure |
|---|---|
| DC621065 | 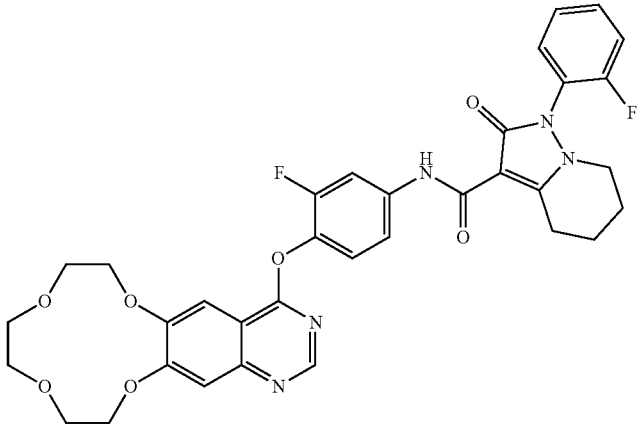 |
| DC621066 | 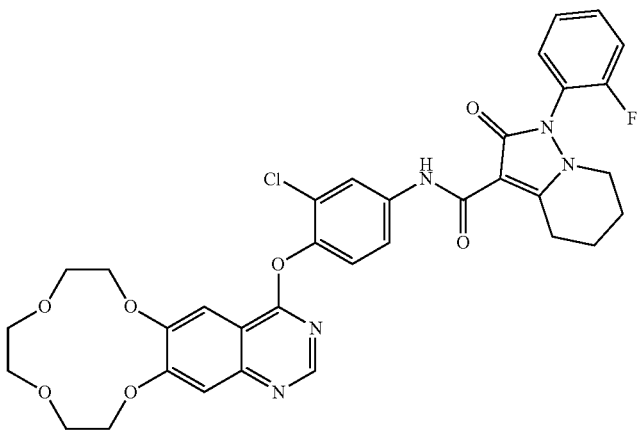 [SMILES: O=C(Nc1ccc(Oc2ncnc3cc4c(cc23)OCCOCCOCCO4)c(Cl)c1)c1c2n(n(-c3ccccc3F)c1=O)CCCC2] |
| DC621067 | 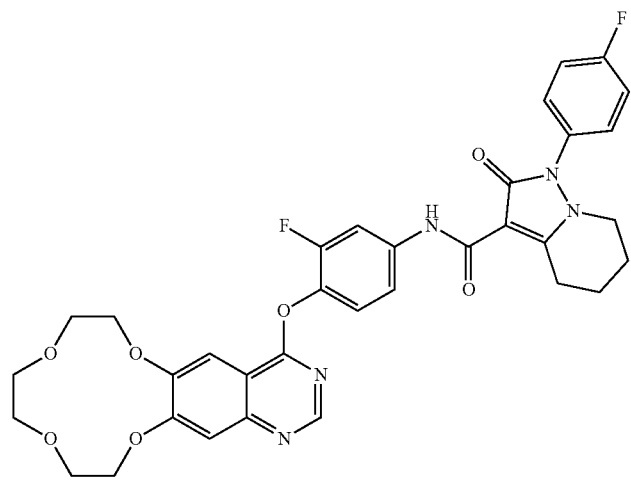 [SMILES: O=C(Nc1ccc(Oc2ncnc3cc4c(cc23)OCCOCCOCCO4)c(F)c1)c1c2n(n(-c3ccc(F)cc3)c1=O)CCCC2] |

| No. | Structure |
|---|---|
| DC621068 | 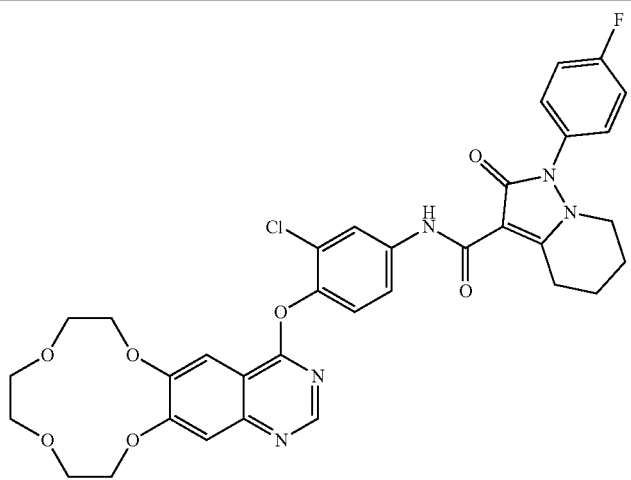 |
| DC621069 | 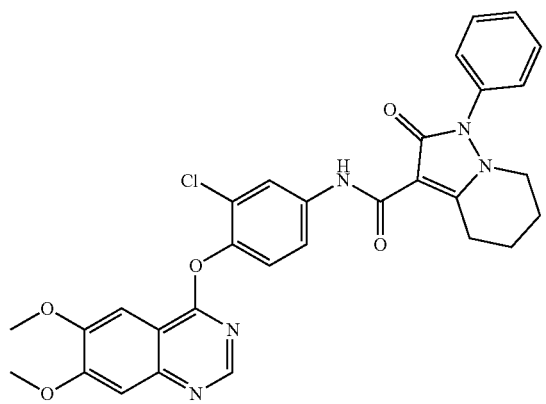 |
| DC621070 | 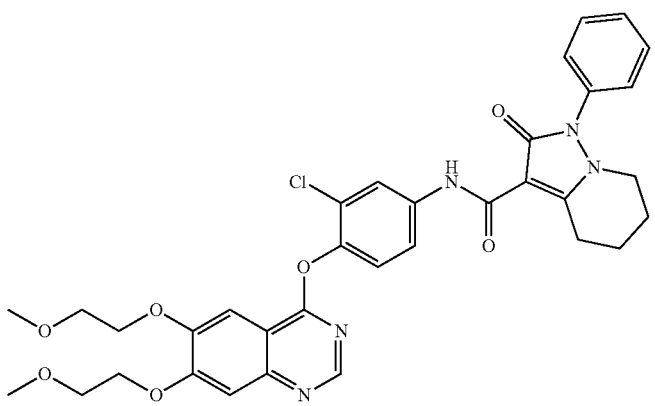 [SMILES: COCCOc1cc2ncnc(Oc3ccc(NC(=O)c4c5n(n(-c6ccccc6)c4=O)CCCC5)cc3Cl)c2cc1OCCOC] |

| No. | Structure |
|---|---|
| DC621107 | 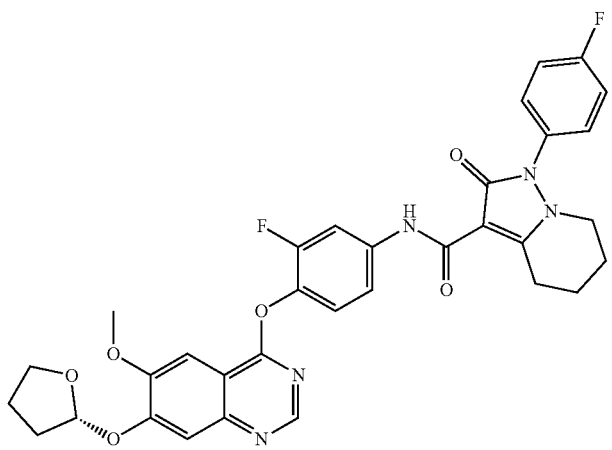 [SMILES: COc1cc2c(Oc3ccc(NC(=O)c4c5n(n(-c6ccc(F)cc6)c4=O)CCCC5)cc3F)ncnc2cc1O[C@@H]1CCCO1] |
| DC621108 | 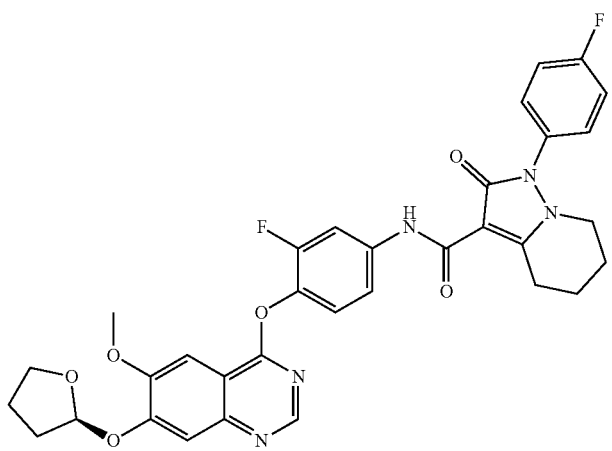 [SMILES: COc1cc2c(Oc3ccc(NC(=O)c4c5n(n(-c6ccc(F)cc6)c4=O)CCCC5)cc3F)ncnc2cc1O[C@H]1CCCO1] |
| DC621071 | 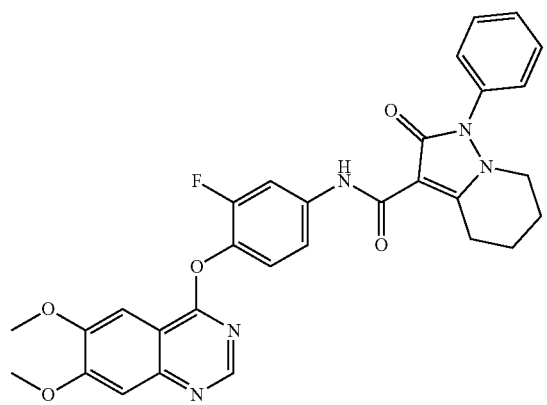 [SMILES: COc1cc2ncnc(Oc3ccc(NC(=O)c4c5n(n(-c6ccccc6)c4=O)CCCC5)cc3F)c2cc1OC] |

| No. | Structure |
|---|---|
| DC621072 | 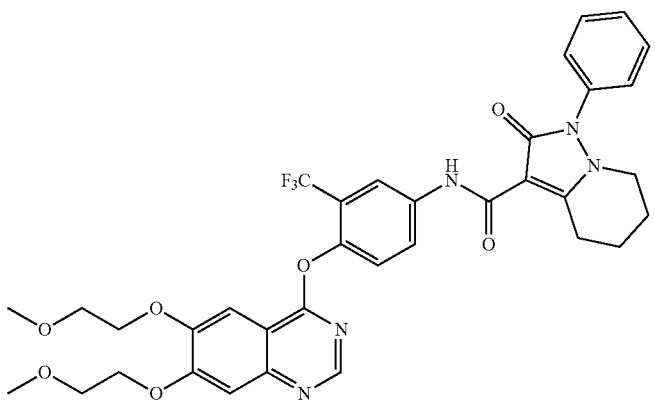 [SMILES: COCCOc1cc2ncnc(Oc3ccc(NC(=O)c4c5n(n(-c6ccccc6)c4=O)CCCC5)cc3C(F)(F)F)c2cc1OCCOC] |
| DC621073 | 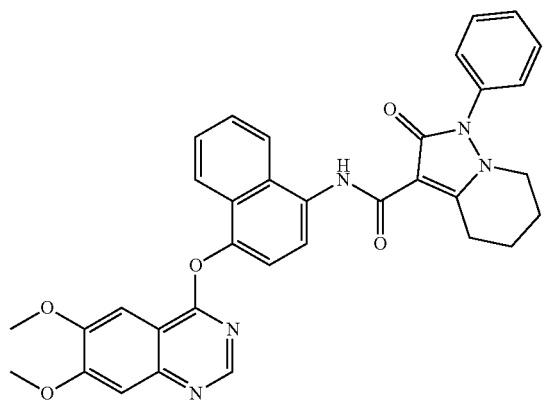 [SMILES: COc1cc2ncnc(Oc3ccc(NC(=O)c4c5n(n(-c6ccccc6)c4=O)CCCC5)c4ccccc34)c2cc1OC] |
| DC621074 | 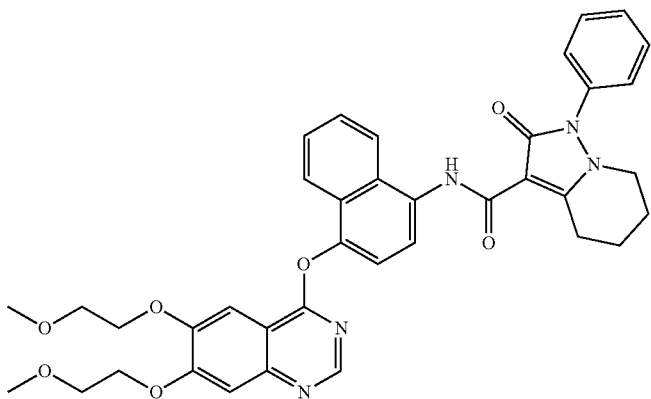 [SMILES: COCCOc1cc2ncnc(Oc3ccc(NC(=O)c4c5n(n(-c6ccccc6)c4=O)CCCC5)c4ccccc34)c2cc1OCCOC] |
| DC621075 | 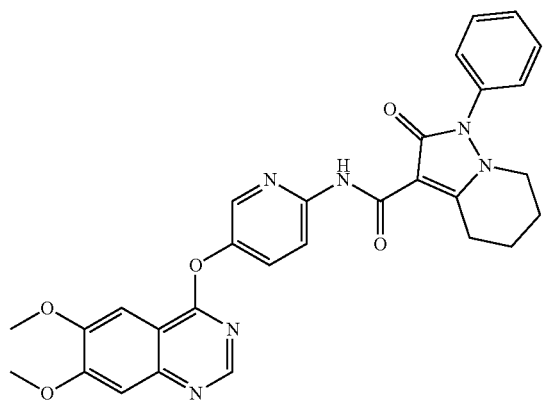 [SMILES: COc1cc2ncnc(Oc3ccc(NC(=O)c4c5n(n(-c6ccccc6)c4=O)CCCC5)nc3)c2cc1OC] |

| No. | Structure |
|---|---|
| DC621076 | 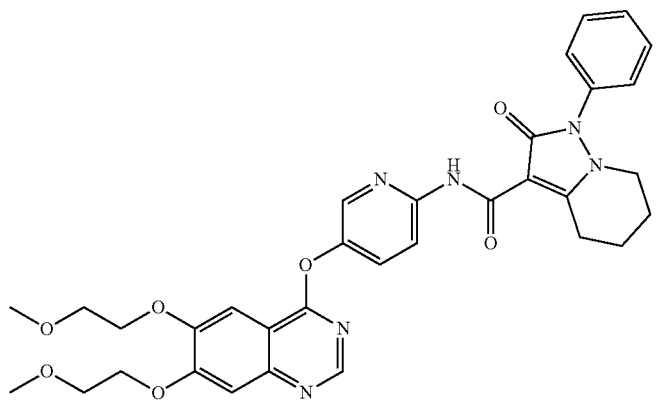 [SMILES: COCCOc1cc2ncnc(Oc3ccc(NC(=O)c4c5n(n(-c6ccccc6)c4=O)CCCC5)nc3)c2cc1OCCOC] |
| DC621077 | 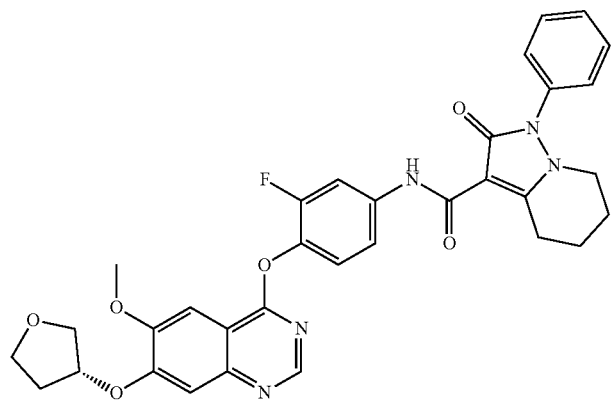 |
| DC621078 | 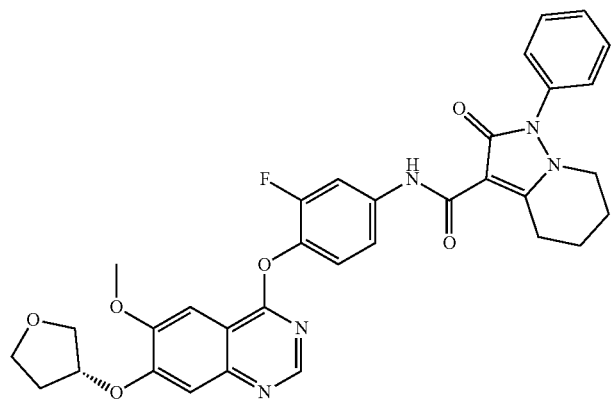 |

-continued
| No. | Structure |
|---|---|
| DC621079 | 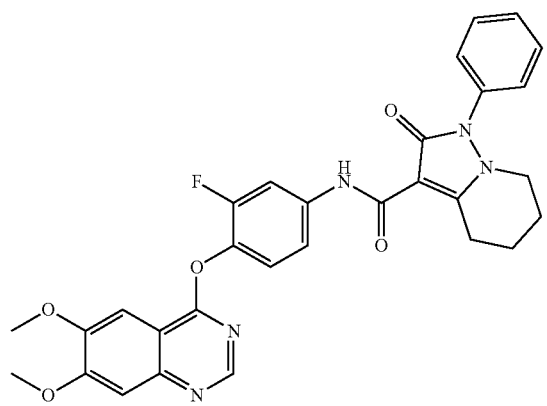 |
| DC621080 | 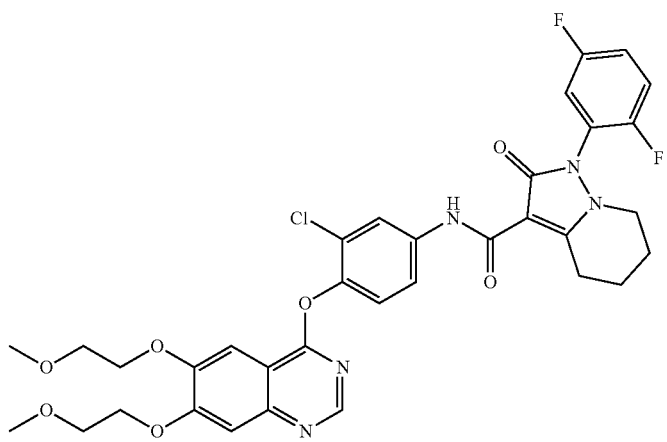 [SMILES: COCCOc1cc2ncnc(Oc3ccc(NC(=O)c4c5n(n(-c6cc(F)ccc6F)c4=O)CCCC5)cc3Cl)c2cc1OCCOC] |
| DC621081 | 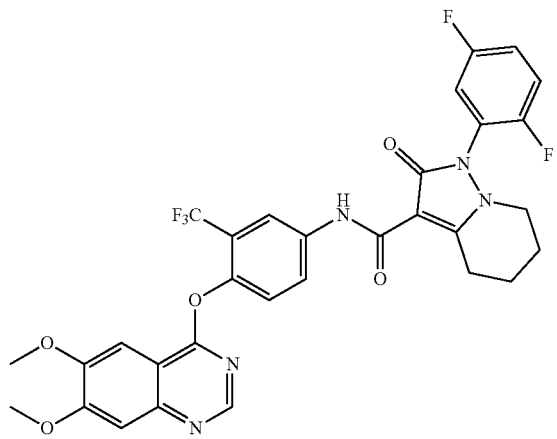 [SMILES: COc1cc2ncnc(Oc3ccc(NC(=O)c4c5n(n(-c6cc(F)ccc6F)c4=O)CCCC5)cc3C(F)(F)F)c2cc1OC] |

| No. | Structure |
|---|---|
| DC621082 | 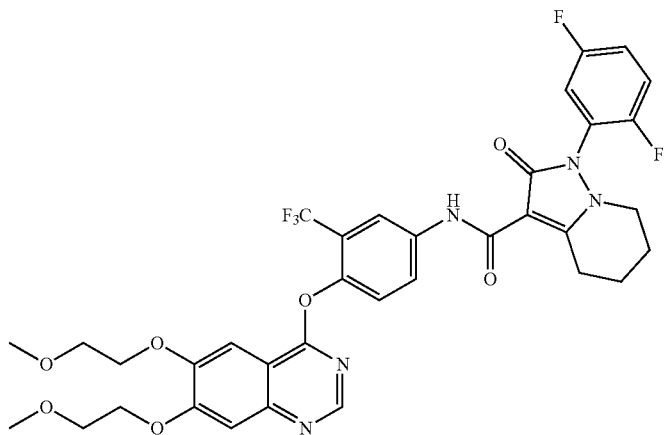 |
| DC621083 | 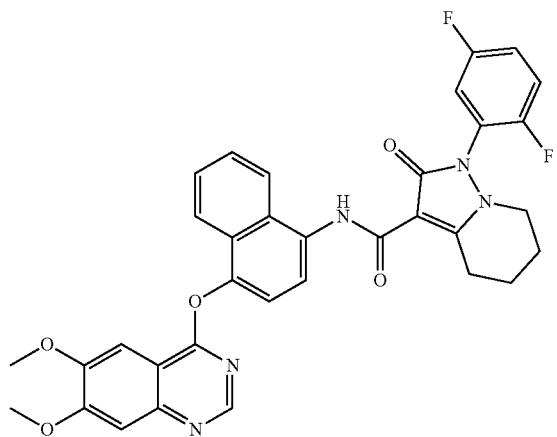 [SMILES: COc1cc2ncnc(Oc3ccc(NC(=O)c4c5n(n(-c6cc(F)ccc6F)c4=O)CCCC5)c4ccccc34)c2cc1OC] |
| DC621084 | 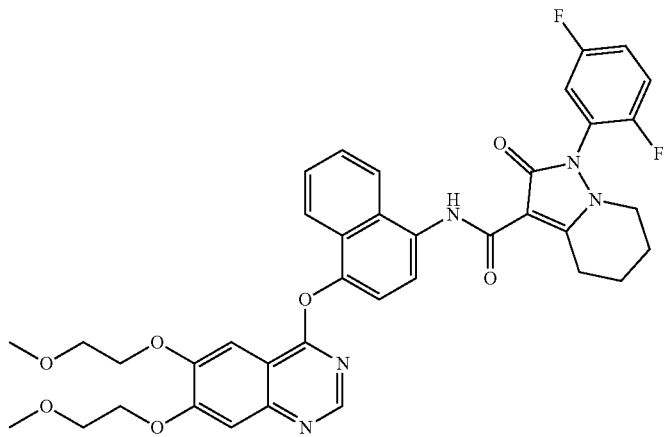 [SMILES: COCCOc1cc2ncnc(Oc3ccc(NC(=O)c4c5n(n(-c6cc(F)ccc6F)c4=O)CCCC5)c4ccccc34)c2cc1OCCOC] |

-continued
| No. | Structure |
|---|---|
| DC621085 | 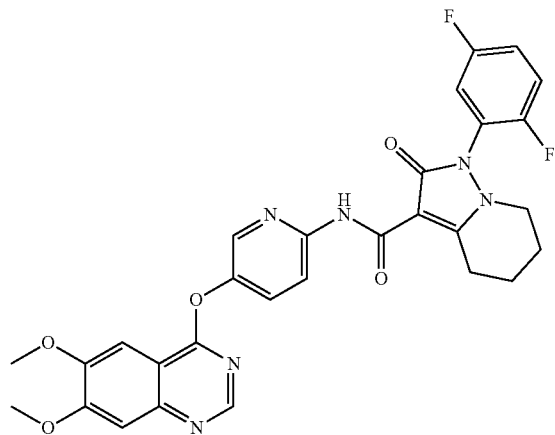 [SMILES: COc1cc2ncnc(Oc3ccc(NC(=O)c4c5n(n(-c6cc(F)ccc6F)c4=O)CCCC5)nc3)c2cc1OC] |
| DC621086 | 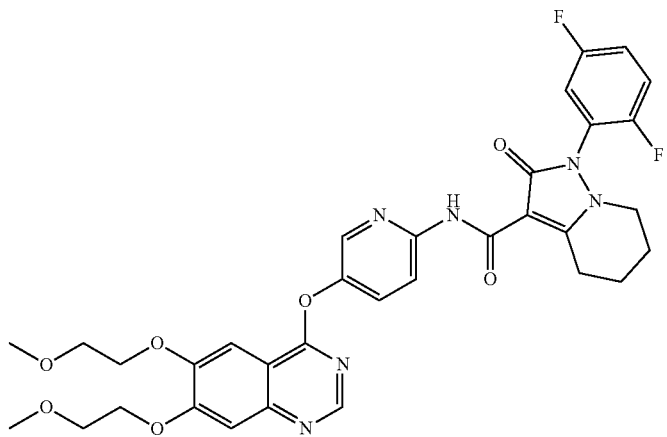 [SMILES: COCCOc1cc2ncnc(Oc3ccc(NC(=O)c4c5n(n(-c6cc(F)ccc6F)c4=O)CCCC5)nc3)c2cc1OCCOC] |
| DC621087 | 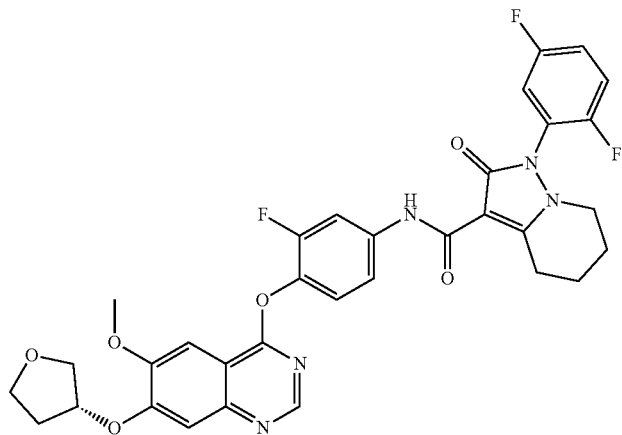 [SMILES: COc1cc2c(Oc3ccc(NC(=O)c4c5n(n(-c6cc(F)ccc6F)c4=O)CCCC5)cc3F)ncnc2cc1O[C@@H]1CCOC1] |

| No. | Structure |
|---|---|
| DC621088 | 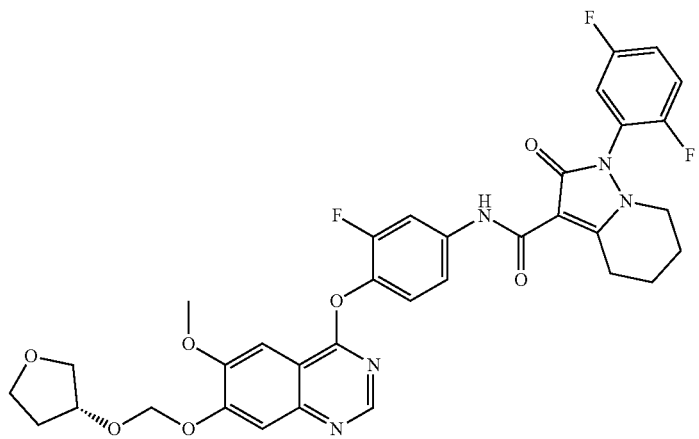 [SMILES: COc1cc2c(Oc3ccc(NC(=O)c4c5n(n(-c6cc(F)ccc6F)c4=O)CCCC5)cc3F)ncnc2cc1OCO[C@@H]1CCOC1] |
| DC621089 | 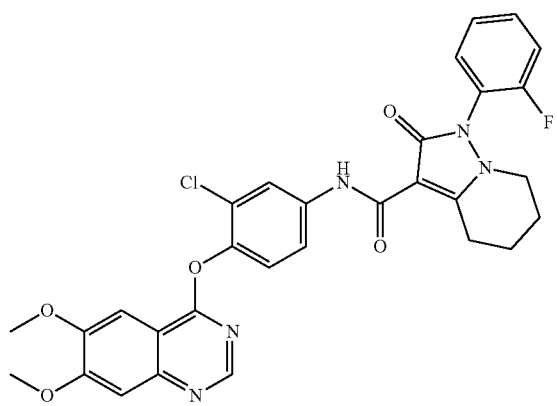 |
| DC621090 | 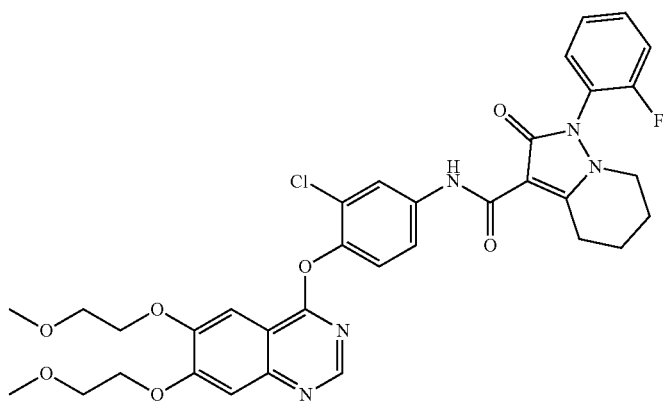 |

| No. | Structure |
|---|---|
| DC621091 | |
| DC621092 | |
| DC621093 | |
| DC621094 | |

-continued
| No. | Structure |
|---|---|
| DC621095 | 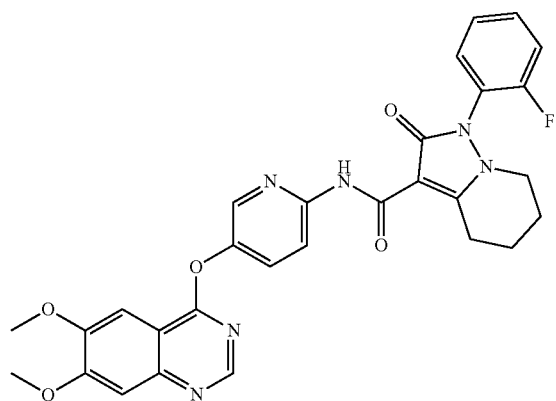 [SMILES: COc1cc2ncnc(Oc3ccc(NC(=O)c4c5n(n(-c6ccccc6F)c4=O)CCCC5)nc3)c2cc1OC] |
| DC621096 | 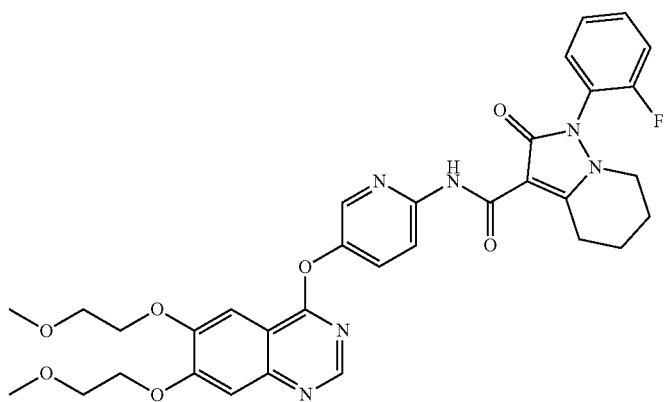 [SMILES: COCCOc1cc2ncnc(Oc3ccc(NC(=O)c4c5n(n(-c6ccccc6F)c4=O)CCCC5)nc3)c2cc1OCCOC] |
| DC621097 | 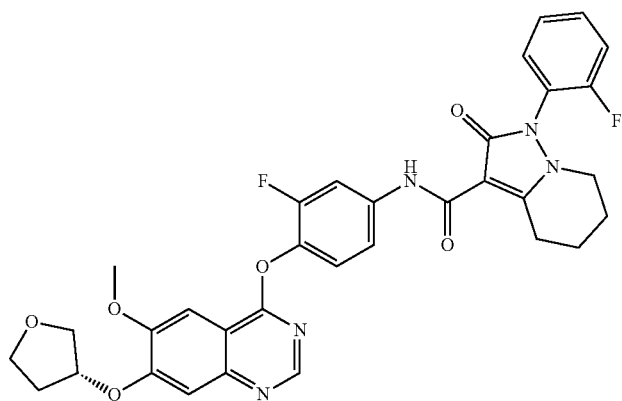 [SMILES: COc1cc2c(Oc3ccc(NC(=O)c4c5n(n(-c6ccccc6F)c4=O)CCCC5)cc3F)ncnc2cc1O[C@@H]1CCOC1] |

| No. | Structure |
|---|---|
| DC621098 | 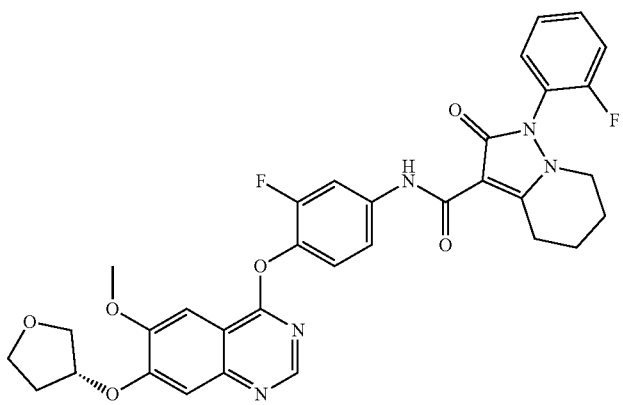 [SMILES: COc1cc2c(Oc3ccc(NC(=O)c4c5n(n(-c6ccccc6F)c4=O)CCCC5)cc3F)ncnc2cc1O[C@@H]1CCOC1] |
| DC621099 | 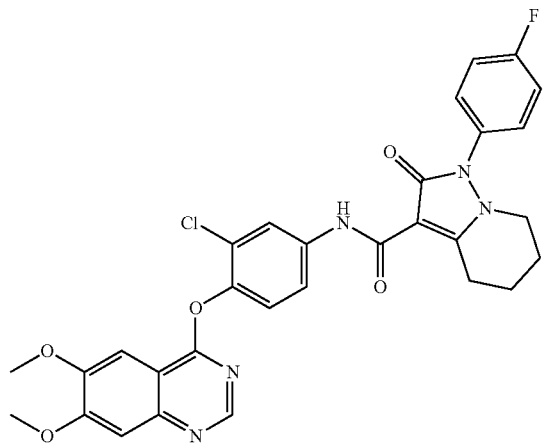 [SMILES: COc1cc2ncnc(Oc3ccc(NC(=O)c4c5n(n(-c6ccc(F)cc6)c4=O)CCCC5)cc3Cl)c2cc1OC] |
| DC621100 | 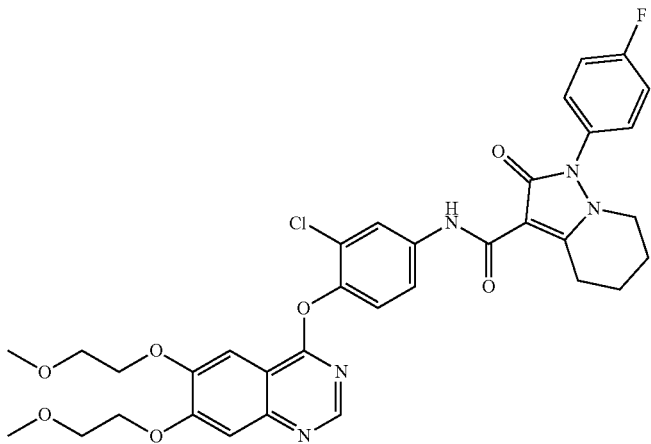 [SMILES: COCCOc1cc2ncnc(Oc3ccc(NC(=O)c4c5n(n(-c6ccc(F)cc6)c4=O)CCCC5)cc3Cl)c2cc1OCCOC] |

| No. | Structure |
|---|---|
| DC621101 | 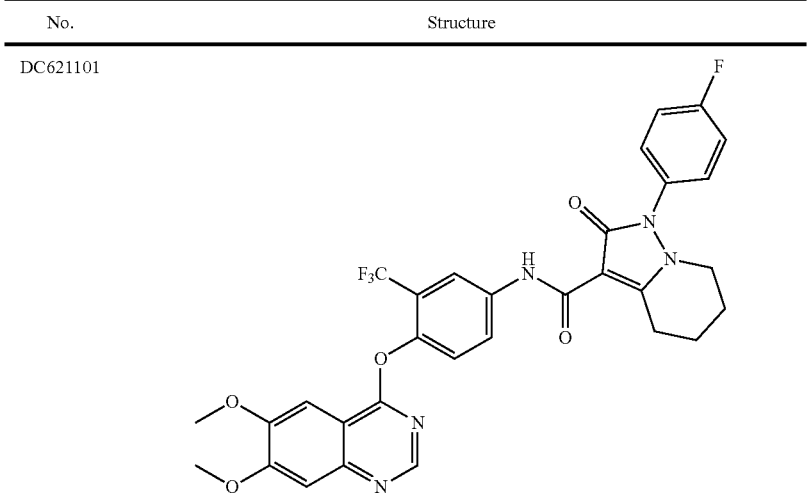 |
| DC621102 | 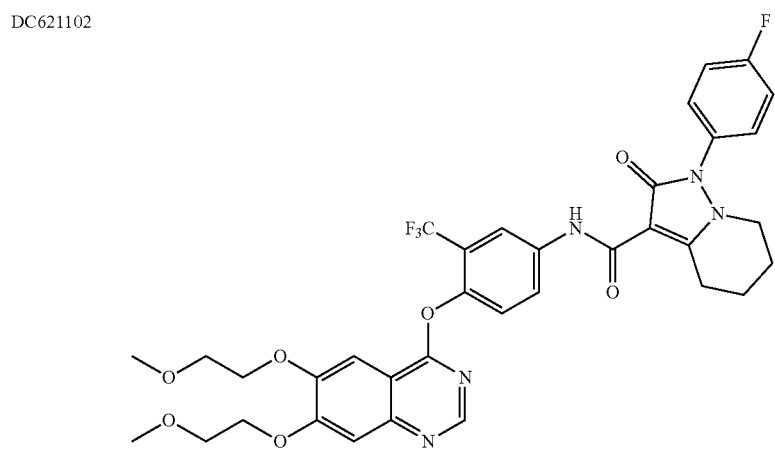 |
| DC621103 | 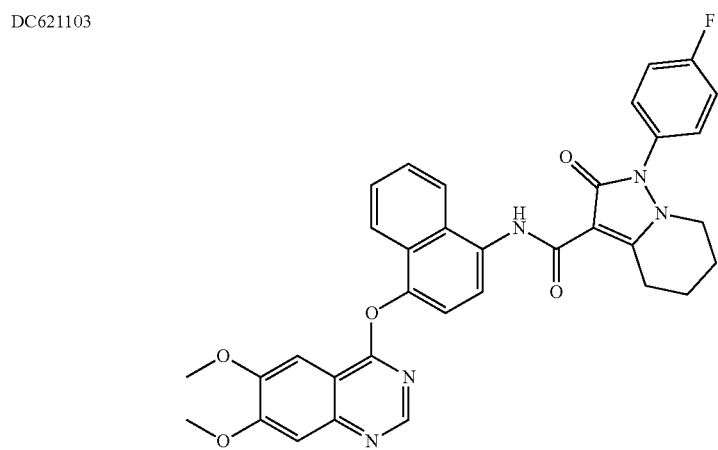 |

| No. | Structure |
|---|---|
| DC621104 | |

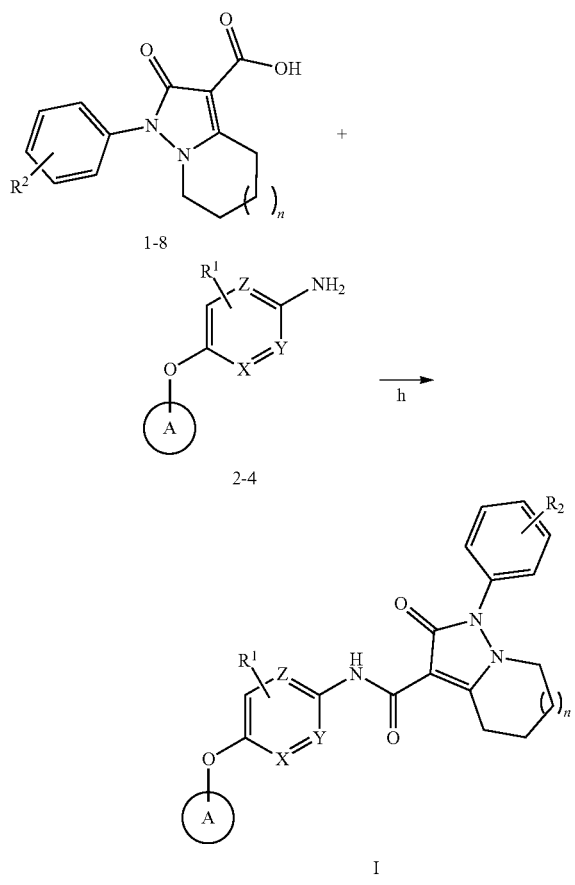

7. A preparation method of compound of claim 1, wherein comprises the following steps:

in an inert solvent, reacting formula 1-8 compound and formula 2-4 compound to provide formula I compound.

8. A pharmaceutical composition, wherein the pharmaceutical composition comprises: a therapeutically effective amount of formula I compound of claim 1, or the pharmaceutically acceptable salt, racemate, R-isomer, S-isomer thereof or the mixture thereof, and optional pharmaceutically acceptable carriers, excipients, adjuvants, accessories, and/or diluting agent.

9. A kinase inhibitor which comprises: therapeutically effective amount of one or more of formula I compound of claim 1, or the pharmaceutically acceptable salt, racemate, R-isomer, S-isomer thereof or the mixture thereof; and optional pharmaceutically acceptable carriers, excipients, adjuvants, accessories, and/or diluting agent; and the kinase is selected from the group consisting of AXL, c-Met, or combination thereof.

10. The fused-cyclic pyrazolone formamide compound of formula I of claim 1, or its racemate, R-isomer, S-isomer, pharmaceutically acceptable salt or mixture thereof, wherein n is 0 or 1.

11. A method of inhibiting the activity of receptor tyrosine kinase AXL or c-Met, which comprises the step: administrating a compound of formula I of claim 1 to a subject in need thereof.

12. The method of claim 11, wherein the subject is a human patient having a disease selected from the group consisting of lung cancer, stomach cancer, liver cancer, kidney cancer, breast cancer, pancreatic cancer, colorectal cancer, ovarian cancer, prostate cancer, thyroid cancer, esophageal cancer, head and neck cancer, melanoma, glioma and acute myeloid leukemia.

* * * * *